US012628100B2

(12) United States Patent
Goyal et al.

(10) Patent No.: US 12,628,100 B2
(45) Date of Patent: May 12, 2026

(54) PAGING FOR HIGHLY DIRECTIONAL SYSTEMS

(71) Applicant: InterDigital Patent Holdings, Inc., Wilmington, DE (US)

(72) Inventors: Sanjay Goyal, Deer Park, NY (US); Hussain Elkotby, Conshohocken, PA (US); Ravikumar Pragada, Warrington, PA (US); Tanbir Haque, Jackson Heights, NY (US); Alpaslan Demir, East Meadow, NY (US); Patrick Cabrol, Bayshore, NY (US); Mihaela Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 379 days.

(21) Appl. No.: 18/024,681

(22) PCT Filed: Sep. 2, 2021

(86) PCT No.: PCT/US2021/048872
§ 371 (c)(1),
(2) Date: Mar. 3, 2023

(87) PCT Pub. No.: WO2022/051499
PCT Pub. Date: Mar. 10, 2022

(65) Prior Publication Data
US 2023/0319747 A1     Oct. 5, 2023

Related U.S. Application Data

(60) Provisional application No. 63/089,937, filed on Oct. 9, 2020, provisional application No. 63/075,108, filed on Sep. 5, 2020.

(51) Int. Cl.
*H04W 68/00*     (2009.01)
*H04L 5/00*     (2006.01)
(Continued)

(52) U.S. Cl.
CPC ....... *H04W 56/0015* (2013.01); *H04W 68/02* (2013.01)

(58) Field of Classification Search
CPC .. H04W 56/0015; H04W 68/02; H04W 68/00
See application file for complete search history.

(56) References Cited

U.S. PATENT DOCUMENTS

| | | | |
|---|---|---|---|
| 11,356,976 B2 * | 6/2022 | Gonzalez | H04W 68/02 |
| 11,696,254 B2 * | 7/2023 | Rune | H04L 5/0053 370/329 |

(Continued)

FOREIGN PATENT DOCUMENTS

| | | |
|---|---|---|
| EP | 3606197 A1 | 2/2020 |
| JP | 2020-510381 A | 4/2020 |

(Continued)

OTHER PUBLICATIONS

3rd Generation Partnership Project (3GPP), TS 38.304 V15.7.0, "Technical Specification Group Radio Access Network, NR, User Equipment (UE) Procedures in Idle Mode and RRC Inactive State (Release 15)", Jul. 2020, pp. 1-30.

(Continued)

*Primary Examiner* — Schquita D Goodwin
(74) *Attorney, Agent, or Firm* — Condo Roccia Koptiw LLP

(57) ABSTRACT

Apparatus for paging for highly directional systems. A WTRU receives a default and/or a dynamic set of active SSBs which indicates the beams/SSBs is used to receive paging DCI, e.g. DCI scrambled with P-RNTI, over PDSCH. A WTRU utilizes the default and/or dynamic set of active SSBs in order to determine PDCCH monitoring occasions, PMOs, that are monitored in the WTRU's paging occasions, POs. A WTRU sends paging activating requests to activate a suitable SSB using associated UL signal/ resources, if the suitable SSB fulfills a SSB criteria, if the (Continued)

activation duration has elapsed and if the monitoring duration has elapsed. A WTRU may send one or more paging activation requests to activate multiple SSBs, e.g., a field of view, FOV, around a suitable SSB. Said paging activation requests implements a minimal feedback-based paging procedure for paging in highly directional systems, to which the gNB replies with paging configuration for the suitable SSB.

20 Claims, 21 Drawing Sheets

(51) Int. Cl.
  *H04W 56/00* (2009.01)
  *H04W 68/02* (2009.01)

(56) References Cited

U.S. PATENT DOCUMENTS

| | | | | |
|---|---|---|---|---|
| 2017/0367069 A1* | 12/2017 | Agiwal | ............... | H04B 7/088 |
| 2018/0324718 A1* | 11/2018 | Serrano | ............... | H04W 76/23 |
| 2019/0182784 A1* | 6/2019 | Harada | ............... | H04W 68/02 |
| 2019/0230624 A1 | 7/2019 | Islam et al. | | |
| 2019/0394749 A1 | 12/2019 | Islam et al. | | |
| 2020/0037274 A1 | 1/2020 | Pan et al. | | |
| 2020/0187185 A1* | 6/2020 | Zhu | ............... | H04B 17/327 |
| 2020/0322918 A1* | 10/2020 | Shih | ............... | H04W 76/11 |
| 2021/0068193 A1* | 3/2021 | Kong | ............... | H04W 52/0264 |
| 2021/0084615 A1* | 3/2021 | Priyanto | ............... | H04W 68/06 |
| 2021/0212007 A1* | 7/2021 | Liu | ............... | H04W 56/0015 |
| 2021/0385800 A1* | 12/2021 | Harada | ............... | H04L 5/0053 |
| 2022/0095125 A1* | 3/2022 | Xiao | ............... | H04B 7/022 |
| 2023/0397160 A1* | 12/2023 | He | ............... | H04W 68/005 |

FOREIGN PATENT DOCUMENTS

| | | |
|---|---|---|
| JP | 2020-115678 A | 7/2020 |
| WO | 2019/069504 A1 | 4/2019 |
| WO | 2019/160466 A1 | 8/2019 |

OTHER PUBLICATIONS

3rd Generation Partnership Project (3GPP), TS 38.331 V16.0.0, "Technical Specification Group Radio Access Network, NR, Radio Resource Control (RRC) protocol specification (Release 16)", Mar. 2020, pp. 1-835.

3rd Generation Partnership Project (3GPP), R2-165202, "Quantitative Analysis of On-Demand SI Delivery", Samsung, 3GPP TSG-RAN WG2 Meeting #95 Gothenburg, Sweden, Aug. 22-26, 2016, 7 pages.

3rd Generation Partnership Project (3GPP), R2-168125, "Evaluation of Downlink Resource Overhead for Paging in NR", Nokia, Alcatel-Lucent Shanghai Bell, 3GPP TSG-RAN WG2 Meeting #96 Reno, USA, Nov. 14-18, 2016, 4 pages.

3rd Generation Partnership Project (3GPP), TS 38.101-2 V16.4.0, "Technical Specification Group Radio Access Network, NR, User Equipment (UE) Radio Transmission and Reception, Part2: Range 2 Standalone (Release 16)", Jun. 2020, pp. 1-172.

3rd Generation Partnership Project (3GPP), TS 38.213 V16.1.0, "Technical Specification Group Radio Access Network, NR, Physical layer procedures for control (Release 16)", Mar. 2020, pp. 1-156.

3rd Generation Partnership Project (3GPP), TS 38.214 V16.1.0, "Technical Specification Group Radio Access Network, NR, Physical layer procedures for data (Release 16)", Mar. 2020, pp. 1-151.

3rd Generation Partnership Project (3GPP), TS 38.304 V16.0.0, "Technical Specification Group Radio Access Network, NR, User Equipment (UE) Procedures in Idle Mode and RRC Inactive state (Release 16)", Mar. 2020, pp. 1-38.

Agiwal, et al., "Mobile Assisted Directional Paging (MADP) in Emerging 5G Wireless Networks", IEEE Wireless Communications Letters, vol. 7, No. 3, Jun. 2018, pp. 416-419.

Weng et al., "Efficient Beam Sweeping Paging in Millimeter Wave 5G Networks", IEEE International Conference on Communications Workshops (ICC Workshops), May 2018, 6 pages.

\* cited by examiner

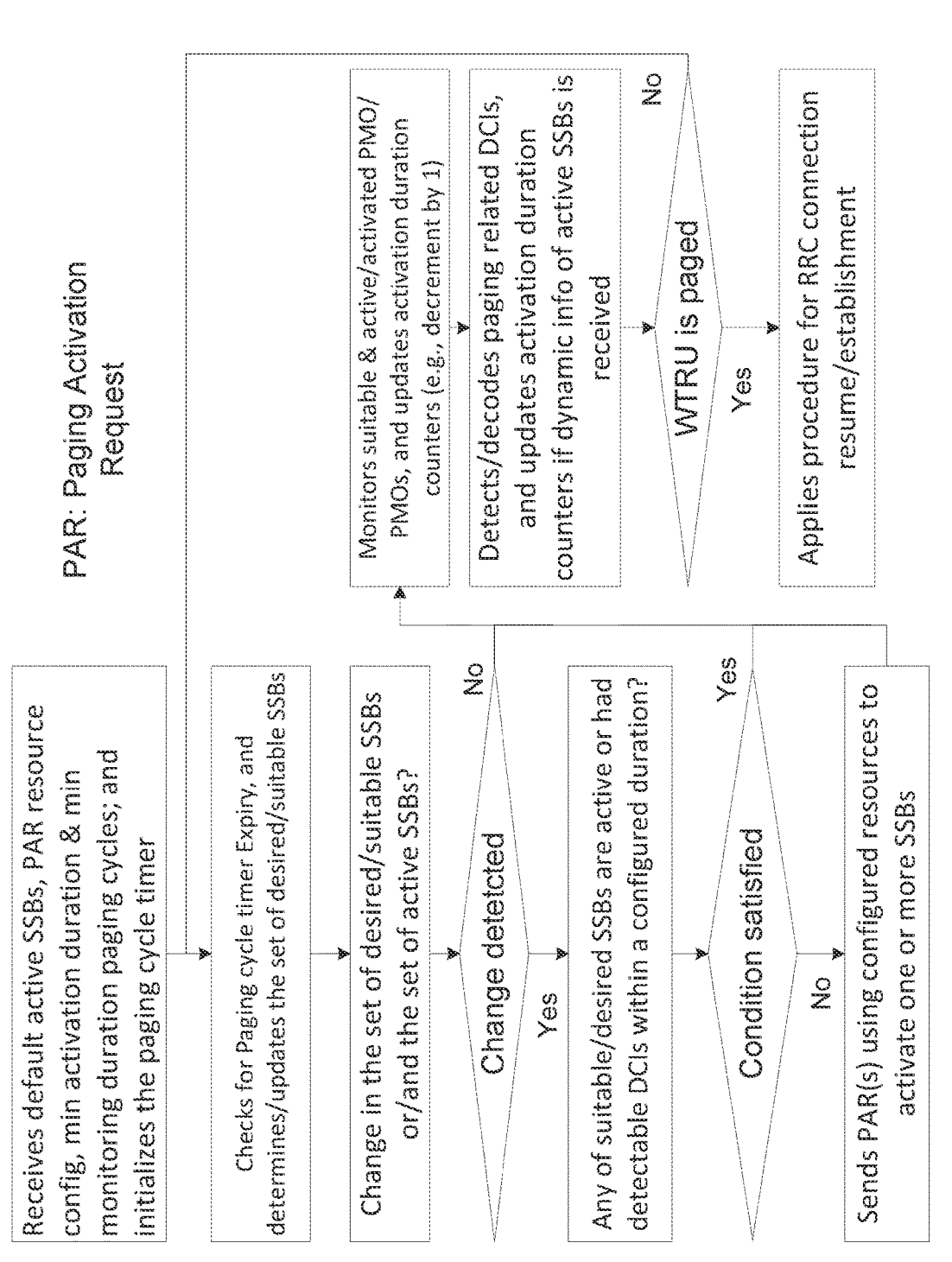

PAR: Paging Activation Request

Receives default active SSBs, PAR resource config, min activation duration & min monitoring duration paging cycles; and initializes the paging cycle timer Checks for Paging cycle timer Expiry, and determines/updates the set of desired/suitable SSBs Change in the set of desired/suitable SSBs or/and the set of active SSBs?

Change detetced

No

Yes

Any of suitable/desired SSBs are active or had detectable DCIs within a configured duration?

Condition satisfied

No

Yes

Sends PAR(s) using configured resources to activate one or more SSBs

Monitors suitable & active/activated PMO/PMOs, and updates activation duration counters (e.g., decrement by 1)

Detects/decodes paging related DCIs, and updates activation duration counters if dynamic info of active SSBs is received WTRU is paged No Yes Applies procedure for RRC connection resume/establishment

FIG. 12

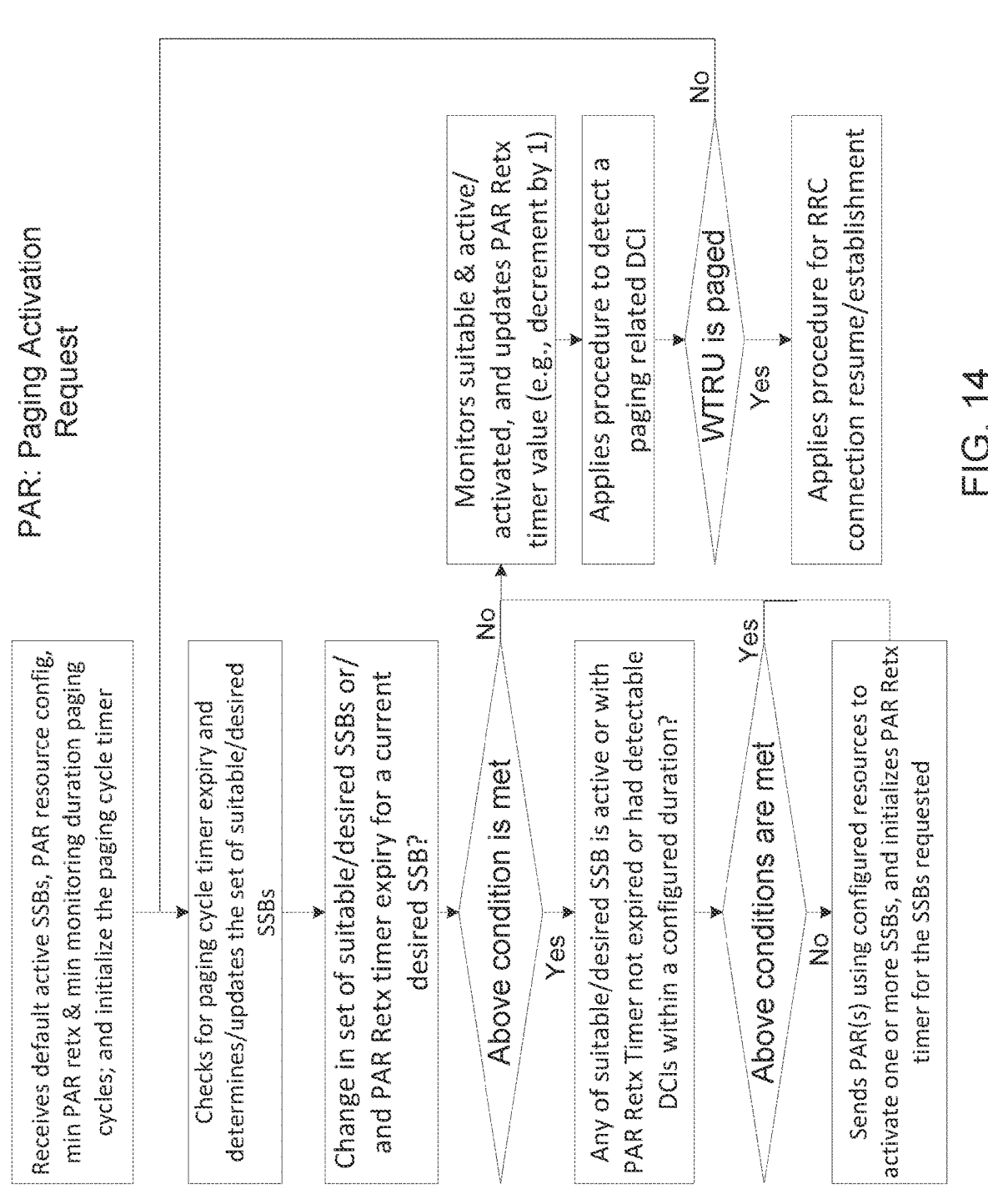

PAR: Paging Activation Request

Receives default active SSBs, PAR resource config, min PAR retx & min monitoring duration paging cycles; and initialize the paging cycle timer Checks for paging cycle timer expiry and determines/updates the set of suitable/desired SSBs Change in set of suitable/desired SSBs or/and PAR Retx timer expiry for a current desired SSB?

Above condition is met

Any of suitable/desired SSB is active or with PAR Retx Timer not expired or had detectable DCIs within a configured duration?

Above conditions are met

Sends PAR(s) using configured resources to activate one or more SSBs, and initializes PAR Retx timer for the SSBs requested Monitors suitable & active/activated, and updates PAR Retx timer value (e.g., decrement by 1)

Applies procedure to detect a paging related DCI

WTRU is paged

Applies procedure for RRC connection resume/establishment

PAGING FOR HIGHLY DIRECTIONAL SYSTEMS

CROSS-REFERENCE TO RELATED APPLICATIONS

This application is the National Stage Entry under 35 U.S.C. § 371 of Patent Cooperation Treaty Application No. PCT/US2021/048872, filed Sep. 2, 2021, which claims the benefit of Provisional U.S. Application No. 63/075,108, filed Sep. 5, 2020, and Provisional U.S. Application No. 63/089,937, filed Oct. 9, 2020, the disclosures of which are incorporated herein by reference in their entireties.

BACKGROUND

Mobile communications using wireless communication continue to evolve. A fifth generation of wireless communications may be referred to as 5G. A 5G system may use directional and/or multiple beams and may use such beams for paging.

SUMMARY

Systems, methods, and instrumentalities are described herein for paging for highly directional systems. A minimal feedback enable paging procedure may be provided. A WTRU may receive a default and/or a dynamic set of active synchronization signal and physical broadcast control channel blocks (SSBs), may indicate the beams/SSBs which may be used to receive paging information (e.g., downlink control information (DCI) (e.g., DCI scrambled with Paging Radio Network Temporary Identifier (P-RNTI))), and/or a message over a Physical Downlink Shared Channel (PDSCH).

A WTRU may utilize a default and/or dynamic set of active SSBs that may determine PDCCH monitoring occasions (PMOs) that may be monitored in the WTRU's paging occasions (POs). A WTRU may send messages (e.g., paging activating requests) to a network to activate a suitable SSB using associated UL signal/resources, for example: if not any of the SSBs given in a configured default of active SSBs (e.g., if any) is a WTRU's suitable SSB; if not any of the SSBs given in the active set of SSBs (e.g., dynamic information) received in the last minimum activate duration paging cycles is a WTRU's suitable SSB; if a WTRU has not sent a paging activation request that activates a SSB (e.g., the same SSB) in at least a last minimum paging activation request retransmission duration paging cycles; and if a WTRU monitors the PMOs associated with the SSB for last consecutive minimum monitoring duration paging cycles but has not received one or more (e.g., any) paging related DCI and paging message over those PMOs.

A WTRU may send one or more paging activation requests to activate multiple SSBs (e.g., a field of view (FOV) around a suitable SSB). Different priorities may be assigned to different SSBs (e.g., based on the DL measurements, mobility/orientation prediction, etc.). Different transmission techniques may be used (e.g., transmit (Tx) power level) in sending paging activation request to activate different SSBs with different priorities.

A WTRU may determine the mobility state based on the rate of beam and/or cell reselection. A WTRU may send a paging activation request associated with the WTRU's mobility state. A WTRU may determine/update the value of the monitoring duration paging cycles (e.g., minimum monitoring duration paging cycles) based on the WTRU's mobility state. A WTRU may determine/update the value of the paging activation request retransmission paging cycles (e.g., minimum paging activation request retransmission paging cycles) based on the WTRU's mobility state.

A gNB may support a minimal feedback-based paging procedure. The minimal feedback-based paging procedure may dynamically activate a beam associated with the resource/resources used for the paging activation request, for a paging group (e.g., associated POs) of the WTRU, and for a minimum duration of minimum activation duration paging cycles. One or more downlink messages, including the identification of the newly/recently re-activated beams, may be sent to the associated WTRUs/paging group using the downlink control information (e.g., DCI scrambled with P-RNTI). The minimal feedback-based paging procedure may send DCI containing schedule information of paging message, DCI containing short message, and/or paging message over PDSCH to a paging group, for example. The active beams (e.g., default and dynamically activated beams) associated with the paging group may be used.

A gNB may configure the WTRUs with multiple values. For example, the multiple values may be for a minimum activation duration, minimum paging activation request retransmission duration paging cycles, and/or minimum monitoring duration paging cycles based on a number of supported WTRU's mobility states. A gNB may dynamically activate a beam for a minimum duration of minimum activation duration paging cycles associated with a requesting WTRU's mobility state. A gNB may send one or more downlink messages containing the identification(s) of a number (e.g., all) the newly/recently (re-)activated beams to the associated WTRUs/paging group. A gNB may send one or more downlink messages with activation state indication(s) associated with the selected minimum activation duration for (e.g., each of) the newly/recently (re-)activated beams.

A dynamic DRX/paging cycle based paging procedure may be provided. A WTRU may receive a SSB pattern configuration including the set of SSBs (e.g., active SSBs) (e.g., beams/SSBs which may be used to receive a paging DCI and/or paging message) associated with POs (e.g., different POs). A WTRU may utilize the information of SSB pattern configuration(s) and suitable SSB/SSBs to determine POs/paging cycles to monitor. A WTRU may select a sub-set of (e.g., all) the POs/paging cycles to monitor for which the associated set of the configured SSB pattern includes the WTRU's suitable SSBs using parameters (e.g., at least one parameter). The parameters may be minimum paging cycle periodicity, minimum paging latency, and/or energy efficiency, etc.

A gNB may support a dynamic DRX/paging cycle based paging procedure by doing one or more of the following: determine SSB pattern(s) associated with paging groups (e.g., different paging groups) based on the arrival rate of paging requests at the gNB, the ratio of WTRUs transitioned to the connected state from the idle/inactive state via the gNB, WTRU density, coverage area, etc.; determine different (e.g., separate) SSB patterns based on, for example, the supported types/classes of the WTRUs; determine the PMO to SSB mapping for a PO, based on the number of (e.g., different) supported SSB sets over the PO; send a configuration of supported SSB patters (e.g., each with an associated pattern ID) and/or information of PMO to SSB mapping to the WTRUs; and send DCI including scheduling information of paging message, DCI including short message, and/or paging message over PDSCH in a PO to a paging group, using the beams (e.g., active beams) associated with the PO as configured in the SSB pattern for the paging group.

A WTRU may include a processor that may be configured to send a message to a network using a resource if one or more of a SSB meets an SSB criteria, an activation duration has elapsed, and a monitoring duration has elapsed. The resource may be associated with the SSB. The message may indicate a beam associated with the SSB is to be used by the network for sending paging information. The processor may receive a configuration information from the network. The configuration information may indicate a paging occasion associated with the SSB has been activated to receive the paging information. The processor may receive, via the beam during the paging occasion, the paging information. The processor may determine a configuration associated with the SSB using system information for the WTRU. The processor may determine one or more of the SSB criteria, the resource, the monitoring duration, and the activation duration using the configuration associated with the SSB. The processor may determine that the SSB meets the SSB criteria if a signal measurement of the beam surpasses a threshold. The processor may determine that the SSB is inactive if one or more of the SSB meets the SSB criteria, the active duration has expired, and the monitoring duration has expired. The processor may determine a paging failure associated with the SSB. The message may be a first message and the processor may be configured to receive a second message to the network if the paging information has been received by the WTRU. The second message may indicate a request to resume or establish a connection.

A WTRU may include a processor that may be configured to determine an SSB that meets an SSB criteria. The processor may determine an activation duration associated with the SSB and a resource associated with the SSB. The processor may send a message to a network using the resource if the activation duration associated with the SSB has elapsed. The message may indicate a beam associated with the SSB is to be used by the network for sending paging information. The processor may receive configuration information from the network. The configuration information may indicate a paging occasion associated with the SSB has been activated to the receive the paging information. The processor may receive, via the beam during the paging occasion, the paging information. The processor may determine that the SSB meets the SSB criteria if a signal measurement of the beam surpasses a threshold. The processor may determine a configuration associated with the SSB using a system information for the WTRU and determine the resource using the configuration. The processor may determine that the SSB is inactive if the SSB meets the SSB criteria and the activation duration has expired. The processor may determine a paging failure associated with the SSB. The message may be a first message and the processor may be configured to receive a second message to the network if the paging information has been received by the WTRU. The second message may indicate a request to resume or establish a connection.

A WTRU may include a processor that may be configured to determine that a synchronization signal and physical broadcast control channel block (SSB) that is inactive and that the SSB meets an SSB criteria. The processor may determine a monitoring duration that is associated with the SSB and a resource that is associated with the SSB. The processor may determine that the SSB has remained inactive when the monitoring duration has elapsed. The processor may send a message to a network using the resource. The message may indicate a beam associated with the SSB is to be used by the network for sending a paging information. The processor may receive a configuration information from the network. The configuration information may indicate a paging occasion associated with the SSB has been activated to receive the paging information. The processor may receive, via the beam during the paging occasion, the paging information. The processor may determine that the SSB meets the SSB criteria if a signal measurement of the beam surpasses a threshold. The processor may determine a configuration associated with the SSB using a system information for the WTRU and determine the resource using the configuration. The processor may determine that an activation duration associated with the SSB has expired. The processor may determine that the SSB is inactive if the SSB meets the SSB criteria and the monitoring duration has expired. The processor may determine a paging failure associated with the SSB. The message may be a first message and the processor may be configured to receive a second message to the network if the paging information has been received by the WTRU. The second message may indicate a request to resume or establish a connection.

BRIEF DESCRIPTION OF THE DRAWINGS

FIG. 12 shows an example of a WTRU procedure to support a feedback (e.g. a minimal feedback) enabled paging procedure by using the information of default, dynamic set of active SSBs, and a monitoring duration (e.g. a minimum monitoring duration) parameter.

FIG. 14 shows an example WTRU procedure to support a feedback (e.g. a minimal feedback) enabled paging procedure by using the information of default, a Retransmission (ReTx) Time (e.g. minimum Retransmission (ReTx) Timer), and a minimum monitoring duration (e.g. a minimum monitoring duration) parameter.

FIG. 15 shows an example showing the operation of PAR retransmission time and minimum monitoring duration for triggering a PAR for a suitable SSB.

DETAILED DESCRIPTION

Figure 1A:
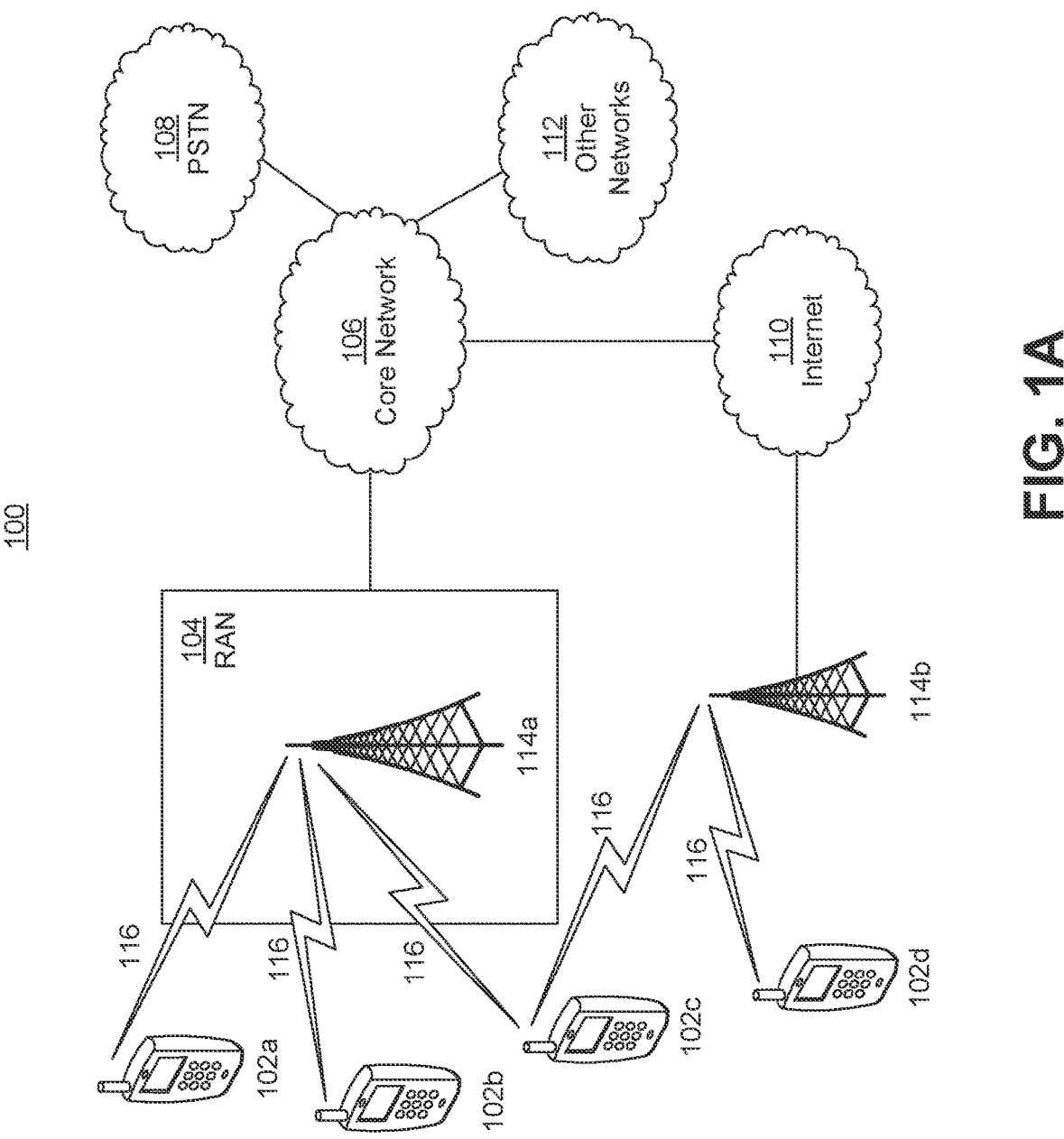
FIG. 1A is a system diagram illustrating an example communications system in which one or more disclosed embodiments may be implemented.

Systems, methods, and instrumentalities are described herein for paging for highly directional systems. A minimal feedback enable paging procedure may be provided. A WTRU may receive a default and/or a dynamic set of active synchronization signal and physical broadcast control channel blocks (SSBs), may indicate the beams/SSBs which may be used to receive paging information (e.g., downlink control information (DCI) (e.g. DCI scrambled with Paging Radio Network Temporary Identifier (P-RNTI))), and/or a message over a Physical Downlink Shared Channel (PDSCH).

A WTRU may utilize a default and/or dynamic set of active SSBs that may determine PDCCH monitoring occasions (PMOs) that may monitor in the WTRU's paging occasions (POs). A WTRU may send messages (e.g., paging activating requests) to a network to activate a suitable SSB using associated UL signal/resources, for example: if not any of the SSBs given in a configured default of active SSB (if any) is a suitable SSB for a WTRU; if not any of the SSB given in the active set of SSBs (e.g., dynamic information) received in the last minimum activate duration paging cycles is a suitable SSB for a WTRU; if a WTRU has not sent a paging activation request that may activate a SSB (e.g., the same SSB) in at least a last minimum paging activation request retransmission duration paging cycles; and if a WTRU monitors the PMOs associated with the SSB for last consecutive minimum monitoring duration paging cycles but has not received one or more (e.g., any) paging related DCI and paging message over those PMOs.

A WTRU may send one or more paging activation requests to activate multiple SSBs (e.g., a field of view (FOV) around a suitable SSB). Different priorities may be assigned to different SSBs (e.g., based on the DL measurements, mobility/orientation prediction, etc.). Different transmission techniques may be used (e.g., transmit (Tx) power level) in sending paging activation request to activate different SSBs with different priorities.

A WTRU may determine the mode mobility state (e.g., IDLE/INACTIVE mode) based on the rate of beam and/or cell reselection. A WTRU may send a paging activation request associated with the WTRU's mobility state. A WTRU may determine/update the value of the monitoring duration paging cycles (e.g., minimum monitoring duration paging cycles) based on the WTRU's mobility state. A WTRU may determine/update the value of the paging activation request retransmission paging cycles (e.g., minimum paging activation request retransmission paging cycles) based on the WTRU's mobility state.

A gNB may support a minimal feedback-based paging procedure. The minimal feedback-based paging procedure may dynamically activate a beam associated with the resource/resources used for the paging activation request, for a paging group (e.g., associated POs) of the WTRU, and for a minimum duration of minimum activation duration paging cycles. One or more downlink messages, including the identification of the newly/recently re-activated beams, may be sent to the associated WTRUs/paging group using the downlink control information (e.g., DCI scrambled with P-RNTI). The minimal feedback-based paging procedure may send DCI containing schedule information of paging message, DCI containing short message, and/or paging message over PDSCH to a paging group, for example. The active beams (e.g., default and dynamically activated beams) associated with the paging group may be used.

A gNB may configure the WTRUs with multiple values. For example, the multiple values may be for minimum activation duration, minimum paging activation request retransmission duration paging cycles, and/or minimum monitoring duration paging cycles based on a number of supported WTRU's mobility states. A gNB may dynamically activate a beam for a minimum duration of minimum activation duration paging cycles associated with a requesting WTRU's mobility state. A gNB may send one or more downlink messages containing the identification(s) of a number (e.g., all) the newly/recently (re-)activated beams to the associated WTRUs/paging group. A gNB may send one or more downlink messages with activation state indication(s) associated with the selected minimum activation duration for (e.g., each of) the newly/recently (re-)activated beams.

A dynamic DRX/paging cycle based paging procedure may be provided. A WTRU may receive a SSB pattern configuration including the set of SSBs (e.g., active SSBs) (e.g., beams/SSBs which may be used to receive a paging DCI and/or paging message) associated with POs (e.g., different POs). A WTRU may utilize the information of SSB pattern configuration(s) and suitable SSB/SSBs to determine POs/paging cycles to monitor. A suitable SSB, such as a suitable SSB for a WTRU, may be an SSB that meets a criteria. A WTRU may select a sub-set of (e.g., all) the POs/paging cycles to monitor for which the associated set of the configured SSB pattern includes the WTRU's suitable SSBs using parameters (e.g., at least one parameter). The parameters may be minimum paging cycle periodicity, minimum paging latency, and/or energy efficiency, etc.

A gNB may support a dynamic DRX/paging cycle based paging procedure by doing one or more of the following: determine SSB pattern(s) associated with paging groups (e.g., different paging groups) based on the arrival rate of paging requests at the gNB, the ratio of WTRUs transitioned to the connected state from the idle/inactive state via the gNB, WTRU density, coverage area, etc.; determine different (e.g., separate) SSB patterns based on the supported types/classes of the WTRUs; determine the PMO to SSB mapping for a PO, based on the number of (e.g., different) supported SSB sets over the PO; send a configuration of supported SSB patters (e.g., each with an associated pattern ID) and/or information of PMO to SSB mapping to the WTRUs; and send DCI including scheduling information of paging message, DCI including short message, and/or paging message over PDSCH in a PO to a paging group, using the beams (e.g., active beams) associated with the PO as configured in the SSB pattern for the paging group.

A WTRU may include a processor that may be configured to send a message to a network using a resource if one or more of a SSB meets an SSB criteria, an activation duration has elapsed, and a monitoring duration has elapsed. The resource may be associated with the SSB. The message may indicate a beam associated with the SSB is to be used by the network for sending paging information. The processor may receive a configuration information from the network. The configuration information may indicate a paging occasion associated with the SSB has been activated to receive the paging information. The processor may receive, via the beam during the paging occasion, the paging information. The processor may determine a configuration associated with the SSB using system information for the WTRU. The processor may determine one or more of the SSB criteria, the resource, the monitoring duration, and the activation duration using the configuration associated with the SSB. The processor may determine that the SSB meets the SSB criteria if a signal measurement of the beam surpasses a threshold. The processor may determine that the SSB is inactive if one or more of the SSB meets the SSB criteria, the active duration has expired, and the monitoring duration has expired. The processor may determine a paging failure associated with the SSB. The message may be a first message and the processor may be configured to receive a second message to the network if the paging information has been received by the WTRU. The second message may indicate a request to resume or establish a connection.

A WTRU may include a processor that may be configured to determine an SSB that meets an SSB criteria. The processor may determine an activation duration associated with the SSB and a resource associated with the SSB. The processor may send a message to a network using the resource if the activation duration associated with the SSB has elapsed. The message may indicate a beam associated with the SSB is to be used by the network for sending paging information. The processor may receive configuration information from the network. The configuration information may indicate a paging occasion associated with the SSB has been activated to the receive the paging information. The processor may receive, via the beam during the paging occasion, the paging information. The processor may determine that the SSB meets the SSB criteria if a signal measurement of the beam surpasses a threshold. The processor may determine a configuration associated with the SSB using a system information for the WTRU and determine the resource using the configuration. The processor may determine that the SSB is inactive if the SSB meets the SSB criteria and the activation duration has expired. The processor may determine a paging failure associated with the SSB. The message may be a first message and the processor may be configured to receive a second message to the network if the paging information has been received by the WTRU. The second message may indicate a request to resume or establish a connection.

A WTRU may include a processor that may be configured to determine that a synchronization signal and physical broadcast control channel block (SSB) that is inactive and that the SSB meets an SSB criteria. The processor may determine a monitoring duration that is associated with the SSB and a resource that is associated with the SSB. The processor may determine that the SSB has remained inactive when the monitoring duration has elapsed. The processor may send a message to a network using the resource. The message may indicate a beam associated with the SSB is to be used by the network for sending a paging information. The processor may receive a configuration information from the network. The configuration information may indicate a paging occasion associated with the SSB has been activated to receive the paging information. The processor may receive, via the beam during the paging occasion, the paging information. The processor may determine that the SSB meets the SSB criteria if a signal measurement of the beam surpasses a threshold. The processor may determine a configuration associated with the SSB using a system information for the WTRU and determine the resource using the configuration. The processor may determine that an activation duration associated with the SSB has expired. The processor may determine that the SSB is inactive if the SSB meets the SSB criteria and the monitoring duration has expired. The processor may determine a paging failure associated with the SSB. The message may be a first message and the processor may be configured to receive a second message to the network if the paging information has been received by the WTRU. The second message may indicate a request to resume or establish a connection.

The following abbreviations are provided:

BWP: Bandwidth Part

CMAS: Commercial Mobile Alert Service

CN: Core Network

DCI: Downlink Control Information

DL: Downlink

DRX: Discontinuous Reception

ETWS: Earthquake and Tsunami Warning System

FOV: Field of View

NR: New Radio

PAR: Paging Activation Request

PC: Paging Cycle

PCH: Paging Channel

PDCCH: Physical Downlink Control Channel

PDSCH: Physical Downlink Shared Channel

PF: Paging Frame

PMO: PDCCH Monitoring Occasions

PO: Paging Occasion

P-RNTI: Paging RNTI

RAN: Radio Access Network

RB: Resource Block

RNTI: Radio Network Temporary Identifier

RRC: Radio Resource Control

SSB: Synchronization Signal and Physical Broadcast Control Channel Block

UL: Uplink

5G-S-TMSI: 5G S-Temporary Mobile Subscription Identifier

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c*, and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
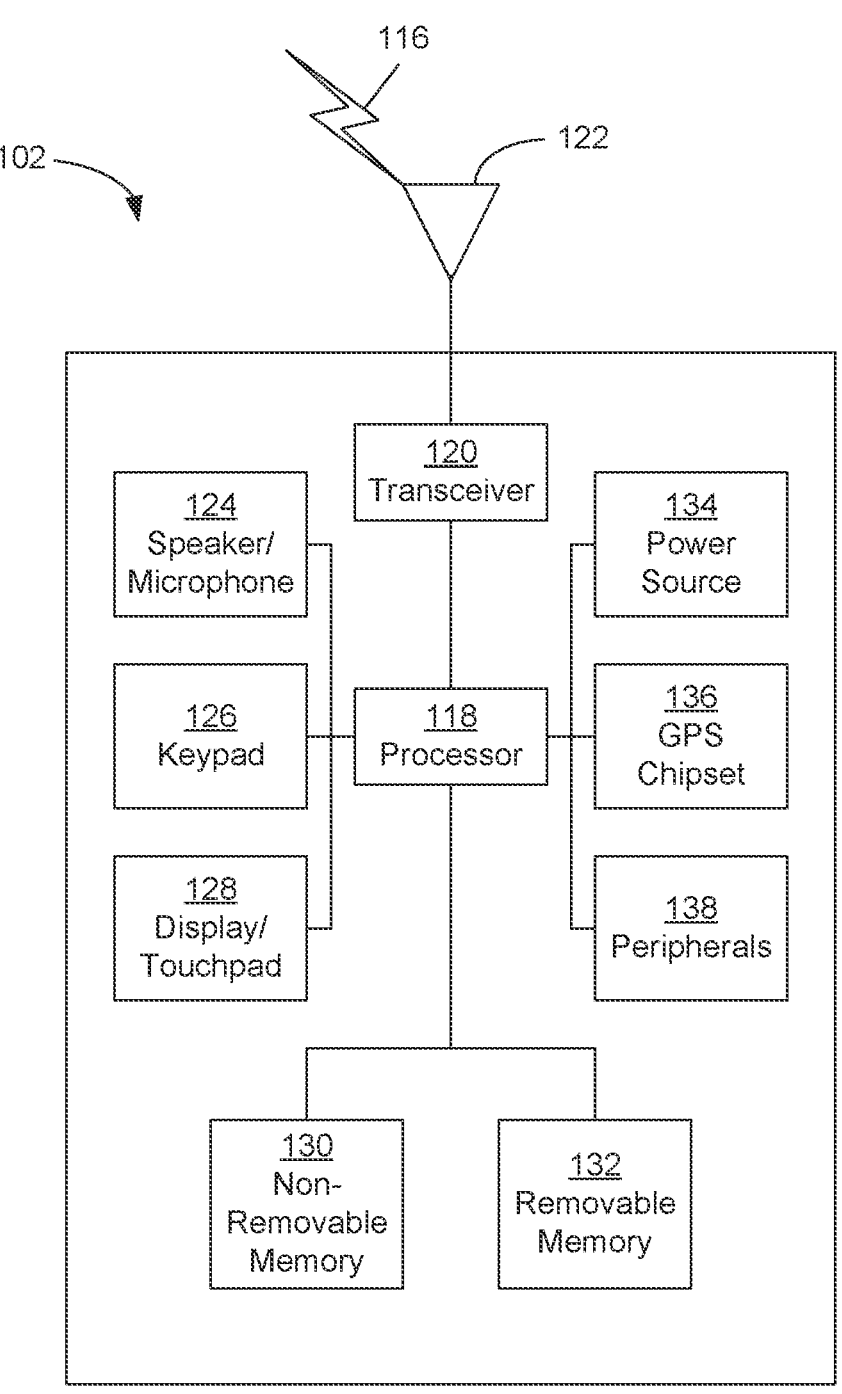
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
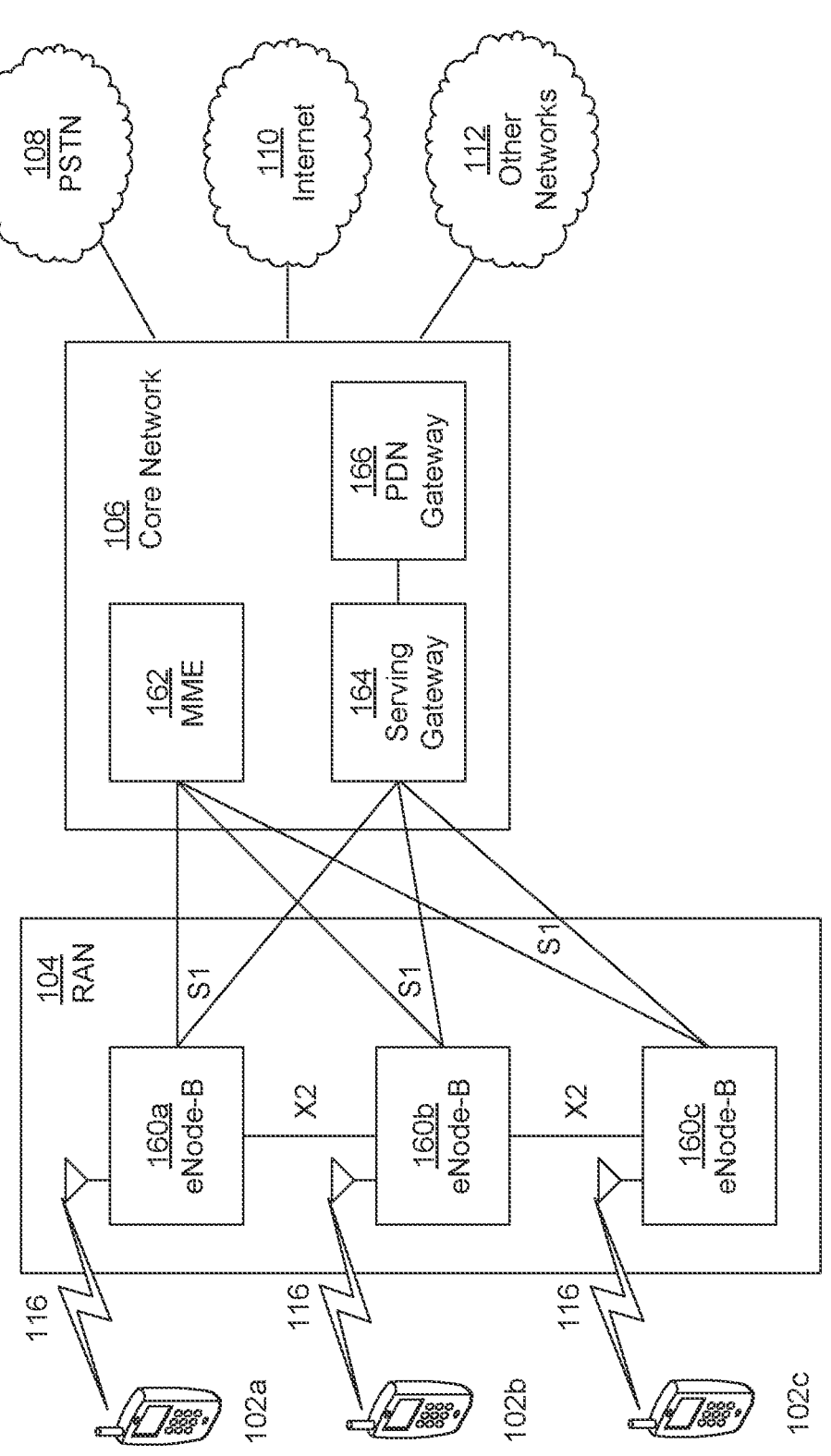
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
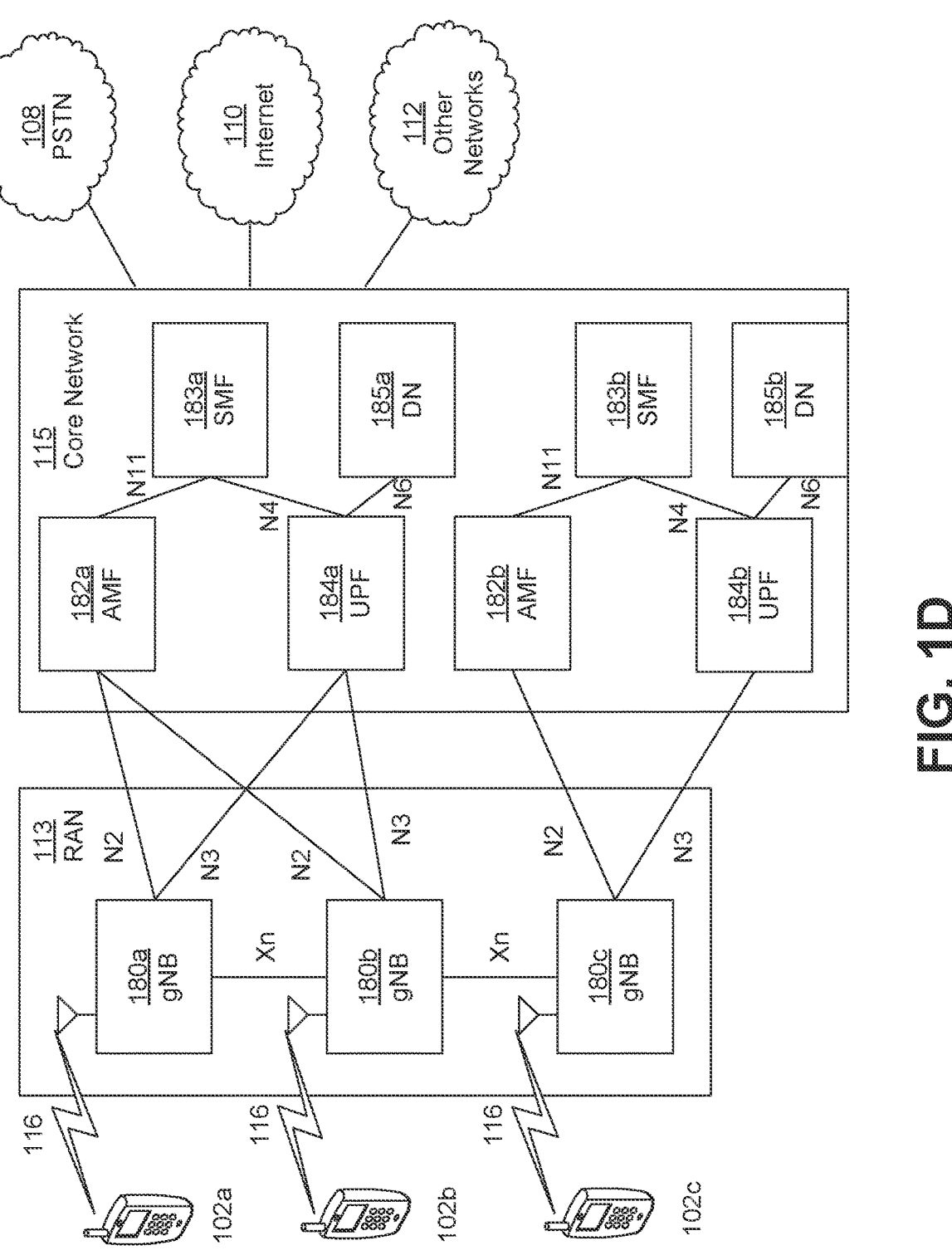
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A Paging Cycle (PC)/Discontinuous Reception (DRX) cycle may be provided. The number of radio frames in the cycle may be where a WTRU periodically monitors for a page. Cell-specific as well as WTRU-specific paging cycles may be configured, for example.

A Paging Frame (PF) may be provided. A PF (e.g., one PF) may be a radio frame (e.g., one radio frame), which may include one or multiple paging occasions (POs) or starting point of a PO, for example.

A PO may be a set of PDCCH monitoring occasions (PMOs) and may include one or more (e.g., multiple) time slots (e.g., subframe or OFDM symbol) where paging DCI (e.g., DCI 10 scrambled with P-RNTI) may be sent. In multi-beam operations, a WTRU may assume that the same paging message may be repeated in transmitted beams (e.g., all transmitted beams). In POs (e.g. each PO), one or more PMOs may be associated with one SSB, for example. A PO may consist of multiple PMOs associated with different SSBs supported by a gNB, for example. The selection of the beam(s) for the reception of the paging message may be up to WTRU implementation.

In a paging cycle (e.g., each paging cycle), the PO (e.g., the same PO) may be monitored by a group of WTRUs depending on their static or temporary WTRU-ID. Such a group may be referred to as a paging group (PG), which may be a group of WTRUs monitoring the same POs in the same PFs.

The WTRU may use DRX or PC in RRC_IDLE and RRC_INACTIVE state to reduce power consumption. The WTRU may monitor a one or more POs (e.g., one PO) per DRX cycle.

An IDLE/INACTIVE mode may be provided. In IDLE/INACTIVE mode, a PF (e.g. specific PF) and a subframe within that PF may be monitored. In examples, the PO that a WTRU may monitor for the paging may be determined based on the WTRU ID (e.g., WTRU_ID) and parameters which may be specified by the network. The parameters may include the PC length (e.g., in frames) which may be the same as or similar to a DRX cycle and another parameter. The parameters may enable (e.g., together may enable) the determination of the number of PF per PC and the number of PO per PF which may be in the cell. From the network perspective, there may be multiple PFs per PC and multiple POs within a PF, for example, and more than one subframe per PC may carry PDCCH masked with a P-RNTI. From the WTRU perspective, a WTRU may monitor a PO per paging cycle, and such a PO may be determined based on the parameters specified herein (e.g., above), which may be provided to the WTRU via system information, dedicated signaling information, and the like.

The WTRU may determine the PF and PO for paging by using the following formulae:

SFN for the PF may be determined by: (SFN+PF_offset) mod T=(T div N)*(UE_ID mod N)

Index (i_s), indicating the index of the PO may be determined by: i_s=floor (UE_ID/N) mod Ns, where:

T: DRX cycle of the WTRU (T may be determined by the shortest of the WTRU specific DRX value(s), if configured by RRC and/or upper layers, and a default DRX value broadcast in system information. In RRC_IDLE state, if WTRU specific DRX are not configured by upper layers, the default value may be applied).

N: number of total paging frames in T

Ns: number of paging occasions for a PF

PF_offset: offset used for PF determination

WTRU_ID: 5G-S-TMSI mod 1024

The PMOs for paging may be determined according to configured parameters pagingSearchSpace and firstPDCCH-MonitoringOccasionOfPO and nrofPDCCH- MonitoringOccasionPerSSB-InPO. If SearchSpaceId=0 configured for pagingSearchSpace, the PDCCH monitoring occasions for paging may be same as for RMSI.

If SearchSpaceId other than 0 is configured for paging-SearchSpace, the WTRU may assume that a PO (e.g., each PO) is a set of 'S*X' consecutive PMOs where 'S' is the number of transmitted SSBs (e.g., actual transmitted SSBs) determined according to ssb-PositionsInBurst in SIB1, for example, and X is the nrofPDCCH-MonitoringOccasion-PerSSB-InPO if configured or is equal to 1 otherwise, for example. The $[x*S+K]^{th}$ PMO for paging in the PO may correspond to the $K^{th}$ transmitted SSB, where x=0, 1, . . . ,X−1, K=1,2, . . . ,S. The PMOs for paging which may not overlap with UL symbols (e.g., determined according to tdd-UL-DL-ConfigurationCommon) may be sequentially numbered from zero starting from the first PMO for paging in the PF, for example. If firstPDCCH-MonitoringOccasion-OfPO is present, the starting PMO number of $(i\_s+1)^{th}$ PO may be the $(i\_s+1)^{th}$ value of the firstPDCCH-Monitorin-gOccasionOfPO parameter. Otherwise, the starting PMO number may be equal to i_s*S*X. If X>1. If the WTRU detects a PDCCH transmission addressed to P-RNTI within its PO, the WTRU may not be required to monitor the subsequent PDCCH monitoring occasions for this PO.

Parameters Ns, nAndPagingFrameOffset, nrofPDCCH-MonitoringOccasionPerSSB-InPO, and the length of default DRX cycle may be signaled in SIB1. The values of N and PF_offset may be derived from the parameter nAndPaging-FrameOffset. The parameter first-PDCCH-MonitoringOcca-sionOfPO may be signaled in SIB1 for paging in initial DL bandwidth part (BWP). For paging in a DL BWP other than the initial DL BWP, the parameter first-PDCCH-Monitorin-gOccasionOfPO may be signaled in the corresponding BWP configuration. If the WTRU has no 5G-S-TMSI, for instance when the WTRU has not yet registered onto the network, the WTRU may use as default identity WTRU_ID=0 in the PF and i_s formulas above. 5G-S-TMSI may be a 48-bit long bit string. 5G-S-TMSI may be in the formulae above be inter-preted as a binary number where the left most bit represents the most significant bit.

In a PO (e.g. each PO), the WTRU may monitor PMO(s) for the PDCCH for DL assignments on the PDCCH masked (e.g., DCI 10) with a P-RNTI (Paging RNTI) in IDLE/INACTIVE mode. Such DL assignment may include short message (e.g., may be used to indicate system information modification, ETWS/SMAS indication, and/or indication of stop monitoring the current PO), and/or scheduling/resource allocation information for Paging Channel (PCH), which may be carried on a PDSCH. A PDSCH, which may carry PCH, may be referred to as a PCH PDSCH or paging message over PDSCH.

DL assignment on the PDCCH may be the same for both IDLE mode paging (which may be referred to as CN initiated paging) and INACTIVE mode paging (which may be referred to as RAN initiated paging). In examples, if the WTRU detects a DL assignment using the P-RNT and finds that it includes the scheduling information for paging mes-sage over the PDSCH, the WTRU may demodulate the assigned PDSCH RBs and may decode the paging message carried on that PDSCH. The paging message may include paging record which may include WTRU-IDs of the WTRUs which may be paged. If the WTRU is in RRC IDLE state and finds its WTRU-ID in the paging record equivalent to its 5G-S-TMSI (e.g., CN-initiated Paging), it may forward the WTRU-ID to the upper layer (e.g., NAS), which may further initiate the process of RRC connection establish-ment. If the WTRU is in RRC INACTIVE state, and finds its WTRU-ID in the paging record equivalent to its full-RNTI (e.g., RAN-initiated paging), the WTRU may initiate the RRC connection resume procedure. If the WTRU is in RRC INACTIVE state, and finds its WTRU-ID in the paging record equivalent to 5G-S-TMSI (e.g., CN-initiated paging), it may move to RRC IDLE state and may inform NAS. If the WTRU may not find its WTRU-ID, it may go into sleep/power-saving mode.

If the WTRU detects a DL assignment using the P-RNTI including a short message of system information update, the WTRU may apply the system information acquisition procedure. If the stop paging monitoring indication is enabled in the short message, the WTRU may stop monitoring PMOs for paging in the current PO. If the WTRU is ETWS/CMAS capable, and the ETWS/CMAS indication is enabled in the short message, the WTRU may acquire the related system information block configured by the network.

A PG may be a group of WTRUs monitoring the same POs in the same PFs. DRX cycle and paging cycle may be used interchangeably herein to denote the RRC_IDLE or RRC_INACTIVE mode DRX cycle. Cell and gNB may be used interchangeably. PCH PDSCH, and paging message over PDSCH may be used interchangeably. SSB and beam may be used interchangeably herein. SSB and beam may be used interchangeably to represent a specific setting of spatial Tx parameters a gNB uses to perform a DL paging related (e.g., DCI scrambled with P-RNTI, paging message over PDSCH) transmission. A different setting of spatial Tx parameters at the gNB may be represented by a different (e.g., another) beam or SSB.

In a directional/multi-beam NR system, the paging message (e.g., the same paging message) may be transmitted over a number of beams (e.g., all of the beams) for a cell (e.g., each cell) in one or more tracking areas (CN-initiated Paging)/RAN areas (RAN-initiated Paging). In a cell (e.g. each cell), cost and complexity challenges may be deterrents to having simultaneous multiple transmissions across several beams. Paging transmissions may take place over different time slots, resulting in increased resource usage. The downlink resource overhead may increase (e.g., substantially increase) with the number of beam directions in beam sweeping. The network downlink resource overhead for NR based paging may exceed system capacity (e.g., >100%) to support high density of WTRUs in a system with a number of beams (e.g., 256 number of beams).

In higher frequency bands, e.g., sub-THz/THz bands, the number of beams (e.g., almost "laser-like" beams) used by a gNB to cover its coverage area may be higher (e.g., much higher) than the NR system operating at mmWave frequencies, for example. This may increase (e.g., significantly increase) the network resource overhead for paging, making paging procedures (e.g., efficient paging procedures) for a directional system (e.g., highly directional systems) more useful.

A minimal feedback enabled paging solution may be provided. An active set of SSBs/active SSB may be provided. In a cell, in a PO (e.g. each PO), one or more paging related information, which may include DCI containing scheduling information of paging message, DCI containing short message, and/or paging message over PDSCH, may be transmitted over a sub-set of total DL beams or SSBs supported by the gNB. The sub-set of such beams or SSBs may be represented or indicated by an active set of SSBs or an active SSB set or an enabled SSB set, for example, where a SSB (e.g. each SSB) of the active SSB set may be referred to as an active SSB, activated SSB, or enabled SSB. In a PO (e.g. each PO), the PMOs associated with the active SSBs may be used to transmit the one or more paging related information (e.g., which may be configured to be transmitted using active SSBs).

An active PMO may be provided. A PMO may be referred to as active if at least one of the SSBs associated with the PMO is active.

Suitable SSB/SSBs may be provided. One or more SSBs of a cell may be suitable SSB/SSBs for a WTRU, which may be based on a criteria, such as the WTRU's DL measurements over SSBs (e.g., corresponding DL beam) transmitted by the gNB. In examples, the criteria may be if a DL measurement parameter and/or threshold (e.g., the minimum DL measurement parameter and/or threshold) is satisfied at the WTRU, an associated reference signal received power (RSRP) that may meet or exceed a threshold, a reference signal strength indicator (RSSI) that may meet or exceed a threshold, and/or a characteristic measured over the SSB that may be above a minimum parameter and/or threshold (e.g., minimum RSRP/RSSI/SNR/SINR threshold). The minimum parameter and/or threshold may be configured to the WTRU.

A WTRU may monitor one PO per DRX cycle, for example. In a PO (e.g. each PO), the WTRU may monitor the PMO(s) associated with one or more of its suitable SSBs. In a PO (e.g. each PO), the WTRU may monitor the PMOs associated with an SSB (e.g., one of the WTRU's suitable SSBs). If the SSB may be an active SSBs for the WTRU's PO (e.g., the PO/POs which WTRU monitors) in the WTRU's current cell (e.g., the cell selected by the UE during its RRC INACTIVE/IDLE state), at least the paging related information may be configured to be sent using the active SSBs (e.g., only the active SSBs). The information of the active SSBs (or inactive SSBs, e.g., SSBs which are not active) of a cell may be communicated to the WTRU as a part of the initial paging configuration and/or as a dynamic DL configuration during the RRC-IDLE/RRC-INACTIVE state. The WTRU may send feedback (e.g., referred to as paging activation request herein) in RRC-IDLE/RRC-IN-ACTIVE state that may request to activate or enable one or more of its suitable SSBs in its current cell for which the WTRU may be configured with uplink (UL) resources.

Figure 2:
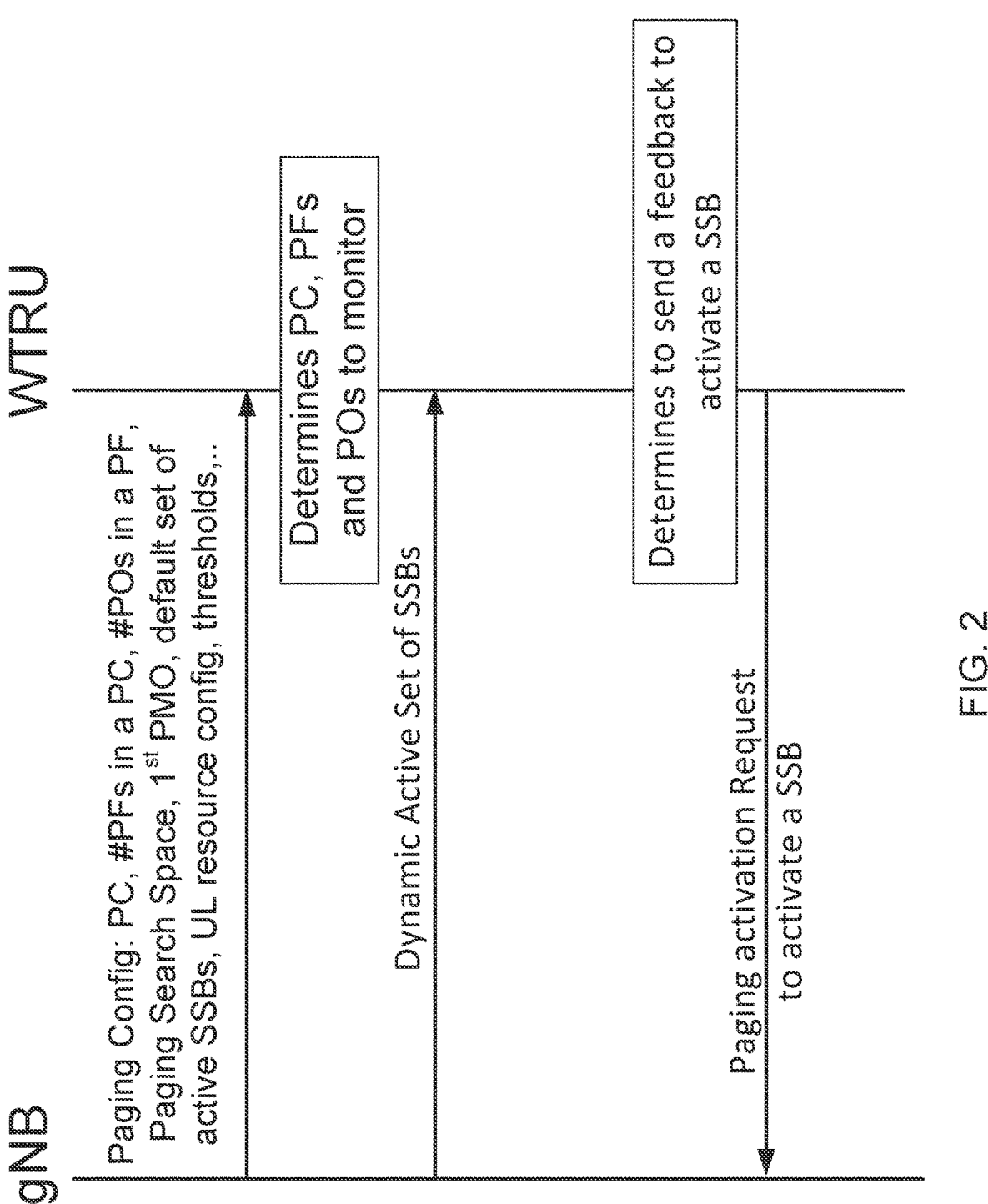
FIG. 2 shows an exemplary high-level overview of a feedback (e.g. minimal feedback) enabled paging procedure.

FIG. 2 shows an exemplary high-level overview of a feedback enable paging procedure (e.g., a minimal feedback enabled paging procedure) according to an example. The details of the signaling messages (e.g., each of the signaling messages) and the procedures is described in the following sections.

A set (e.g. a default set) of active SSBs may be provided. A WTRU may be configured with set of (e.g., a default set) of active SSBs. The set (e.g., default set) of active SSBs may include the identification of one or more SSBs, e.g., SSB IDs. The WTRU may assume that SSB/SSBs indicated in the set (e.g., default set) of active SSBs may be activated (e.g., active SSBs) in its POs.

The set (e.g., default set) of active SSBs may be paging group specific.

The WTRU may be configured with a list of sets (e.g., default sets) of active SSBs supported by the currently selected cell or gNB. In examples, the WTRU may also be configured with a set (e.g., default set) of active SSBs associated with the WTRU's POs or paging group. In examples, for a given list of sets (e.g., default sets) of active SSBs, the WTRU may determine the set (e.g., default set) of active SSBs associated with the WTRU's POs or paging group by using one or more of configured parameters including WTRU_ID, total number of PFs in DRX cycle, total number of POs for a PF, and/or total number of sets (e.g., default sets) of active SSBs supported by the cell/gNB.

The configuration of the list of sets (e.g., default sets) of active SSBs, and/or the set (e.g., default set) of active SSBs associated with the WTRU's paging, may be communicated to the WTRU by the network, or gNB or cell with one or more of the following described herein.

The configuration of the list of sets (e.g., default sets) of active SSBs, and/or the default set of active SSBs associated with the WTRU's paging group, may be communicated to the WTRU by the network in DL broadcast information, e.g., system information (e.g., SIB1). In examples, such configuration may be received as a part of the PCCH-Config in SIB1, or it may be received as a separate configuration in SIB1 or any other system information block.

The configuration of the list of sets (e.g., default sets) of active SSBs, and/or the default set of active SSBs associated with the WTRU's paging group may be communicated to the WTRU by the network using RRC or higher layer signaling. In examples, such configuration may be received in RRC release message (e.g., as a part of the suspend configuration or as a separate configuration) during the RRC CONNECTED state or it may be received in any other DL RRC message during the RRC CONNECTED state.

The configuration of the list of sets (e.g., default sets) of active SSBs, and/or the default set of active SSBs associated with the WTRU's paging group, may be communicated to the WTRU by the network in physical downlink control channel (e.g., using DCI) during the RRC CONNECTED state or IDLE or INACTIVE state, and/or in the downlink shared channel (e.g., using MAC-CE) during the RRC CONNECTED state, for example.

The configuration of the list of sets (e.g., default sets) of active SSBs, and/or the default set of active SSBs associated with the WTRU's paging, may be communicated to the WTRU by the network with the combination of one or more of the above methods. For example, the list of sets (e.g. default sets) of active SSBs may be communicated using the system information, and the default set of the active SSBs associated with the WTRU's paging group may be communicated using the RRC Release or downlink control channel or downlink shared channel during the RRC CONNECTED state, for example.

If the WTRU receives a configuration (e.g., of the list of sets (e.g., default sets) of active SSBs, or/and the default set of active SSBs) using one or more of the examples described herein, the WTRU may discard any of the old or the previous such configuration it may have received earlier for the same cell and may start using the latest configuration.

Indications using PMOs may be provided. A PO may be a set of consecutive PMOs. In a PO (e.g., each PO), there may be a PMO associated with one or more (e.g., each) of the SSBs supported by the gNB. In a PO (e.g., each PO), there may be one or more PMOs associated with one or more (e.g., each) of the SSBs supported by the gNB.

The network may (e.g., may also) configure a mapping, where in a PO (e.g., each PO), a PMO (e.g., each PMO) may be associated with one or more SSB. Time division multiplexing (e.g., over the POs) or frequency division multiplexing (e.g., within the same PMO) may be used to separate the transmissions of different SSBs using the same PMO in a PO (e.g., each PO).

The network may (e.g. may also) configure different mappings for different PMOs. In examples, one or more PMOs may have one-to-one association with the SSBs, one or more PMOs may have many-to-one association with the SSBs, and/or one or more PMOs may have one-to-many association with the SSBs.

The information of PMO to SSB mapping or SSB to PMO mapping may be implicitly or explicitly communicated to the WTRU. In examples, in case of many-to-one and one-to-many mapping between the PMOs and SSBs, the mapping information may be communicated to the WTRU using, e.g., system information, or RRC configuration, and/or any other lower or higher layer signaling during the RRC CONNECTED, IDLE and/or INACTIVE state.

In terms of a set (e.g., a default set) of active SSBs, the WTRU may be configured with a list of sets (e.g., default sets) of active PMOs and/or the set (e.g., default set) of active PMOs associated with the WTRU's paging group. A PMO may be referred to active if at least one of the SSBs associated with the PMO is active. A PMO (e.g., each PMO) may be assigned an identification (e.g., ID), and a set of PMOs may include the IDs of the associated PMOs. The information of PMO IDs of the default active PMOs may be communicated to the WTRU. In examples, if multiple PMOs are associated with a single SSB, the network may include one or more (e.g., all) the PMOs or sub-set of the PMOs associated with an active SSB (e.g., each active SSB) in the list of active set of PMOs. The WTRU may assume that the SSBs (e.g., all the SSBs) associated with an active PMO may be active.

In examples, if a PMO may be associated with multiple SSBs, the network may include indication of SSBs which may be active with one or more (e.g., each) of those PMOs. The WTRU may consider the sub-set of SSBs indicated for one or more (e.g., each) of the default active PMOs to be active. The sub-set of SSBs for a PMO may include SSB IDs or a bit-map may be used where the number of bits equals to the number of SSBs associated to the PMO with one bit specific to one or more (e.g., each) of the SSBs. If a bit is set to '1', that may mean that the corresponding SSB may be active. Otherwise not, for example.

The configuration of list of sets (e.g., default sets) of active PMOs, default set of active PMOs associated with the WTRU's paging group, and/or sub-set of active SSBs (e.g., for the PMOs which may be associated with multiple SSBs) may be communicated to the WTRU using one or more of the DL signaling/messages/channels including system information, RRC messages, downlink control signaling (e.g., DCI), downlink shared channel (e.g., MAC-CE), etc., during RRC CONNECTED, IDLE and/or INACTIVE state, for example.

In examples, for a given list of sets (e.g., default sets) of active PMOs, the WTRU may determine the set (e.g., default set) of active PMOs associated with the WTRU's POs or paging group by using one or more of configured parameters including WTRU_ID, total number of PFs in DRX cycle, total number of POs for a PF, and/or total number of sets (e.g., default sets) of active PMOs supported by the cell/gNB. In examples, if the value of the paging cycle for the WTRU is T, the number of total PFs in a DRX cycle is T1, the number of POs for a PF is T2, and the number of sets (e.g., default sets) of active PMOs is S1, then the index of the default set for the WTRU may be determined by: $(((SFN \, div \, (T \, div \, T1))*T2+i\_s) \, mod \, S1$, where SFN may be the SFN of the PF and the $i\_s$ may be the index of the PO determined by the WTRU using the examples mentioned herein, for example.

Configuration for paging an activation request may be provided. In order to enable dynamic activation and deactivation of SSBs in a PO, the WTRU may be configured with one or more UL control signals, which the WTRU may use to send feedback, e.g., paging activation request, during RRC IDLE/INACTIVE state to request to activate or enable one or more SSBs. The UL control signals may be for example, N-bit (where N>=1) reference sequences or signatures or preambles, etc., which may be designed using PN sequences, Zadoff-Chu sequences, etc.

In examples, the WTRU may be configured with one or more UL time-frequency resources (e.g., resource blocks), which the WTRU may use to send its paging activation requests (e.g., using the configured UL control signal) during RRC IDLE/INACTIVE state to request to activate or enable one or more SSBs. Such UL resources may be configured with periodic or aperiodic or semi-static/semi-persistent allocation. In examples, periodic UL resources may be allocated in a DRX cycle (e.g., each DRX cycle) for the WTRU.

SSB/Paging group specific paging activation request resources may be provided. SSB(s) and/or paging group(s) specific UL control signal(s) and/or the UL resource(s) may be configured or allocated to enable paging activation requests.

Allocation of UL control signals or/and the UL resources for paging activation requests may be SSB specific in one of the following examples.

In examples, there may be one-to-one association between the SSBs and the UL control signals. An SSB (e.g. each SSB) may be associated with a dedicated UL control signal (e.g., dedicated reference signal or signature or preamble). In examples, if the gNB receives an UL control signal from a WTRU, the gNB may activate the SSB associated with the received UL control signal. A common or dedicated UL time-frequency resource to one or more (e.g. each) of the SSBs may be configured to be used to transmit the dedicated UL control signal associated with the SSB.

In examples, there may be one-to-one association between the SSBs and the UL time-frequency resources. A SSB (e.g., each SSB) may have a dedicated time-frequency resource allocated. In examples, if the gNB receives an UL control signal from a WTRU, the gNB may activate the SSB associated with the UL resource on which the UL signal was received. A common or dedicated UL control signal may be configured to one or more (e.g., each) of the SSBs to be used in the dedicated time-frequency resource associated with the SSB.

In examples, an SSB set including one or more SSBs may be provided. Multiple SSB sets, where an SSB (e.g., each SSB) set may include a different set of SSBs, may be provided. A many-to-one association may be between the SSBs, and the UL control signals. One UL control signal may be associated with one or more SSB (e.g., a set of SSBs). In examples, an SSB set may have a dedicated UL control signal associated with it. If the gNB receives an UL control signal from a WTRU, the gNB may activate one or more of (e.g., all) the SSBs of the SSB set associated with the received UL control signal. A common or dedicated time-frequency resource may be allocated for the different SSB sets.

In examples, there may be many-to-one association between the SSBs and the UL time-frequency resources. One UL time-frequency resource may be associated with more than one SSB (e.g., a set of SSBs). If the gNB receives an UL control signal from a WTRU, the gNB may activate all the SSBs of the SSB set associated with the UL resource on which the UL signal was received. A common or dedicated UL control signal may be configured for the different SSB sets.

In examples, there may be one-to-many association between the SSBs and the UL control signals. Multiple UL control signals may be associated with one or more (e.g., each) of the SSBs. In examples, the WTRU may use one or more of the multiple UL control signals associated with an SSB to activate that SSB. A common or dedicated UL time-frequency resource to one or more (e.g., each) of the SSBs may be configured to be used to transmit the any of the dedicated UL control signals associated with the SSB.

In examples, there may be one-to-many association between the SSBs and the UL time-frequency resources. Multiple UL time-frequency resources may be associated with one or more (e.g. each) of the SSBs. In examples, the WTRU may use one or more of the multiple UL time-frequency resources associated with an SSB to activate that SSB. A common or dedicated UL control signal may be configured to one or more (e.g. each) of the SSBs to be used in the dedicated time-frequency resources associated with the SSB.

Allocation of UL control signals and/or the UL resources may be PMO specific, e.g., in one-to-one or one-to-many or many-to-one fashions similarly as described above. In examples, if the gNB receives a paging activation request with a specific UL control signal/UL resource from a WTRU, the gNB may activate one or more (e.g., all) of the SSBs associated with the PMO associated with the received paging activation request.

Allocation of UL control signals and/or the UL resources for paging activation requests may be paging group specific. One-to-one or many-to-one association or one-to-many may be between the paging groups and the UL control signals or/and UL resources. In examples, in one-to-one association, a paging group (e.g., each paging group) may have a dedicated UL control signal (e.g., signature or reference sequence or preamble, etc.) and/or a dedicated UL time-frequency resource associated to it. In many-to-one association, a dedicated UL control signal (e.g., signature or reference sequence or preamble, etc.) and/or a dedicated UL time-frequency resource may be associated to the multiple paging groups. In one-to-many association, a paging group (e.g., each paging group) may have multiple associated dedicated UL control signals (e.g., signatures or reference sequences or preambles, etc.) and/or multiple associated dedicated UL time-frequency resources. If the gNB receives an UL control signal, the gNB may activate the appropriate SSB/SSBs (e.g., as described above) for the POs of the paging group (e.g., in one-to-one/one-to-many mapping) or paging groups (e.g., in many-to-one mapping) associated with UL control signal and/or the UL resource used to transmit the UL control signal, for example.

Configuration parameters may be provided. The configuration to enable paging activation requests including UL control signals related parameters, UL time-frequency resources, and/or mapping details may be communicated to the WTRU using one or more of system information (e.g., SIB1 along with or without the PCCH config), RRC message (e.g., RRC Release message), downlink control signaling (e.g., DCI), and/or downlink shared channel (e.g., MAC-CE) during UE's RRC CONNECTED, IDLE, and/or INACTIVE state. If the WTRU receives a configuration (e.g., UL control signals, UL time-frequency resources, or/and mapping details) using one or more of the methods described herein, the WTRU may discard any of the old or the previous such configuration it may have received earlier for the same cell and may start using the latest configuration.

The configuration of UL control signals related parameters may include one or more of parameters used to generate sequences/signatures/preambles, e.g., sequence-length, cyclic-shift, root sequence ID, cyclic prefix length, guard interval, etc.

The configuration of UL time-frequency resources may include parameters such as time-domain allocation, frequency-domain allocation, periodicity, and total time duration or number of periods.

The time-domain allocation may include one or more of: starting symbol, total number of symbols over one or more slots, symbol indices in a slot (e.g., each slot), number of symbols allocated to a single resource, etc.

The frequency-domain allocation may include one or more of starting PRB/RE, total number of REs/PRBs, bandwidth span (e.g., min and max frequency or starting and ending PRB indices), and/or number of REs/PRBs allocated to a single resource, etc.

The periodicity (e.g., in case of periodic resource allocation) in terms number of symbols/slots/subframes/DRX cycles etc., over the given time-frequency resource configuration, may be repeated.

The total time duration or number of periods (e.g., in case of semi-static/persistent resource allocation) over the given UL resource configuration may be allocated.

The mapping details may include the information on the mapping of the UL resources (e.g., UL control signals or/and UL time-frequency resources) to the SSBs/PMOs, and/or paging groups. In examples, the mapping details may include association between UL signals/resources and SSBs/PMOs, and/or paging groups. The mapping details may (e.g., may also) include information on mapping methods that may be applied to the multiple allocated resources to identify the specific resource/resources associated with one or more (e.g. each) of the SSBs/PMOs, and/or the WTRU's paging group. In examples, in case of multiple (e.g., a set of) allocated time-frequency resources, which span over different symbols/slots in time and different REs/PRBs in frequency, mapping methods for the UL resource to SSB association may specify the order (e.g., frequency-first or time-first) which the WTRU may follow and identify the resource associated with one or more (e.g. each) of the SSBs.

In examples, the WTRU may be configured with parameter 'X' which may indicate the number of UL time-frequency resources per SSB per DRX cycle, parameter 'N=X*S' which may indicate number of UL time-frequency resources in a DRX cycle (e.g., each DRX cycle), where S may be the number of total SSBs supported by the gNB, and a common UL signature. The WTRU may assume that [x*S+K]th UL resource corresponds to the Kth SSB, where x=0,1, . . . X−1, K=1,2, . . . S.

For the given sets of UL time-frequency resources, the WTRU may determine the set of resources associated with the WTRU's POs or paging group by using one or more of configured parameters including WTRU_ID, total number of PFs in DRX cycle, total number of POs for a PF, and/or total number of sets of resources allocated by the cell/gNB.

Dynamic downlink information of active set of SSBs may be provided. The gNB may activate or de-activate one or more SSBs dynamically. In examples, the gNB may dynamically activate or de-activate one or more of non-default active SSBs (e.g., which are not in the default set of active SSBs). Activation of an SSB may occur, for example, due to an UL request (e.g., using an associated paging activation request described above in the previous section, more details on this are also given below in the next section). Activation of an SSB may occur due to any other reasons, for example, if the core network (e.g., CN-initiated paging) gNB (e.g., RAN-initiated paging) experiences high paging latency for one or more WTRUs. Activation of an SSB may enable activation of additional one or more inactive SSBs at one or more gNBs (e.g., in one or more tracking areas or radio network areas). Deactivation of an SSB may occur if the gNB does not receive any UL request (e.g., paging activation request) associated with the SSB for a longer time period (e.g., for a number of paging cycles or system frames or slots, etc.). In examples, deactivation of an SSB may occur based on some additional information received by one or more WTRUs transitioned from IDLE/INACTIVE state to CONNECTED state at the gNB, where a WTRU may indicate the beam/beams requested by the WTRU for activation along with the information when (e.g., which paging cycle) the request was made. In examples, activation of additional SSBs or deactivation of an SSB at one or more gNBs may occur using the information of WTRU distribution over a coverage area/tracking area/radio network area.

The dynamic information of active set of SSBs may include the identification of the active SSBs (e.g., SSB IDs), which may or may not include the information of the SSBs included in default set of active SSBs.

The active (or inactive) set of SSBs may be different for different paging groups. In examples, activation of different SSBs may be enabled based on the different paging activation requests from the WTRUs of different paging groups. The active (inactive) set of SSBs of a paging group may be different at different POs. In examples, activation of different SSBs may be enabled based on the different paging activation requests at different time instants from the WTRUs of that paging group.

The information of active or inactive set of SSBs may be communicated to the WTRU in one or more of the following examples.

Using downlink control information may be provided. In examples, the WTRU may receive the information of active (or inactive) set of SSBs associated with the WTRU or the WTRU's paging group in downlink control channel or DCI masked or scrambled (e.g., CRC scrambled) with P-RNTI during its PO in the RRC IDLE/INACTIVE state. In examples, in one or more POs, DCI 10 with CRC scrambled by P-RNTI may be used to send the information of an active set of SSBs over the active SSBs. An indicator, e.g., short message indicator, may indicate if the DCI10 is containing an active set of SSBs (short message indicator: 00) or scheduling information for paging (short message indicator: 01) or short message (short message indicator: 10) or both scheduling information for paging and short message (short message indicator: 11). Additional bits may be used for the indicator (e.g., short message indicator) to enable additional indications, both scheduling information and active set of SSBs, both short message and active set of SSBs, and/or all including scheduling information, active set of SSBs and short message. If the indicator is set to the bits associated with the presence of active set of SSBs in the remaining message, the DCI may contain at least the active set of SSBs.

In examples, for a paging group (e.g., each paging group), the gNB may send DCIs containing the information of active sets of SSBs in an aperiodic fashion. In examples, whenever a new SSB is activated, e.g., based on the paging activation request received from one or more WTRUs, the gNB may send a DCI containing the information of newly activated SSB/SSBs or information including the currently active SSBs, along with newly activated SSBs over the active SSBs including the newly activated SSB/SSBs.

In examples, for a paging group (e.g., each paging group), the gNB may send DCIs containing the information of the active set of SSBs in a periodic fashion (e.g., period set to a multiple integer of the paging cycle, where the integer>=1).

For a paging group (e.g., each paging group), if in a PO, if DCI containing the information of the active set of SSBs are to be sent, such DCIs may be sent over the PMOs associated with the active SSBs in the PO. Such DCIs may be sent over the all the PMOs associated with both active and inactive SSBs, for example.

In examples, the active set of SSBs may be sent along with other paging related control information, e.g., short message and/or paging scheduling information in the same DCI. The information of the active set of SSBs may be or may not be sent whenever a gNB may transmit one of the other paging related control information (e.g., short message or/and paging scheduling) which may be combined with the information of the active set of SSBs.

In examples, (e.g., instead of active set of SSBs), the information of active set of PMOs (e.g., including the IDs of active PMO) may be sent. If multiple PMOs are associated with an SSB, the network may include one or more of (e.g., all) the PMOs or sub-set of the PMOs associated with an active SSB (e.g., each active SSB) in the list of active set of PMOs. The WTRU may assume that one or more of (e.g., all) the SSBs associated with the one or more the active PMOs are active. If a PMO is associated with multiple SSBs, the network may include indication of sub-set of SSBs which may be active with one or more (e.g., each) of such PMOs. The sub-set of SSBs for a PMO may include SSB IDs or a bit-map may be used where the number of bits equals to the number of SSBs associated to the PMO with one bit specific to one or more (e.g., each) of the SSBs. If a bit is set to '1' that may mean that the corresponding SSB is active. Otherwise not, for example.

In examples, (e.g., instead of sending the information of all the active (or inactive) SSBs or PMOs of a PO over all the associated active PMOs or all the PMOs), the information of active and/or inactive SSB/SSBs associated with a PMO may be sent independently/separately over the corresponding PMO. The information of active/inactive SSB/SSBs may be indicated by the SSB-IDs or using bit-map. In examples, if a PMO (e.g., each PMO) is associated with one SSB, in the bitmap based procedure one bit may be sent to indicate if the PMO (e.g., or SSB associated with the PMO) is active (bit is set to '1') or inactive (bit is set to '0'), for example. This information may be combined with other paging related control information over DCI or may be sent separately (e.g., in periodic or aperiodic fashion) as described herein. In examples, in a PMO, in order to send the DCI containing bit-map of active/inactive SSBs in an aperiodic fashion, the gNB may send such DCI if an additional SSB is activated or an active SSB is deactivated from the SSBs associated with the PMO.

The bit-map information (e.g., on the active/inactive SSBs) of a PMO may also be sent as a short message (e.g., other than system information modification, ETWS and CMAS indication, stop paging monitoring, etc.) in DCI 10. In examples, few bits may be used in the short message to indicate the bit-map of the active/inactive SSBs.

In examples, a DCI (e.g., a new DCI) and/or an identity (e.g., a new identity, which may be used to scramble the DCI), such as DCI 10 scrambled with an identity (e.g., a new identity, which may be other than P-RNTI), or a DCI (e.g., a new DCI) scrambled with P-RNTI or with an identity (e.g., a new identity, which may be other than P-RNTI), may be configured to send the information of active SSBs/PMOs during the RRC IDLE/INACTIVE state.

Using downlink shared channel may be provided. The WTRU may be configured to receive the information of active set of SSBs/PMOs associated with its paging group over the downlink shared channel (e.g., PDSCH).

In examples, the WTRU may be configured to receive the information of active set of SSBs/PMOs within the PCH (e.g., including the paging message) carried over PDSCH. In examples, the information of active set of SSBs or PMOs may be received within the paging message along with other information, e.g., paging record, etc. In examples, whenever the WTRU detects a DCI 10 scrambled with P-RNTI, the WTRU may demodulate the assigned PDSCH RBs and may decode the paging message carried on the PDSCH to retrieve the information of active set of SSBs/PMOs along with the other information.

In examples, the information of active set of SSBs/PMOs may be sent over PDSCH independently or separately from the paging message. The DCI 10 scrambled with P-RNTI may include the resource allocation/scheduling information (e.g., frequency domain resource assignment, time domain resource assignment, modulation, and coding scheme, etc.) over the PDSCH. An indicator, (e.g., short message indicator, in the DCI 10) may be used to indicate the resource allocation/scheduling information over PDSCH (e.g., given in the DCI 10) is for the paging message or for the information of active set of SSBs/PMOs, or for both. In examples, short message indicator bits in DCI 10 may be set to 000 if DCI10 contains short message, 001 if DCI10 contains the scheduling information for paging message, 010 if DCI10 contains the scheduling information for active set of SSBs/PMOs, 011 if DCI10 contains both short message and scheduling information for paging message, 100 if DCI10 contains both short message and scheduling information for active set of SSBs/PMOs, 101 if DCI10 contains scheduling information for both paging message and active set of SSBs/PMOs, 110 if DCI10 contains short message and scheduling information for both paging message and active set of SSBs/PMOs.

In examples, a DCI (e.g., a new DCI) and/or an identity (e.g., a new identity, which may be used to scrambled the DCI), such as DCI 10 scrambled with an identity (e.g., a new identity, which may be other than P-RNTI) or a DCI (e.g., a new DCI) scrambled with P-RNTI or with an identity (e.g., a new identity, which may be other than P-RNTI), may be configured to send the scheduling information of PDSCH where the information of active SSBs/PMOs may be decoded.

Using system information may be provided. The WTRU may be configured to receive the information of active set of SSBs/PMOs associated with its paging group via system information (e.g., SIB1 or SIB2, etc.).

From the gNB perspective, if the gNB sends the information of active set of SSBs/PMOs (e.g., if a SSB is activated/deactivated for one or more paging groups or due to some reason, e.g., periodic transmissions), it may send a system information modification indication (e.g., in short message using DCI 10 scrambled with P-RNTI) to one or more paging groups (e.g., to the paging groups for which the information of active set of SSBs is updated or to all the paging groups) over the associated active PMOs or on all the PMOs (e.g., in the case when the system information modification indication is configured to be sent over all the PMOs).

If the WTRU receives a system information modification indication, it may initiate the system information acquisition procedure.

Using RRC message may be provided. The WTRU may receive information of currently active sets of SSBs/PMOs of the serving cell associated with the WTRU's paging group in the RRC message. In examples, such information may be sent within the RRC Release message to the WTRU just before it moves to the RRC IDLE or RRC INACTIVE state.

An activation duration (e.g., a minimum activation duration) may be provided. A minimum activation duration may be referred as minimum activation duration paging cycles herein. A minimum activation duration or 'ON' duration, e.g., in terms of number of paging cycles/slots/frame/symbols, may be configured to the WTRU, which may indicate the minimum duration over which a dynamically activated SSB may be active after receiving the dynamic information associated with the SSB from the gNB. The WTRU may maintain an activation duration count or time (e.g., via a timer or counter) for a SSB (e.g., each SSB not given in the default set of active SSBs). If dynamic information includes an SSB that is received, the WTRU may set/initiate/update the activation duration count/time (e.g., via a timer or counter) of that SSB to the minimum activation duration value.

An offset (e.g. a maximum offset) may be provided. A maximum offset may be to indicate the maximum duration (e.g., in terms of number of paging cycles/slots/symbols) between sending a paging activation request to activate an SSB and receiving a dynamic information of active SSBs including at least the information of requested SSB. In examples, if after sending a paging activation request for an SSB, the dynamic information of active SSBs including the requested SSB is not received within the maximum offset, the WTRU may re-send the paging activation request for the same SSB. The configuration of fixed or maximum offset may be communicated to the WTRU.

Dynamic activation of beam(s)/SSB(s) using paging activation requests may be provided. The WTRU may be configured with paging related parameters which may include one or more of: paging cycle, number of PFs in a paging cycle, PF offset, number of POs in a PF, paging search space, PMO related parameters which may include, first PMO, mapping between PMOs and SSBs, etc. The WTRU may (e.g., may also) be configured with a set (e.g. a default set) of active SSBs/PMOs and/or active set of SSBs/PMOs (e.g., from the SSBs that may not be in the set and/or the default set).

The WTRU may monitor a PO in a paging cycle (e.g., each paging cycle). In a PO (e.g., each PO), the WTRU may monitor for a paging related DCI (e.g., DCI 10 scrambled with P-RNTI) over one or more PMOs associated with the WTRU's one or more suitable SSBs.

In a PO (e.g., each PO), the WTRU may monitor for a paging related DCI over one or more PMOs associated with one or more active SSBs, at least for the paging related information which may be configured to be sent using the active SSBs. The information of active SSBs may be known by the WTRU based on configuration of active set of SSBs (if any), including the default set of active SSBs. The WTRU may have been received from the gNB. The WTRU may (e.g., may also) be configured with which paging related information may be sent using the active SSBs and/or which paging related information may be sent using the SSBs (e.g., all the SSBs). In examples, paging DCI with system information modification indication may be configured to send using one or more of (e.g., all) the SSBs, whereas, paging DCI containing the scheduling information of the paging message may be sent using the active SSBs.

In a PO (e.g., each PO), at least for the paging related information, which may be configured to be sent using the active SSBs, the WTRU may monitor for a paging related DCI over one or more PMOs associated with one or more SSBs if the SSBs are WTRU's suitable SSBs and are active SSBs (e.g., based on the configuration information of active set of SSBs (if any), including the default set of active SSBs, the WTRU may have been received from the gNB).

The WTRU may be configured with resources (e.g., UL control signals and UL time-frequency resources) for paging activation requests which may be used during the RRC IDLE/INACTIVE state to request for activation of one or more SSBs. The resources for paging activation requests may be SSB/PMO, and/or paging group.

Conditions to trigger paging activation request(s) may be provided. The WTRU may send one or more paging activation requests to activate an SSB. A paging activation request may be sent using the configured UL resources associated with the SSB and may be activated and/or associated with WTRU's paging group (e.g., if such association is configured). In examples, a paging activation request may be sent using the configured UL resources associated with the PMO which may be associated with the SSB and may be activated and/or associated with WTRU's paging group (e.g., if such association is configured). The association may be configured by allocating a specific UL control signal or/and a specific UL time-frequency resource. In examples, if the WTRU requests to activate SSB 'k', it may use the UL resource associated with the SSB 'k' or the corresponding PMO (e.g., the PMO associated with SSB 'k') from the resources associated with the WTRU or WTRU's paging group.

The WTRU may send one or more paging activation requests to activate a WTRU's suitable SSB, whether the SSB is active or is not active. The WTRU may determine if an SSB is active or not, for example, based on configuration of active set of SSBs (if any), including the default set of active SSBs. The WTRU may have been received from the gNB.

The WTRU may send one or more paging activation requests to activate an SSB, e.g., SSB 'k', if at least one or more of the following conditions are met. Examples of the one or more conditions may include, but are not limited to, the examples that follow below:

Condition 1: If the SSB (e.g., SSB 'k') is a suitable SSB for the WTRU (e.g., the SSB may be a suitable SSB if it may meet a criteria).

Condition 2: If the WTRU is configured with a default set of active SSBs for the current cell, a default set of active SSBs is associated with the WTRU's paging group, and the WTRU determines that not any of the SSBs given in the configured default set of active SSBs are a WTRU's suitable SSB. This condition may be checked when the SSBs given in the default set of active SSBs may be active irrespective of dynamic set of active SSBs.

Condition 3: If the WTRU has received the dynamic information of active set of SSBs one or more times for the current cell, e.g., the dynamic information of active set of SSBs associated with WTRU's paging group, and the WTRU determines that not any of the SSBs given in the configured active set of SSBs received in the last 'M1' number of paging cycles or frames or slots or symbols, etc., is a WTRU's suitable SSB, where the value of 'M1 (>=0)' threshold is configured to the WTRU, e.g., via system information (e.g., SIB1), higher layer signaling such as RRC signaling (e.g., RRC Release message), downlink control information (DCI), or downlink shared channel (e.g., MAC-CE) etc. In examples, M1 may be set to a minimum activation duration paging cycles as described herein, a minimum number of paging cycles over which a dynamically activated SSB is kept active by the gNB after receiving a paging activation request to activate the SSB.

Condition 4: If the WTRU has not sent a paging activation request to activate the SSB 'k' in at least last 'M2' number of paging cycles or frames or slots or symbols, etc., where the value of 'M2 (>=0)' threshold is configured to the WTRU, e.g., via system information (e.g., SIB1), higher layer signaling such as RRC signaling (e.g., RRC Release message), downlink control information (DCI), or downlink shared channel (e.g., MAC-CE) etc. In examples, M2 may be a minimum paging activation request retransmission duration paging cycles, a minimum number of paging cycles for the WTRU to wait before transmitting a paging activation request for the same SSB. In examples, the value of M2 may be associated with the measurement quality of the SSB for which the paging activation request needs to be made. The WTRU may be configured with values (e.g., multiple) of M2 to be used based on the measured quality (e.g., RSRP) of an SSB.

Condition 5: If the WTRU has monitored the PMOs associated with the SSB 'k' for last at least 'M3' number of consecutive paging cycles or POs associated with WTRU's paging group, and the WTRU has not received any paging related DCI (e.g., DCI 10 scrambled with P-RNTI) and paging message over those PMOs, where the value of 'M3 (>=0)' threshold may be configured to the WTRU, e.g., via system information (e.g., SIB1), higher layer signaling such as RRC signaling (e.g., RRC Release message), downlink control information (DCI), or downlink shared channel (e.g., MAC-CE) etc. In examples, M3 may be a minimum monitoring duration paging cycles, a minimum number of paging cycles the WTRU may monitor before sending a paging activation request for an SSB.

In examples, if some of the paging related DCI may be sent over one or more of (e.g., all) the PMOs/SSBs (e.g., including both inactive and active SSBs/PMOs), one or more short messages such as system information update may be configured to be sent over the PMOs/SSBs (e.g., all the PMOs/SSBs), the condition may be described as: the WTRU has monitored the PMOs associated with the SSB 'k' for last at least 'M3' number of consecutive paging cycles or POs associated with WTRU's paging group, and the WTRU has not received a paging related DCI (e.g., which is configured to be sent on the active set of SSBs/PMOs, DCI containing the scheduling information of paging message, and/or DCI containing the active set of SSBs), and paging message (e.g., if configured to be sent over the active set of SSBs/PMOs) over those PMOs.

The WTRU may be configured by the network with one or more conditions out of the condition 1, condition 2, condition 3, condition 4, and condition 5 that may be used to determine if there is a request to send a paging activation request to activate an SSB.

In a paging cycle, if the WTRU determines to activate an SSB, the WTRU may send a paging activation request using the UL resource associated with the SSB or the corresponding PMO (e.g., PMO associated with the SSB) out of the specific/common resources configured for the WTRU or the WTRU's paging group, if such UL time-frequency resource is available during that paging cycle.

After sending a paging activation request associated with an SSB, the WTRU may monitor the PMO associated with that SSB for at least one paging cycle, e.g., current paging cycle. If condition 4 is requested to be satisfied, after sending a paging activation request associated with an SSB, the WTRU may monitor the PMOs associated with the SSB in one or more of next M2 (e.g., minimum paging activation request retransmission duration paging cycles) number of paging cycles, e.g., in one or more of next M2 number of paging cycles when the SSB is the WTRU's one of the suitable SSBs.

Figure 3:
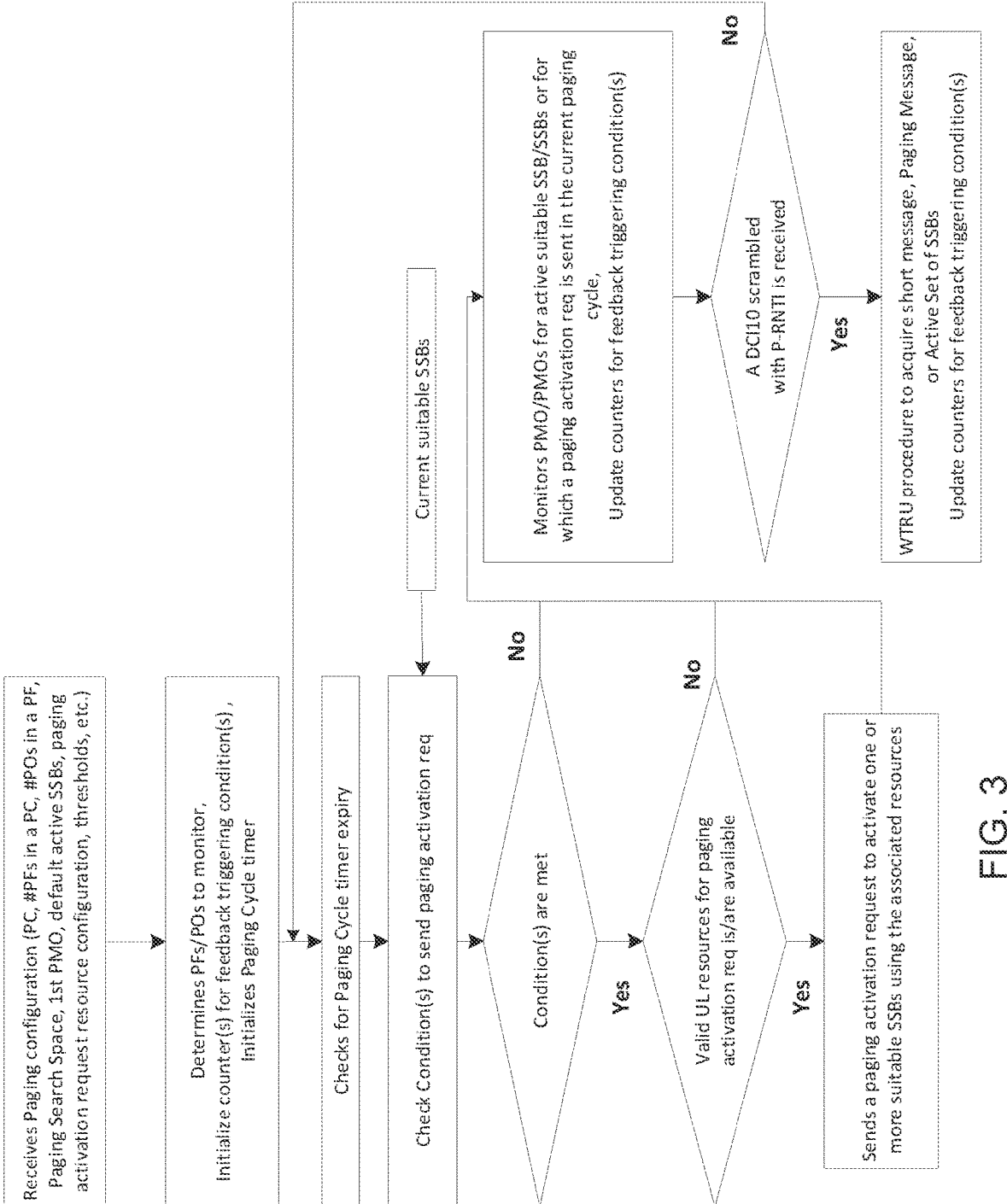
FIG. 3 shows an example of high-level WTRU procedure for a feedback (e.g. minimal feedback) enable paging approach.

FIG. 3 shows an example of high-level WTRU procedure for minimal feedback enable paging approach. After receiving the initial paging configuration, which may include the parameters to determine the PFs and PO to monitor PMO mapping within the PO, a default set of active SSBs, resource configuration for paging activation requests, thresholds (e.g., minimum activation duration paging cycles, minimum paging activation request retransmission duration paging cycles, and/or minimum monitoring duration paging cycles), etc., the WTRU may determine the PFs and POs to monitor. In a paging cycle (e.g., paging cycle), the WTRU may monitor the identified PO to receive the DCI 10 scrambled with P-RNTI over the PMOs associated with the WTRU's suitable active SSB. In a paging cycle (e.g., each paging cycle), the WTRU may also determine if the condition(s) to send a paging activation request to activate its suitable SSB are met or not. A suitable SSB may be an SSB that meets a criteria. If the condition(s) are met, and the UL resources available in the paging cycle, the WTRU may send the paging activation request associated with its suitable SSB.

Figure 4:
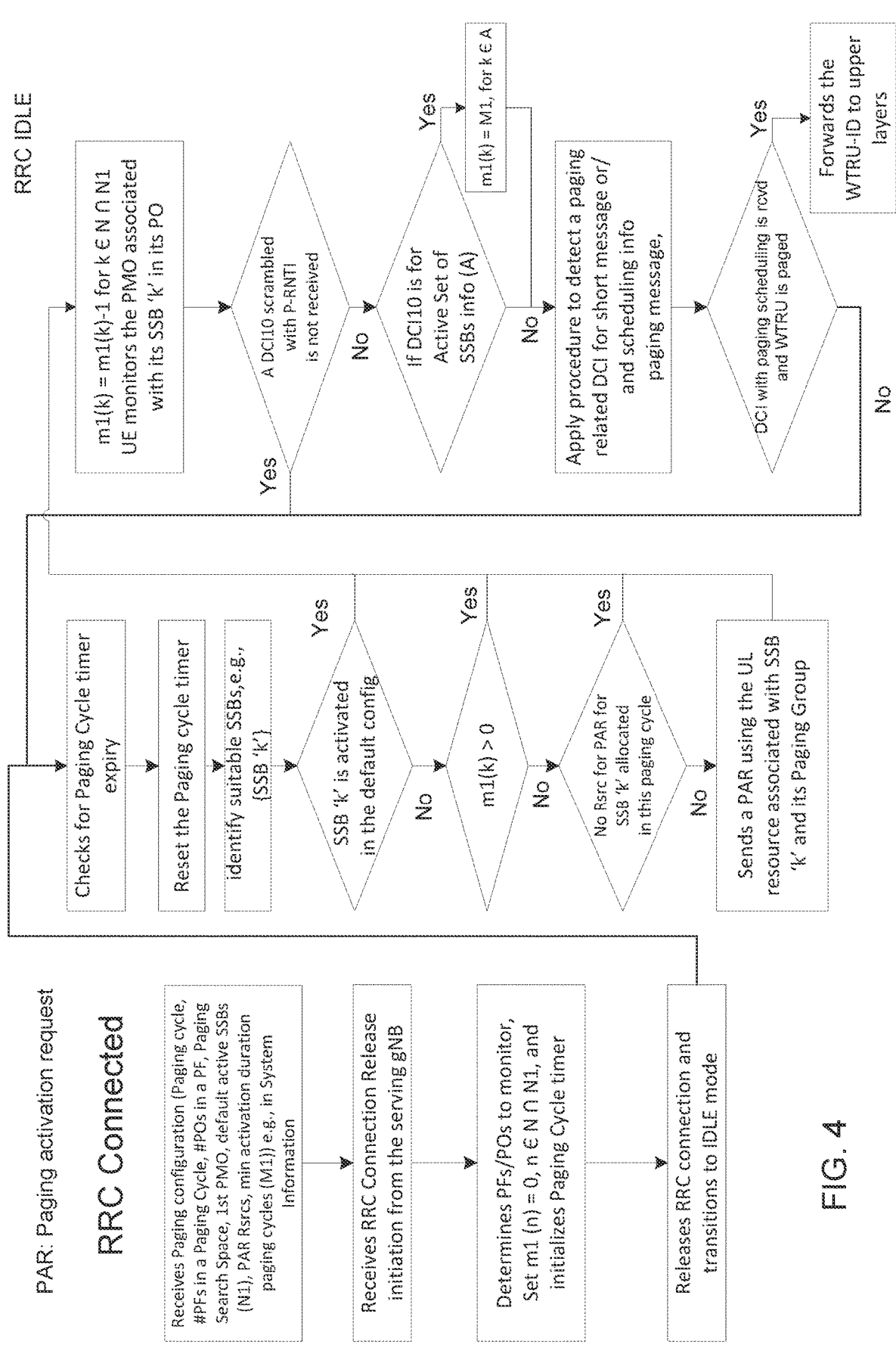
FIG. 4 shows an example of minimal feedback enabled WTRU Paging procedure where the WTRU uses one or more conditions to trigger a paging activation request.

FIG. 4 shows an example of minimal feedback enabled WTRU Paging procedure where the WTRU uses condition 1, condition 2, and condition 3 in order to trigger a paging activation request (N: Set of containing one or more (e.g., all) possible SSBs supported by the gNB). In examples, the WTRU procedure may include the following actions: receiving a paging configuration including a default set of active SSBs/PMOs, resource configuration for paging activation requests, threshold, e.g., min ON duration paging cycles (M1, for condition 3), etc.; initializing the activation duration counter value for the SSBs (e.g., all the SSBs) not in default set of active SSBs to zero, e.g., SSBs which may not be configured in the default set of active SSBs; on the expiration of a paging cycle time (e.g., via paging cycle timer), checking if the following conditions are met for an SSB, e.g. SSB 'k' or not: whether SSB 'k' is WTRU's suitable SSB (e.g., assuming there is one suitable SSB available); whether SSB 'k' is not activated in the default set of active SSBs; and whether SSB 'k' is not in any of the active set of SSBs (e.g., dynamic information) received in the last 'min ON duration paging cycles' number of paging cycles or in other words: the activation duration counter of SSB 'k' is <=0; if the above conditions are met and if a valid UL feedback resource for paging activation request associated with SSB 'k' is available in the current paging cycle, may send a paging activation request associated with the SSB 'k'; may update the counters associated with condition 3 for all the SSBs not in default set of active SSBs; may monitor the DCI scrambled with P-RNTI over the PMO associated with the suitable SSB, e.g., SSB 'k'; and on the reception of active set of SSBs in the DCI, may reset the counters associated with condition 3 for all the SSBs given in the active set of SSBs.

Figure 5:
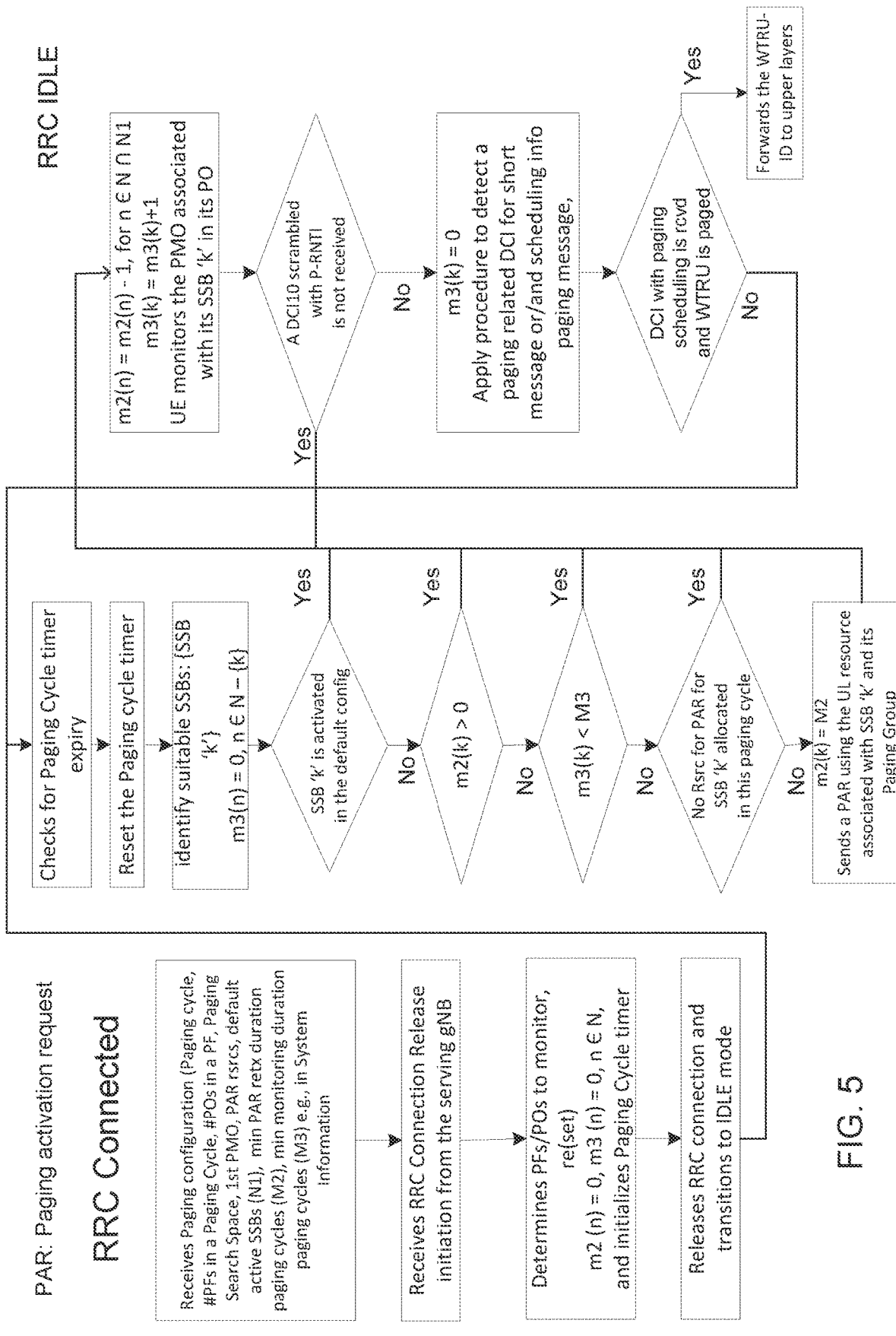
FIG. 5 shows an example of minimal feedback enabled WTRU Paging procedure where the WTRU uses one or more conditions to trigger a paging activation request.

FIG. 5 shows an example of a feedback (e.g. a minimal feedback) enabled WTRU Paging procedure where the WTRU uses Condition 1, Condition 2, Condition 4 and Condition 5 to trigger a paging activation request (N: Set of containing all possible SSBs supported by the gNB) according to an embodiment. In examples, the procedure may include the following actions: may receive a paging configuration including a default set of active SSBs/PMOs, resource configuration for UL feedback, thresholds, e.g., minimum paging activation request retransmission duration paging cycles (M2, for condition 4), minimum monitoring duration paging cycles (M3, for condition 5), etc., for example; may initialize the counters associated with condition 4 and condition 5 for one or more of (e.g. all) the SSBs supported by the current gNB using the configured threshold; on the expiration of a paging cycle time (e.g., via a paging cycle timer), may check if one or more of the following conditions may be met for an SSB, e.g., SSB 'k' or not: whether SSB 'k' is WTRU's suitable SSB (in this example, assuming there may be a suitable SSB available); whether SSB 'k' is not activated in the default set of active SSBs; whether the WTRU has not sent a feedback to request to activate the SSB 'k' in at least last 'M2' number of paging cycles; and whether the WTRU has monitored the PMOs associated with the SSB 'k' for last at least 'M3' number of consecutive paging cycles but has not received any paging related DCI and paging message over those PMOs; if the conditions are met, and if a valid UL feedback resource for paging activation request associated with SSB 'k' is available in the current paging cycle, sending a paging activation request associated with the SSB 'k'; the counts (e.g., via a counter) associated with condition 4 and condition 5 for all the SSBs supported by the current gNB; may monitoring the DCI scrambled with P-RNTI over the PMO associated with the suitable SSB, e.g., SSB 'k'; and on the reception of a DCI scrambled with P-RNTI, resetting the count (e.g., via a counter) associated with condition 5 for SSB 'k'.

Figure 6:
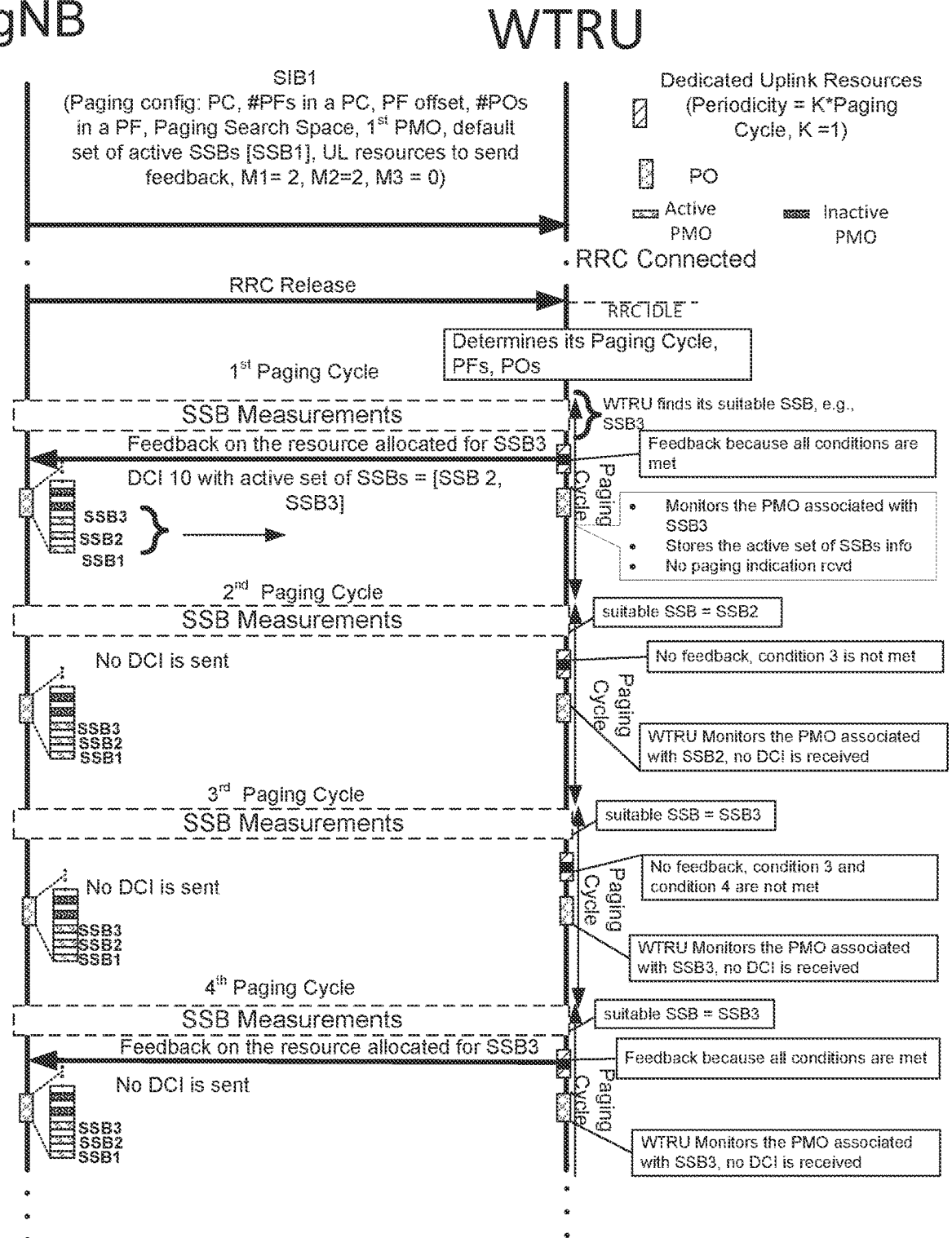
FIG. 6 shows an example where the WTRU uses one or more conditions to determine when to send a paging activation request.

FIG. 6 shows an example where the WTRU uses one or more (e.g., all) conditions (e.g., condition 1 to condition 5) in order to determine if there may be a request to send a paging activation request according. In addition to paging related configuration parameters which may be used to determine PFs and POs to monitor, the WTRU may be configured with default set of active SSBs, resource configuration for paging activation request, and with M1=2 (used for condition 3), M2=2 (used for condition 4), and M3=0 (used for condition 5). In the 1st paging cycle, the WTRU may send a paging activation request associated with its suitable SSB (e.g., SSB 3) because one or more of (e.g., all) the conditions (note M3=0 for condition 5) may be satisfied. The WTRU may monitor the PMO associated with SSB 3 and receive a DCI 10 scrambled with P-RNTI containing the active set of SSBs (e.g., SSB2 and SSB3). In the 2nd paging cycle, the WTRU's suitable SSB may be changed to SSB 2, but the WTRU may not send a paging activation request because condition 3 (with M1=2) for the SSB 2 may not be satisfied. There may be not be a DCI received in this paging cycle. In the 3rd paging cycle, the WTRU's suitable SSB may be changed to SSB3, but the WTRU may not send a paging activation request because both condition 3 (with M1=2) and condition 4 (with M2=2) for the SSB 3 may not be satisfied. There may be not be a DCI received in this paging cycle. In the 4th paging cycle, the WTRU may send a paging activation request associated with its suitable SSB (e.g., SSB 3) because one or more of (e.g., all) the conditions may be satisfied for the SSB3 and so on, for example.

Activation and selection of multiple SSBs may be provided. The WTRU may determine to send one or more paging activation requests to activate one or more SSBs of the current cell. In examples, the WTRU may determine to activate multiple of its suitable SSBs (e.g., determined based on the DL measurements as described herein).

Figure 7:
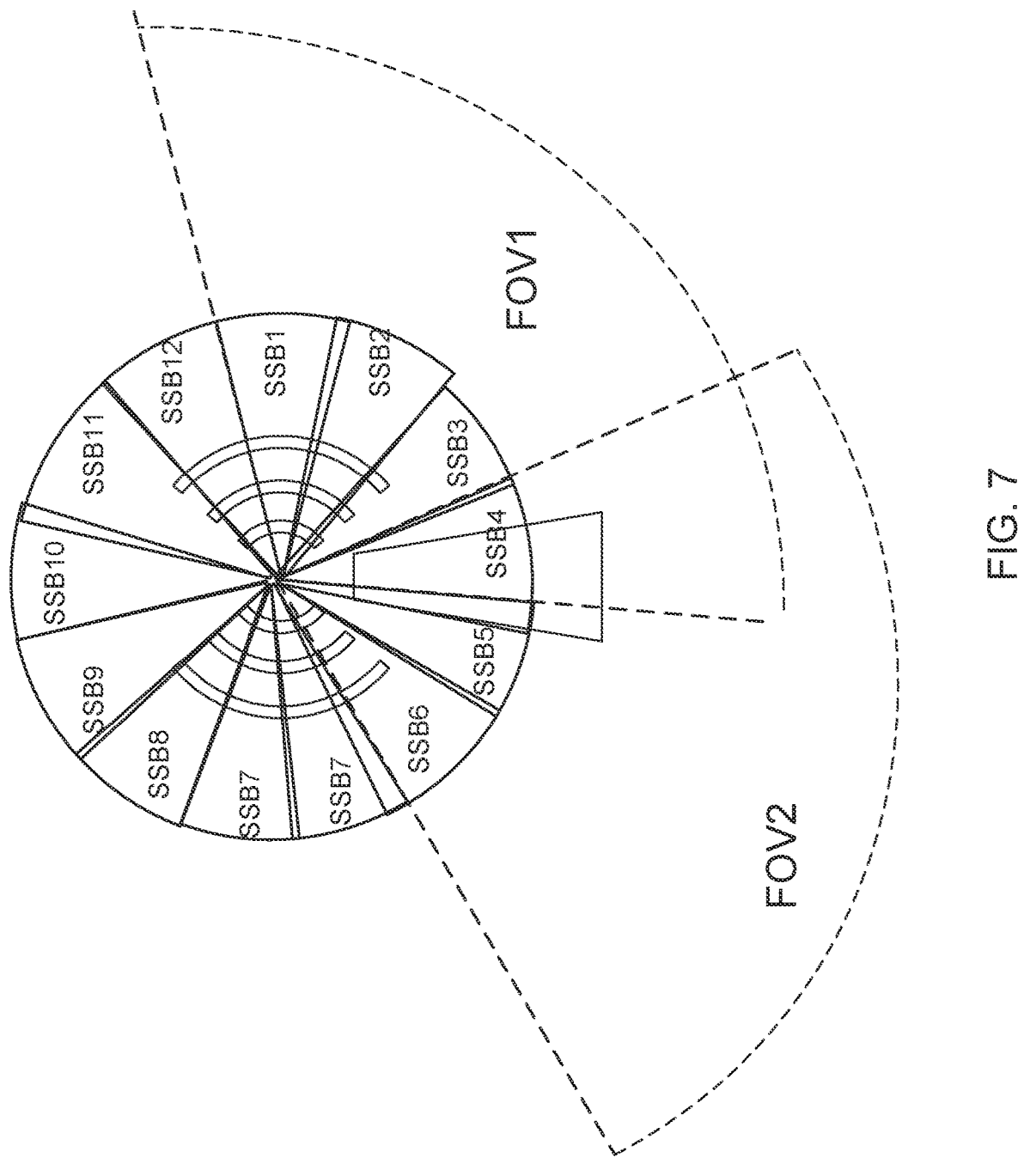
FIG. 7 shows an example of field of view bases SSB grouping.

FIG. 7 shows an example of field of view bases SSB grouping. In examples, the WTRU may determine to activate multiple SSBs where one or more, or all the SSBs, may not be WTRU suitable SSBs. In examples, the WTRU may determine to activate a SSB set containing the N1 neighboring SSBs around one of its suitable SSB, e.g., if WTRU's suitable SSB is SSB 10 and N1=6, and the WTRU requests to activate SSB 7, SSB 8, SSB 9, SSB 10, SSB 11, SSB 12, SSB 13. The WTRU may determine to activate an SSB set such that a field of view (FOV), e.g., around one of its suitable SSB, may be activated, where a FOV means that a set of neighboring consecutive DL beams/SSBs of a gNB containing a certain number of beams, e.g., N1+1 beams as described herein.

The WTRU may determine which SSBs to be activated based on one of more of the parameters including DL measurement quality (e.g., RSRP/RSSI over the corresponding SSBs), WTRU's mobility state (e.g., normal/medium/high), the direction in which WTRU may be moving, the orientation of the WTRU blockage statistics, etc. In examples, using the WTRU's mobility state and the direction in which WTRU is moving, the WTRU may predict which SSBs of the current cell may be suitable for the WTRU. The WTRU may request to activate all such SSBs to the current gNB, where in case of high mobility state, the WTRU may request to activate more number SSBs compared to the case of medium or normal mobility states.

For one or more (e.g. each) of the SSBs the WTRU may request to activate, the WTRU may check at least one or more of the conditions (condition 1, condition 2, condition 3, condition 4, condition 5) described herein to determine if the SSB is to be activated or not. In examples, if the WTRU determines to activate an SSB which is not a WTRU's suitable SSB, the WTRU may not check condition 1 and condition 5 to be satisfied. In that case, the WTRU may check at least one or more conditions out of condition 2, condition 3, and condition 4.

Configuration from the Network/gNB may be provided. The WTRU may be configured by the network/gNB to determine whether the WTRU may request to activate multiple SSBs or not. In examples, the network may enable some WTRUs to be able to request multiple SSBs and some WTRUs to able to request an SSB over a certain amount of time (e.g., per paging cycle). This may be done, for example, if the network has the information of WTRU's class or WTRU's traffic type, where in case of delay-sensitive applications/WTRUs, the network may enable requests to activate multiple SSBs and for non-delay sensitive applications/WTRUs, the network may enable requests to activate a SSB over a certain amount of time (e.g., per paging cycle).

In examples, the WTRU may be configured by the network with the maximum number of SSBs, which the WTRU may request, to activate over a certain amount of time (e.g., per paging cycle). In examples, this may also be done by the network, based on the information of WTRU's class or WTRU's traffic type. The configuration/enablement/indication of whether the WTRU may request to activate multiple SSBs or not and/or the value of a number (e.g., a maximum number) of SSBs may be configured to the WTRU, e.g., via system information (e.g., SIB1), higher layer signaling such as RRC signaling (e.g., RRC Release message), downlink control information (DCI), or downlink shared channel (e.g., MAC-CE) etc.

Examples to activate multiple SSBs may be provided. The WTRU may request to activate multiple SSBs by using one or more of the examples described herein.

In examples, in a paging cycle, if the WTRU determines to activate multiple SSBs, the WTRU may send multiple paging activation requests, where at least one paging activation request is associated with one or more (e.g., each) of the SSBs from the specific/common resources for paging activation requests configured for the WTRU or WTRU's paging group, if such resources are available in that paging cycle.

In examples, in case(s) of many-to-one mapping between the SSBs and the resources for paging activation requests (e.g., as described earlier), in order to activate multiple SSBs, the WTRU may send a paging activation request using one or more resources, where a resource (e.g., each resource) is at least associated with one of the SSBs the WTRU determines to activate. The network may configure many-to-one mapping in different ways, including FOV based association, where dedicated resources (e.g., UL control signals or/and UL time-frequency resources) may be associated to different FOVs (e.g., including a different set of neighboring consecutive SSBs, e.g., FOV1 {SSB1, SSB2, SSB3, SSB4}, FOV2 {SSB3, SSB4, SSB5, SSB6, SSB7}, FOV3 {SSB 11, SSB12, SSB13, SSB14}, etc.). If the WTRU determines to activate a specific FOV or one or more SSBs of a specific FOV, the WTRU may use the UL resource associated with that FOV.

In examples, the WTRU may determine to activate multiple SSBs, where the WTRU may have different activation priority for different SSBs. Out of the multiple SSBs the WTRU may want to activate, the WTRU may assign an SSB with higher priority than another SSB. In examples, the WTRU may assign priorities based on the DL measurements (e.g., RSRP/RSSI) over the SSBs, where higher priority may be given to an SSB with higher DL measurement compared to another SSB with lower DL measurement Examples may include using other parameters such as WTRU's prediction on its mobility, orientation, blockages, etc., where a higher priority may be given to an SSB which has high probability to be listened in the future compared to an SSB which has lower probability to be listened in the future. The WTRU may use different transmission techniques in sending paging activation requests to activate different SSBs with different priorities. In examples, the WTRU may use different transmit powers to transmit paging activation requests to activate different SSBs with different priorities, where a paging activation request for a higher priority SSB may be transmitted using higher power level than the power level used for a paging activation request for a lower priority SSB. Examples may include using different UL control sequence lengths (e.g., if multiple configurations given to the WTRU from the gNB/network), a different number of time-frequency resources (e.g., if multiple resources are configured for an SSB within the same paging cycle), etc.

Mobility enhancements may be provided. Mobility states in directional systems may be provided. In directional systems (e.g., multi-beam based transmissions), the WTRU mobility may be determined based on the rate of beam and/or cell reselection. One or more mobility states of the WTRU may be defined based on the rate of beam and/or cell reselection.

In examples, the WTRU may determine its mobility state as a lower-mobility state (e.g., normal-mobility state) if the number of team reselections during a period (e.g., $T_{BR\_max}$) is less than a first threshold (e.g., $MS_1$). A beam reselection may be considered, in examples, if the WTRU selects a different best beam (e.g., different from the previous selected best beam), and/or if the WTRU selects a different set of suitable beams (e.g., different from the previous set of suitable teams). The number of beam reselections may be counted both over the same (e.g., single) cell and/or across different (e.g., multiple) cells. The beams of a different number of cells (e.g., two different cells) may be considered as different beams, in examples, if the WTRU performs cell reselection. The beams of a different number of cells (e.g., two different cells) may (e.g., may also) be counted as beam reselection. A bias or weight (e.g., at cell-level) may be used to assign a weightage to the rate of beam reselection. Different (e.g., separate values) values or the same values for bias or weight may be used for different cells for serving and neighboring cells. The value of biases or weights associated with a cell (e.g., each cell) may be communicated to the WTRU from the network, e.g., using system information or higher layer signaling.

The WTRU may determine its mobility state as a medium-mobility state (e.g., WTRU with higher mobility than the mobility in the lower-mobility state) if the number of beam reselections during a time period (e.g., $T_{BR\_max}$) may be greater than or equal to the first threshold (e.g., $MS_1$) but less than or equal a second threshold (e.g., $MS_2$).

In examples, the WTRU may determine its mobility state as a high-mobility (e.g., WTRU with higher mobility than the mobility in the medium-mobility state) if the number of beam reselections during time period (e.g., $T_{BR\_max}$) may be greater than $MS_2$ and/or less than or equal to a third threshold (e.g., $MS_3$). In examples, one or more mobility states may be defined for the WTRU. The values of time period (e.g., $T_{BR\_max}$) and one or more thresholds (e.g., $MS_1$, $MS_2$, $MS_3$, etc.) may be configured to the WTRU by the network using system information and/or higher layer signaling.

As described herein, criteria may be used to determine/define different mobility states that may be applicable to RRC IDLE, INACTIVE, and RRC CONNECTED states.

Mobility based paging activation requests may be provided. Allocation of UL control signals and/or UL resources for paging activation requests may be mobility state specific. In examples, depending on the number of mobility states defined for WTRUs, one-to-one or many-to-one or one-to-many association may be defined between mobility states and UL control signals and/or UL resources for paging activation requests. In examples, the mobility states may be defined as a normal-mobility state, a medium-mobility state, and a high-mobility state. The normal-mobility state may be determined if the number of cell reselections during a configured time-period is less than a configured first threshold. The medium-mobility state may be determined if the number of cell reselections during a configured time-period is greater than or equal to the first threshold but less than or equal to a configured second threshold. The high-mobility state may be determined if the number of cell reselections during a configured time-period is greater than the second threshold.

In examples, in one-to-one association, a dedicated UL control signal (e.g., signature or reference sequence or preamble, etc.) and/or a dedicated UL time-frequency resource may be associated to a mobility state (e.g., each mobility state). In one-to-one or one-to-many associations between the mobility states and the UL control signal/UL resource for paging activation requests, the gNB may determine the mobility state of the requesting WTRU/WTRUs based on the received paging activation request.

Figure 8:
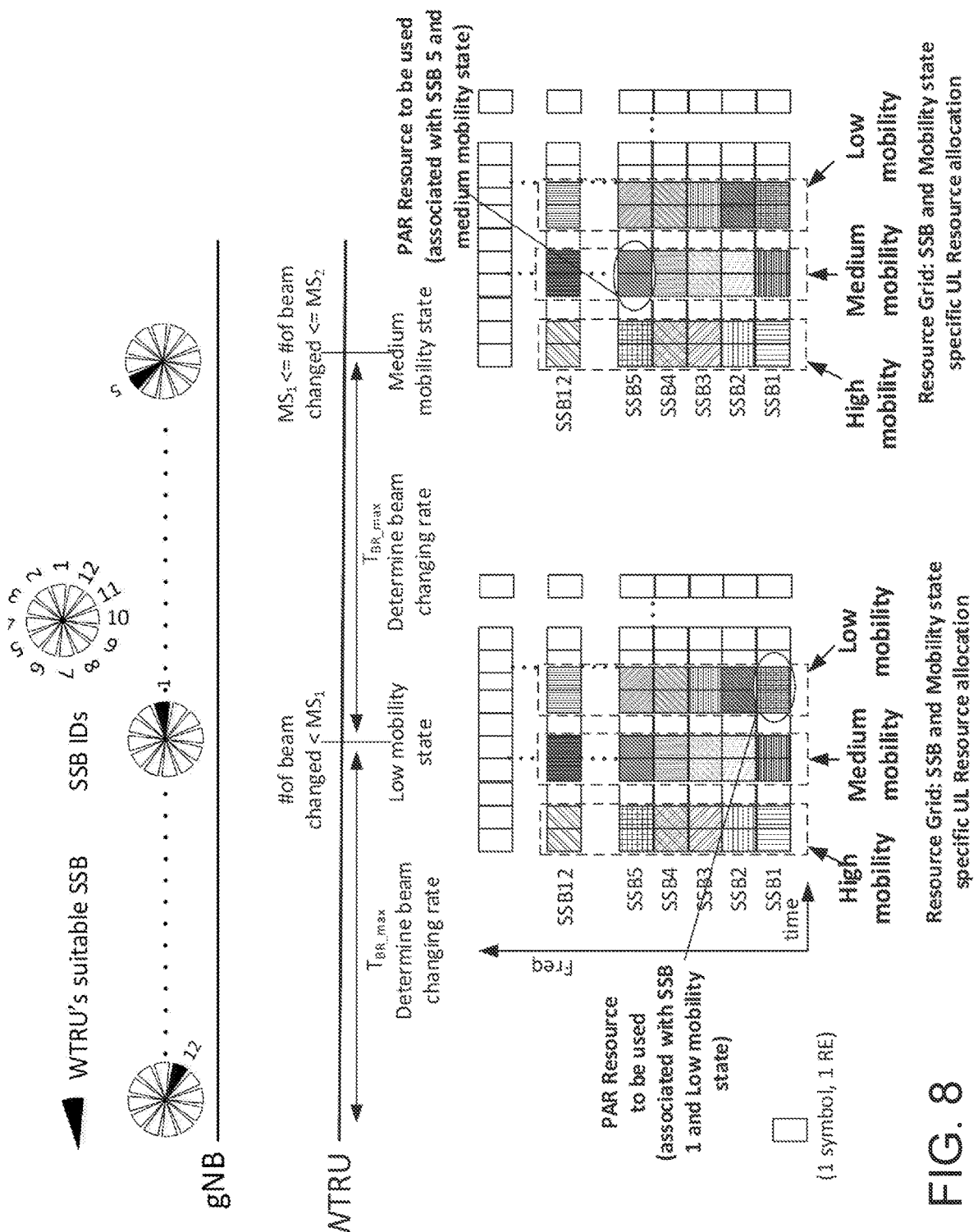
FIG. 8 shows an example of mobility specific paging activation requests.

FIG. 8 shows an example of mobility specific paging activation requests. As shown in FIG. 8, both SSB and mobility state specific UL resources may be allocated for paging activation requests. The mobility state of the WTRU may be monitored by determining the WTRU's beam (e.g., suitable/best beam) changing rate. The WTRU may be configured with the $T_{BR\_max}$ duration (e.g., an integer multiple of paging cycles) over which the WTRU may calculate the number of beam reselections. The WTRU may be configured with a threshold (e.g., $MS_1$, $MS_2$, etc.) to determine the beam changing rate.

As shown in FIG. 8, the number of beam reselections after the first monitoring duration may be less than the configured $MS_1$. A low mobility state may be determined by the WTRU. In that paging cycle, if the WTRU sends a PAR to activate the WTRU's suitable beam (SSB1), then the WTRU may use the UL resource associated with the low-mobility state and the SSB1. After the second monitoring duration, a medium mobility state may be determined by the WTRU based on the number of beam selections (e.g., between $MS_1$ and $MS_2$). In that paging cycle, if the WTRU sends a PAR to activate the WTRU's suitable beam (SSB5), the WTRU may use the UL resource associated with the medium-mobility state and the SSB5.

In cases of mobility specific UL control signal/UL resource for paging activation requests, the configuration to enable paging activation requests may include mapping of UL resources (e.g., UL control signals and/or UL time-frequency resources) to mobility states. In examples, this configuration may include an association between UL signals/resources and mobility states. In examples, this configuration may include information on mapping method(s) to be applied to the allocated resources (e.g., multiple) to identify the specific resource/resources associated with a WTRU's mobility state (e.g., each of the WTRU's mobility states). In examples, in cases of multiple (e.g., a set of) allocated time-frequency resources which may span over different symbols/slots in time and different REs/PRBs in frequency, mapping method(s) for the UL resource to the association of mobility states may specific the order (e.g., frequency-first or time-first) which the WTRU may follow and identify the resource associated with a mobility state (e.g., each of the mobility states).

Mobility based minimum activation duration may be provided. A number of values (e.g., multiple values) for minimum activation duration may be configured and used. In examples, values (e.g., different values) of minimum activation duration for an SSB (e.g., an activated SSB) may be configured based on the requesting WTRU's (e.g., the WTRU sent a paging activation request to activate the SSB) mobility state. In examples, if a paging activation request for an SSB is received from a lower-mobility state (e.g., normal-mobility state) WTRU, the gNB may assign a longer minimum activation duration for the SSB compared to a case in which the paging activation request is received from a high-mobility state (e.g., medium/high-mobility state) WTRU. The higher the mobility, the lower the value of minimum activation duration that may be selected by the gNB.

Values (e.g., different values) of the minimum activation duration association with mobility states (e.g., different mobility states) may be configured to the WTRU.

The WTRU may send a paging activation request to activate one or more suitable SSBs that may use the associated paging activation request(s). The WTRU may use the resources for paging activation request(s) association with the WTRU's mobility state. The mobility states of the WTRU may be determined by various procedures, such as those described herein.

In examples, the WTRU may send a paging activation request for an SSB using an associated resource with the WTRU's mobility state. In examples, the WTRU may determine (e.g., after sending the paging activation request) the value of minimum activation duration over which the requested SSB would be activated may be equal to the configured value of the minimum activation duration associated with the mobility state of the WTRU (e.g., the mobility state the WTRU had at the time of transmission of the paging activation request).

In examples, if the gNB sends dynamic downlink information of an active set of SSBs, the downlink information of the active set of SSBs may include an activation state indication for the activated SSBs (e.g., for each of the activated SSBs). Values (e.g., different values) of activation state indications may be defined for each of the minimum activation duration value. In examples, if there are values (e.g., three different values) of minimum activations duration defined to support mobility states (e.g., three different mobility states) (e.g., normal-mobility, medium-mobility, and high-mobility states), the activation state indications may be defined as '00', '01', '10'. The '00', '01', '10' may indicate the minimum activation duration associated with normal-mobility, medium-mobility, and high-mobility states, respectively. The WTRU may determine the value of the minimum activation duration of the SSBs (e.g., for each of the SSBs) included in the downlink information (e.g., after receiving a downlink information of active set of SSBs) using the associated activation indication state.

Mobility based minimum monitoring duration may be provided. Values (e.g., multiple values) for minimum monitoring duration may be used. The WTRU may be configured with the values (e.g., multiple values) of the minimum monitoring duration. Values (e.g., different values) of the minimum monitoring duration associated with mobility states (e.g., different mobility states) may be configured to the WTRU. In examples, a longer minimum monitoring duration may be configured for a lower-mobility state (e.g., normal mobility state) compared to a higher-mobility state (e.g., medium/high-mobility state). The higher the mobility, the lower the value of minimum monitoring duration that may be configured by the gNB.

Values (e.g., different values) of minimum monitoring duration may be used by the WTRU depending on the WTRU's mobility state. Based on the WTRU's mobility state, the WTRU may select an associated configured minimum monitoring duration. If the WTRU's mobility state is changed, the WTRU may select another value of the minimum monitoring duration associated with the new/updated mobility state.

Mobility minimum paging activation request retransmission duration may be provided. The WTRU may be configured with values (e.g., multiple values) for minimum paging activation request retransmission duration. In examples, values (e.g., different values) of the minimum paging activation request retransmission duration associated with mobility states (e.g., different mobility states) may be configured to the WTRU. In examples, a higher value for the minimum paging activation request retransmission duration paging cycles may be used for a lower-mobility state (e.g., normal-mobility state) compared to a higher-mobility state (e.g., medium/high-mobility state). The WTRU may determine for a SSB (e.g., after sending the paging activation request for the SSB), the value of the minimum paging activation request retransmission duration for that SSB, based on the mobility state of the WTRU (e.g., the mobility state the WTRU had at the time of transmission of the paging activation request).

Simulation(s) based performance evaluation may be provided. Simulation(s) may be performed to evaluate the performance result(s). The versions of the result(s) considered for performance evaluation may be MFEP-AD, MFEP-DLI, and MFEP-MD schemes. A MFEP-AD scheme may be a minimal feedback enabled paging solution with a minimum activation duration of five paging cycles, without downlink information of SSBs (e.g., an active set of SSBs), without minimum monitoring duration, and without minimum paging activation request retransmission duration. A MFEP-DLI scheme may be a MFEP-AD with the downlink information of SSBs (e.g., an active set of SSBs) but without minimum monitoring duration and minimum paging activation request retransmission duration. A MFEP-MD scheme may be a MFEP-DLI augmented with the minimum monitoring duration but without minimum paging activation request retransmission duration.

The performance of the result(s) may be evaluated against a mobile-assisted direction paging (MADP) scheme. In an MADP scheme, a sub-set of beams may be activated based on the beam-specific WTRU indications (e.g., similar to paging activation requests). In an MAPD scheme, there may be no concept of minimum activation duration, dynamic downlink information of SSBs (e.g., an active set of SSBs), and minimum monitoring duration. In an MAPD scheme, WTRUs may be configured to send beam-specific WTRU indications in every paging cycle. Therefore, an MADP scheme can incur a significant energy burden at the WTRU side in order to reduce the DL paging overhead.

Figure 9:
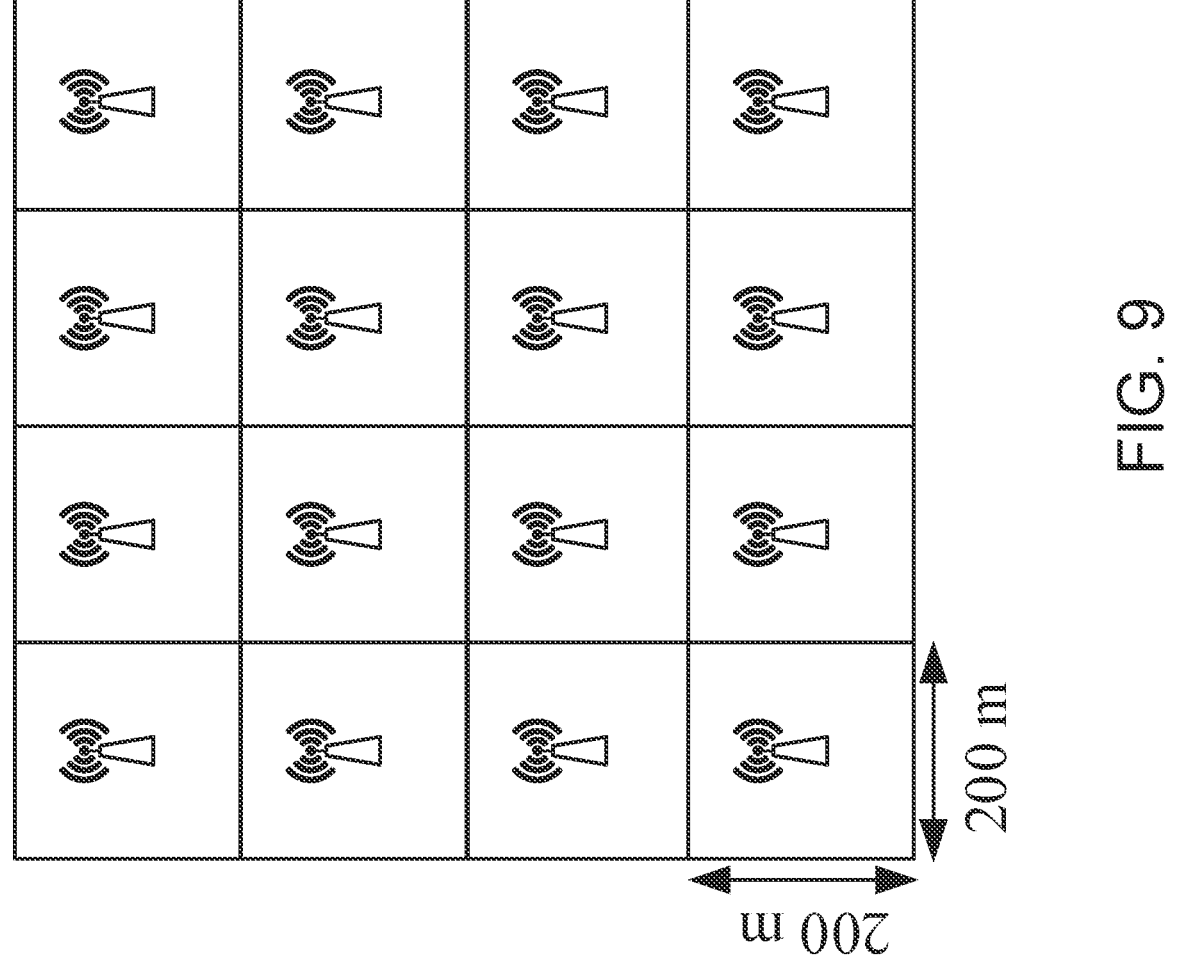
FIG. 9 shows an example tracking area considered for simulations.

FIG. 9 shows an example tracking area considered for simulations. Simulations may include a tracking area having a number of gNBs (e.g., 16 gNBs as shown in FIG. 9) in a dense urban scenario an inter-site distance (e.g., 200 m). WTRU densities (e.g., different WTRU densities) defined as the number of WTRUs within a paging group (e.g., supported per PO) may be considered. A WTRU density may be translated into a number of WTRUs paged per second based on the selection of system parameters such as the paging cycle, a number of paging frames per paging cycle, and a number of POs per paging frame. WTRUs may be initially randomly dropped within the simulated tracking area where some WTRUs (e.g., ~40%) are stationary, some WTRUs (e.g., ~40%) have low mobility (e.g., a speed of ~3 km/hr), and some WTRUs (e.g., ~20%) have high mobility (e.g., a speed of ~30 km/hr). A random walk may be considered as the mobile WTRU's mobility model.

DL indication(s) of beams (e.g., active beams) associated with MFEP-DLI and MFEP-MD schemes may be sent via a DCI with bit-map information. The DCI may occupy an OFDM symbol (e.g., one OFDM symbol) and a number of frequency domain resources (e.g., RBs) determined based on a total number of supported beams.

In the MFEP-MD scheme, values (e.g., different values) of monitoring duration may be configured for WTRU mobility states (e.g., WTRU mobility states). In examples, two different configurations may include MFEP-MD (4/2/0) and MFEP-MD (6/3/0), where the values (x/y/z) may represent the monitoring duration defined in a number of paging cycles corresponding to WTRUs with {no, low, high} mobility states, respectively.

In PAR transmission(s), a transmission (e.g., each transmission) utilizes minimal time and frequency resources due to the energy-based detection considered at the gNB. In examples, a single resource element is provided in the frequency domain and two OFDM symbols are provided in the time domain which is the minimum number of symbols allocated for a random access preamble transmission in NR for millimeter wave frequency bands such that interferences to/from other control/data transmission(s) can be avoided. The remaining parameters in the examples are shown in Table 1.

TABLE 1

| Parameters that may be used for a simulation | |
| --- | --- |
| Parameter | Value |
| Paging cycle duration | 320 ms [3] |
| Total number of paging cycles | 100,000 |
| Maximum number of UEs can be paged simultaneously | 32 [3] |

Figure 10A:
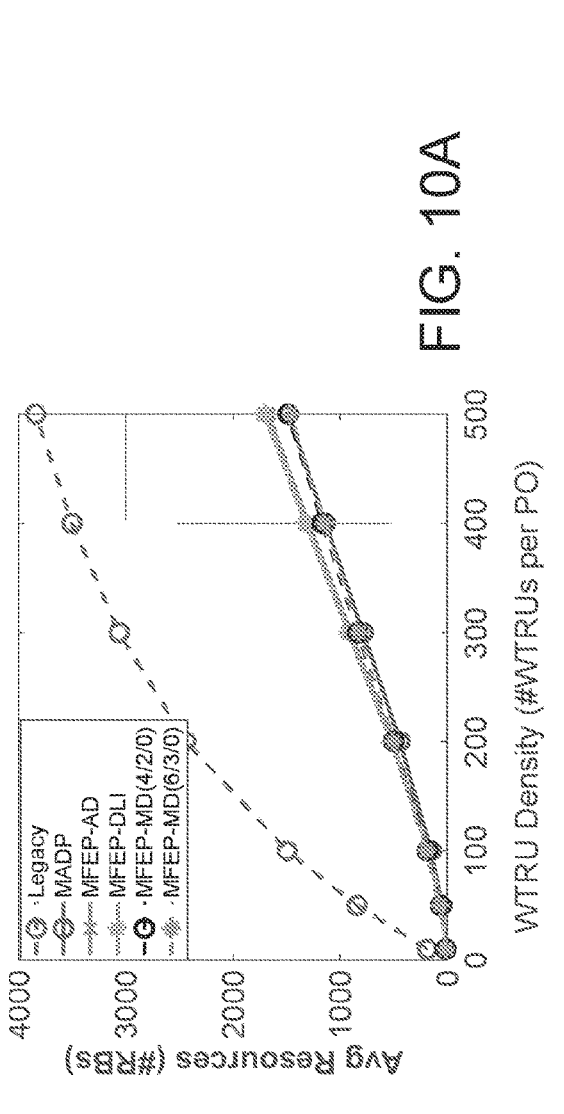
FIGS. 10A-10C show example results for a total number (e.g., 64) supported beams per cell while varying WTRU density.
Figure 10C:
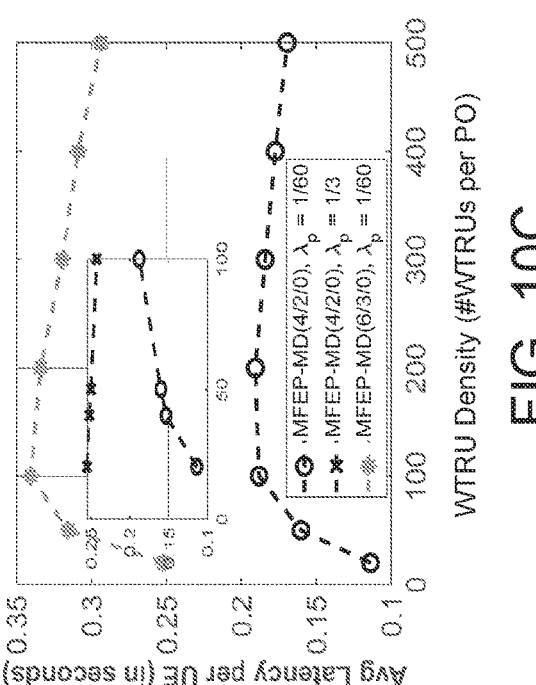
Figure 10B:
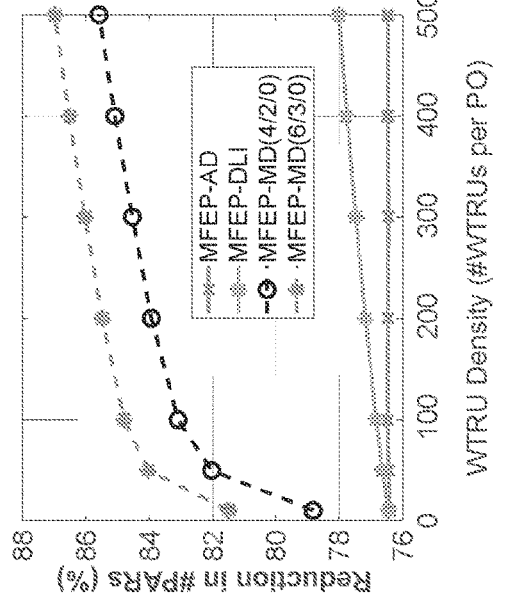

FIGS. 10A-10C show example results for a total number (e.g., 64) supported beams per cell while varying WTRU density. FIG. 10A shows the average number of network resources utilized (e.g., for both DL paging-related and UL PAR transmissions) per paging cycle per cell for a number of results. A significant reduction in paging-related resource utilization for MADP may be achieved. The gain may be a result of the utilization of a much lower number of beams for paging transmissions compared to the total number of beams (e.g., 64). The number of results may utilize approximately the same amount of resources for paging as the MADP scheme for the simulated range of WTRU densities. In examples, paging resource utilization by MADP and the number of results may correspond to a range of reduction (e.g., 80-81%) in resources at a WTRU density of 200 WTRUs/PO.

FIG. 10B shows a number of results resulting in a much lower number of PAR UL transmissions compared to the MADP scheme which may make the number of results more favorable in terms of WTRU energy consumption. The number of PARs in MFEP-DLI and MFEP-MD schemes may decrease further as the WTRU density increases which may be a result of the utilization of DL indication of beams (e.g., active beams) and monitoring duration that may allow one or more WTRUs to benefit from the already activated beams by other WTRUs. The configured monitoring duration in MFEP-MD schemes, in which the WTRU may first monitor a beam before deciding to transmit a PAR, may enable this result to provide more reduction in DL resource utilization and WTRU energy consumption compared to both MFEP-DLI and MFEP-AD schemes. The reduction in the number of PAR transmissions for the results may include a slight increase in DL resource overhead for MFEP-DLI compared to MADP and MFEP-AD schemes, e.g., due to the transmission of DL indications of active beams, or as discussed below, an increase in paging latency for MFEP-MD compared to other schemes, e.g., due to the configured monitoring duration.

FIG. 10C shows the latency that may be incurred by the MFEP-MD scheme. In the MFEP-MD scheme, it may be observed that increasing the monitoring duration (e.g., MFEP-MD (6/3/0) vs. MFEP-MD (4/2/0)) increase the paging latency experienced by WTRUs for WTRU densities. The MFEP-MD scheme may result in more reduction of DL resource utilization and WTRU energy consumption as shown in graphs (a) and (b) in FIG. 10. For the paging requests' rate (e.g., $\lambda_p$=1 packet per 60 seconds), the paging latency may increase with the WTRU density until a point with WTRUs may start taking advantage of the activated beams by other WTRUs. The upward trend at low WTRUs densities lowers as the paging requests' rate is increased (e.g., $\lambda_p$ to ⅓ as shown in graph (c) in FIG. 10). As such, the MFEP-MD scheme may be preferred for certain combinations of WTRU densities and paging requests' rates. For the simulated ranges of WTRU densities, the results may not experience paging latency. For high WTRU densities and/or paging requests' arrival rate, the results may experience paging latency if the network may not be able to page all the WTRUs at the paging cycle when the paging requests arrive.

Figures 11A, 11B, 11C:
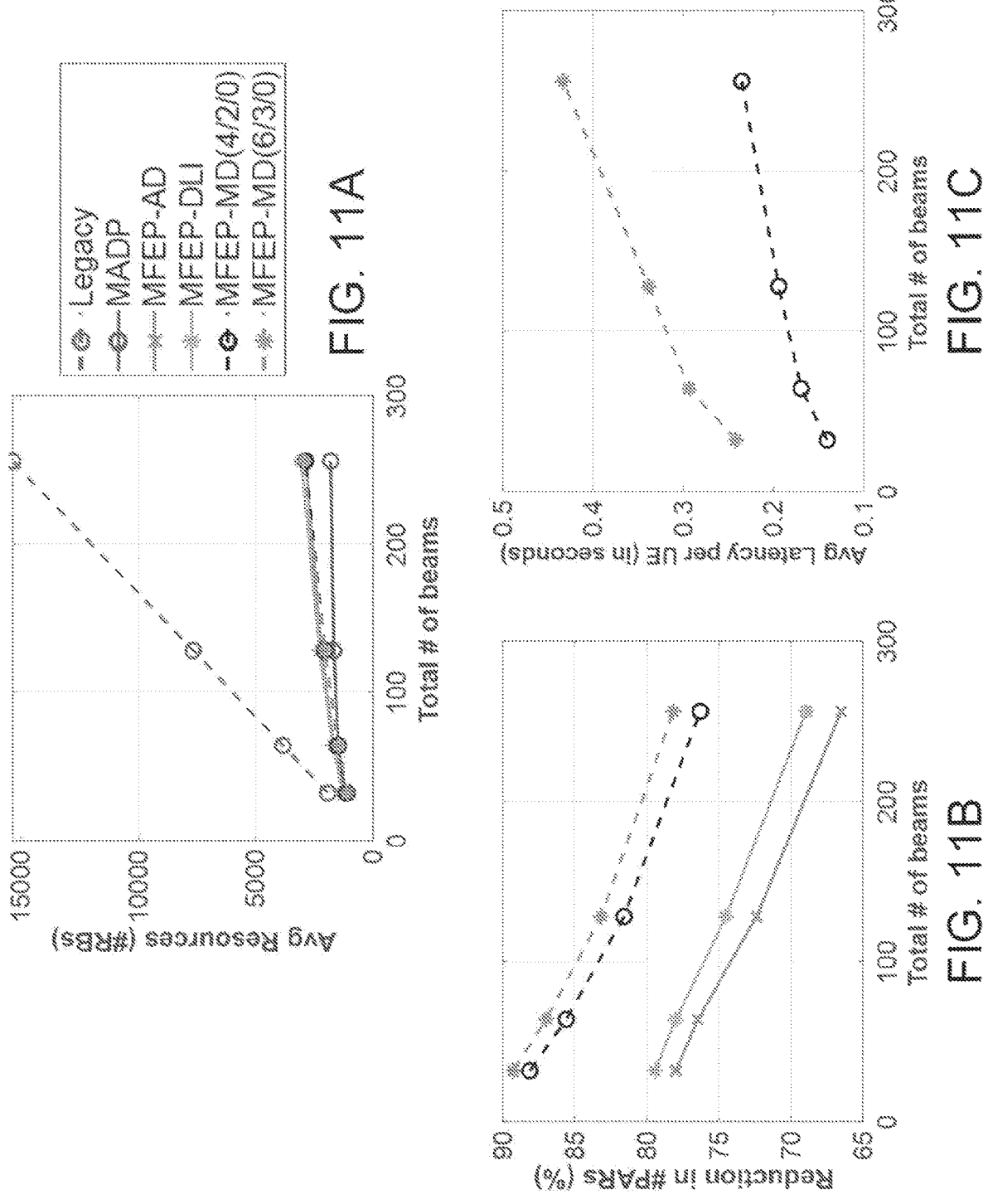
FIGS. 11A-11C show example results for a WTRU density (e.g. WTRUs/PO) while varying the number of total beams.

FIGS. 11A-11C show example results for a WTRU density (e.g. WTRUs/PO) while varying the number of total beams. FIG. 11A shows that resource utilization for paging increases significantly and linearly with the increase in the number of support beams. For MADP and results, the increases may be slight and resources saturate. As such, the resource utilization reduction using MADP and results may become more prominent as the number of beams increases. The amount of resources in MADP and results may depend on both the WTRU density and the number of beams required to cover WTRUs within a specific cell. Despite the WTRU density, which may be a fixed WTRU density, a slight increase in the resource utilization by the MAPD and results may be observed (e.g., subsequently) with an increase in the number of supported beams due to the reduce of the beam coverage area, for example. An increase in the total number of bits required to send a DL indication of beams (e.g., active beams) may cause an increase in resource utilization for MFEP-DL and MFEP-MD.

A slight increase in the number of utilized resources by the results compared the MADP scheme may occur as the number of supported beams increases. The increase may be due to the reduction in beams' coverage areas which may lead to a higher beam switching rate for mobile WTRUs. The higher rate of beam switching may result in scenarios of a beam remaining unnecessarily activated due to the configured activation duration while there may not be any WTRUs to be served under the beam's coverage. As such, the beam activation duration may consider both the mobility states of served WTRUs and the supported beam's coverage area, e.g., number of supported beams per cell.

FIG. 11B shows a result of increased beam switching rate associated with mobile WTRUs with an increase in the total number of supported beams. A lower reduction in the number of PARs may be observed for the results compared to MADP. The number of PARs transmitted by the results may be significantly lower than those in the MADP scheme even with the high number of beams (e.g., 256).

FIG. 11C shows that the paging latency for the MFEP-MD scheme may increase as the number of supported beams (e.g. total number of supported beams) increases. The increase may be result of the increase in the rate of beam switching corresponding to the WTRUs' mobility and beam coverage area(s), and the configured monitoring duration as described earlier. As such, the monitoring duration configuration may take into account the expected beam switching rate.

Figure 13:
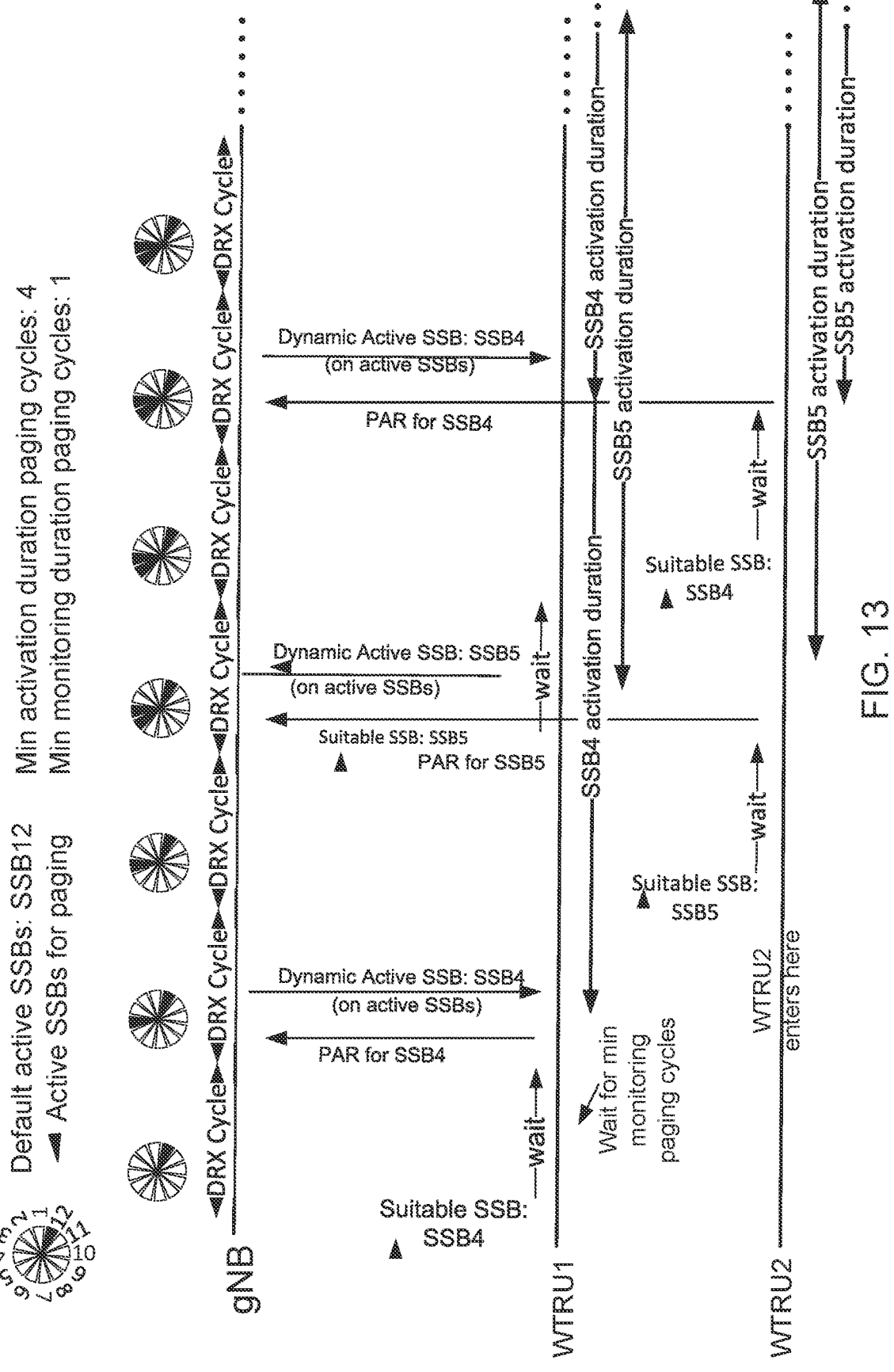
FIG. 13 shows an example showing the operation of dynamic information of active SSB and SSB activation duration counter.

FIG. 12 shows an example of WTRU procedure to support minimal feedback enabled paging procedure by using the information of default, dynamic set of active SSBs, and a minimum monitoring duration requirement according to an embodiment. FIG. 13 shows an example showing the operation of dynamic information of active SSB and SSB specific activation duration counter. For example, the procedure in FIG. 12 may include at least one of the following: receive configuration information (e.g., a configuration of resources for paging activation requests) from a network, a minimum activation duration paging cycles, a minimum monitoring duration paging cycles, and a default set of active SSBs, where the confirmation information indicate a paging occasion including the beams associated with the active SSBs which may be used to receive paging information (e.g., DCI scrambled with P-RNTI) and/or paging message over PDSCH; determine the current set of desired SSBs (e.g., SSBs are to be activated); determine a change in the current set of desired SSBs (as compared to the previous set of desired SSBs) or the set of active SSBs (default active SSBs and SSBs with positive (>0) activation duration counter value); determine that none of the current desired SSBs are part of the default set of active SSBs or have positive (>0) activation duration counter value; monitor for paging DCI over PMO/PMOs or/and paging message over PDSCH associated with any of the current desired SSBs for minimum monitoring duration paging cycles; on a condition that an SSB criteria (e.g., a paging DCI or/and a paging message over PDSCH is/are not detected for any of the current desired SSBs) is met, an activation duration has elapsed, and a monitoring duration has elapsed, send a message (e.g., paging activation request) to a network indicating the beam(s) associated with the SSBs is to be used by the network for sending paging information using one or more resources associated with one or more SSBs; and receive, via the beam(s) during the paging occasion, the paging information.

In examples, a configuration associated with the SSB may be determined using a system information for the WTRU. The WTRU may determine one or more of the SSB criteria, the resource, the monitoring duration, and the activation duration using the configuration associated with the SSB. The SSB may meet the SSB criteria if a signal measurement of the beat is above a threshold.

In examples, the WTRU may determine the SSB is inactive if one or more of the SSB meets the SSB criteria, the active duration has expired, and the monitoring duration has expired. The WTRU may determine a paging failure associated with the SSB.

In examples, a number of the procedures described may be performed, herein, such as one or more one or more of following:

A current set of desired SSBs that may be a set of current suitable SSBs (e.g., SSBs with DL measurement, (e.g., SS-RSRP above the minimum threshold)).

A current set of desired SSBs that may be a determined based on one of more of the parameters including DL measurement quality (e.g., RSRP/RSSI over the corresponding SSBs), the WTRU's mobility state (e.g., normal/medium/high), the direction in which WTRU is moving, the orientation of the WTRU, blockage statistics, etc.

A monitoring for paging DCI over PMO/PMOs associated with any of the desired SSBs may be done for a duration which may be a maximum between the minimum monitoring duration paging cycles and the duration until next resources for paging activation request associated with SSB/SSBs to be activated may be available.

The WTRU may determine/update the value of the minimum monitoring duration paging cycles based on the WTRU's mobility state.

A determination by the WTRU that if one or more (e.g., any) of the desired SSBs is not active already (e.g., may not be part of the default set of active SSB or may not have positive activation duration counter) and no paging DCI over PMO/PMOs and/or paging message over PDSCH associated with such a SSB is detected for a duration which is a maximum between the minimum monitoring duration paging cycles and the duration until next resources for paging activation request associated with the SSB are available, the WTRU may send a paging activation request using one or more resources associated with the SSB.

A paging DCI monitored by the WTRU that may be a DCI scrambled with P-RNTI containing dynamic information of active SSB/SSBs, short message, and/or scheduling information of paging.

A paging activation request corresponding to a PMO that may be sent by the WTRU which is associated at least with the SSB which is to be activated within a monitored PO to activate an SSB; a paging activation request that may be associated with the WTRU's paging group, where the WTRU's paging group may be determined using WTRU-ID, number of paging frames in a paging cycle, number of paging occasions in a paging frame, etc.

A paging activation request that may be associated with the WTRU's mobility state, where the WTRU's mobility state may be determined based on the rate of beam or cell reselection rate.

If a dynamic information of active SSB/SSBs is received, an activation duration count may be (re-)set by the WTRU to minimum activation duration paging cycles for the SSB/SSBs in the dynamic information; if a dynamic information of active SSB/SSBs is received along with activation state indications, the WTRU may (re-)set the activation duration count for the SSB/SSBs given in the dynamic information to minimum activation duration paging cycles associated with the SSBs' (e.g., each of the SSBs') activation state indication; a determination by the WTRU of the active set of SSBs that may use the information of default set of active PMOs and/or dynamic information of active PMOs.

If the WTRU is configured with multiple default set of active SSBs, a determination from the WTRU of the default set of active SSBs/PMOs associated with the WTRU's paging occasions by using a WTRU-ID, a total number of paging frames in DRX cycle, a total number of paging occasions for a paging frame, and/or a total number of sets (e.g. default sets) of active SSBs supported by the cell/gNB.

If the WTRU is configured with multiple sets of UL time-frequency resources for paging activation requests, a determination by the WTRU of the set of resources associated with the WTRU's POs or paging group, for example, by using one or more of configured parameters including a WTRU_ID, a total number of PFs in DRX cycle, a total number of POs for a PF, and/or a total number of sets of resources allocated by the cell/gNB.

After sending a paging activation request associated with an SSB, if the WTRU does not receive a dynamic information of active SSBs including the requested SSB, another paging activation request sent from the WTRU for the same SSB after a minimum duration, e.g., minimum paging activation request retransmission duration paging cycles. The paging activation request retransmission duration paging cycles may be configured to the WTRU.

The minimum duration before paging activation retransmission may be equal to the value of maximum offset between transmitting a paging activation request for an SSB and receiving a dynamic information of active SSBs including at least the requested SSBs. The value of maximum offset may be configured to the WTRU.

A request from the WTRU to activate SSBs up to a maximum number of SSBs during a certain amount of time (e.g., per paging cycle), where the value of maximum number of SSBs which the WTRU may request for activation over a certain amount of time may be configured by the network.

If the WTRU determines to send paging activation requests to activate multiple SSBs, an assignment from the WTRU of different or same priorities to the SSBs may be activated (e.g., based on DL measurements, and/or WTRU's prediction on its mobility/orientation/blockages, etc.) and may use different transmission techniques (e.g., different transmit powers, different UL control sequence lengths, and/or different number of time-frequency resources, etc.) in sending paging activation requests to activate SSBs with different priorities.

If not any of the current suitable SSBs are part of the default set of active SSBs or have positive (>0) activation duration counter value, and no paging or/and a paging message over PDSCH is/are detected for any of the current suitable SSBs for minimum monitoring duration paging cycles, a paging activation request may be sent from the WTRU to activate one or more suitable or/and desired SSBs.

In FIG. 13, an example is shown on the transmission and reception of aperiodic dynamic information of active SSB/SSBs, and the setting/updating of the value of an activation duration time (e.g., via a activation duration timer) for SSBs. In this example, the default set of active SSBs may contain SSB 12. In this example, the WTRU1 finds SS4 as its suitable SSB, since it may not be given in the default active set. The WTRU1 may not have other information of any dynamically active SSB. The WTRU1 may monitor the PMO associated with the SSB4 for minimum monitoring duration paging cycles, which is 1 in this example. The WTRU1 may not receive any paging DCI during the minimum monitoring duration paging cycle over the PMO associated with the SSB4. The WTRU1 may send a paging activation request for the SSB4, after which the WTRU1 may receive dynamic information of active SSBs containing SSB4 over the PMO associated with SSB4. The WTRU1 may initialize the activation duration counter value for SSB4 to the minimum activation duration paging cycles which is 4 paging cycles. The WTRU1 may find a different SSB, such as SSB5, as its suitable SSB. In examples, since the SSB5 may not be in a default set of active SSBs and may not be active as per the dynamic information of active SSBs received so far by the WTRU1, the WTRU1 may monitor the PMO associated with the SSB5 for minimum monitoring duration paging cycle. During this monitoring period, the WTRU1 may receive a paging DCI with dynamic information of active SSB containing SSB5, which may be due to some other WTRU's (e.g., WTRU2 in this example) paging activation request. The WTRU1 may initialize the activation duration counter value for SS5 to the minimum activation duration paging cycles. The WTRU1 may (e.g., may also) update the ON' duration counter value for SSB1 with the new dynamic information received before the expiration of the previous counter, which may be due to some other WTRU's (e.g., WTRU2 in this example) paging activation request.

In examples, the paging resource overhead can be reduced significantly. In examples, with the minimum activation duration of five paging cycles (e.g., for all mobility states), using DL indication of beams (e.g., active beams), and with monitoring durations of four (e.g., for static WTRUs), two (e.g., for low-mobility WTRUs), zero (e.g., for high-mobility WTRUs), the paging resource overhead may be reduced (e.g., by more than ~80%) to support WTRU density of WTRUs (e.g., 200 WTRUs) per paging occasion in the system beams (e.g., 64) per cell. In examples, the results may incur lower energy consumptions (e.g., may incur significantly lower energy consumptions) at the WTRU (e.g., ~84% less).

In examples, with the minimum activation duration of five paging cycles (e.g., for all mobility states), using DL indication of beams (e.g., active beams) but without enabling any monitoring duration (e.g., monitoring duration=0 for all the WTRUs), the paging resource overhead may be reduced (e.g., by more than ~80%) with a reduction (e.g., ~77% reduction) in WTRU energy consumption.

In examples, with the minimum activation duration of five paging cycles (e.g., for all mobility states), using DL indication of beams (e.g., active beams) but without enabling any monitoring duration (e.g., monitoring duration=0 for all the WTRUs), the paging resource overhead may be reduced (e.g., by more than ~80%) with a reduction (e.g., ~77% reduction) in WTRU energy consumption.

Figure 15:
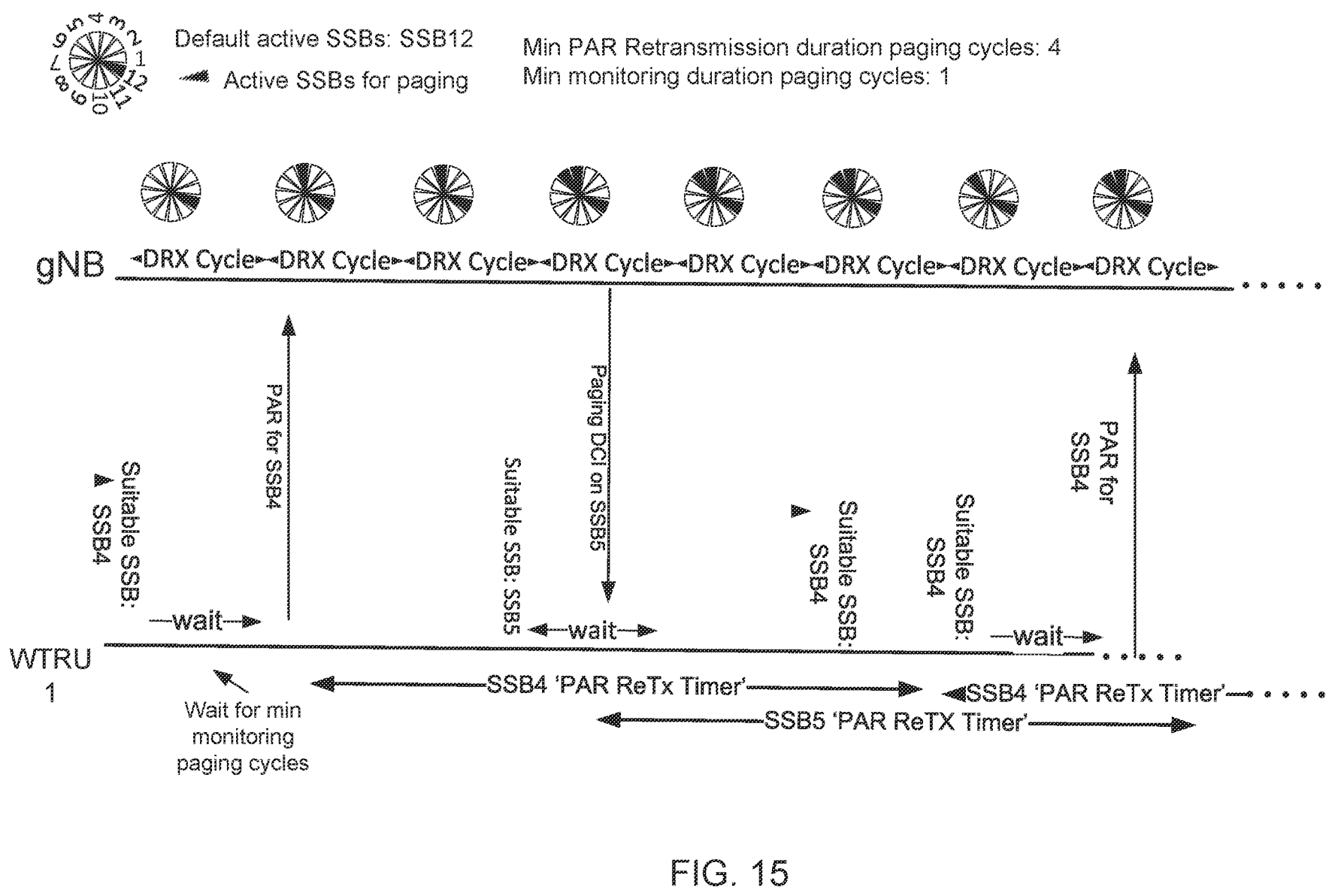

FIG. 14 shows an example WTRU procedure to support minimal feedback enabled paging procedure by using the information of default, a Retransmission (ReTx) Time (e.g. a minimum ReTx), and a monitoring duration (e.g. a minimum monitoring duration) parameter or threshold according to an embodiment. FIG. 15 shows an example showing the operation of PAR retransmission time and minimum monitoring duration for triggering a PAR for a suitable SSB according to an embodiment. For example, the procedure in FIG. 14 may include at least one of the following: receive configuration information (e.g., a configuration of resources for paging activation requests (PARs)), minimum PAR retransmission duration paging cycles, minimum monitoring duration paging cycles, and default set of active SSBs, where the confirmation information indicates a paging occasion including the beams associated with the active SSBs which may be used to receive paging information (e.g., DCI scrambled with P-RNTI) or/and paging message over PDSCH; determine the current set of desired SSBs (e.g., SSBs are to be activated); may determine a change in the current set of desired SSBs (as compared to the previous set of desired SSBs) or PAR retransmission time (e.g., via the PAR retransmission timer) is expired for any of the desired SSBs; determine that none of the current desired SSBs are part of the default set of active SSBs or have positive (>0) PAR retransmission time value (e.g., not expired) via the PAR transmission timer; may monitor for paging DCI over PMO/PMOs and/or paging message over PDSCH associated with any of the desired SSBs for minimum monitoring duration paging cycles; on a condition that an SSB criteria (e.g., a paging DCI or/and a paging message over PDSCH is/are not detected for any of the desired SSBs) is met an PAR retransmission time has elapsed, and a monitoring duration has elapsed, send a message (e.g., paging activation request) to a network indicating the beam(s) associated with the SSBs is to be used by the network for sending paging information using one or more resources associated with one or more SSBs; receive, via the beam(s) during the paging occasion, the paging information; and set the PAR retransmission time (e.g., via the PAR retransmission timer) for the requested SSBs to the configured minimum PAR retransmission duration paging cycles.

In examples, a configuration associated with the SSB may be determined using a system information for the WTRU. The WTRU may determine one or more of the SSB criteria, the resource, the monitoring duration, and the activation duration using the configuration associated with the SSB. The WTRU may determine if an SSB meets an SSB criteria. The SSB may meet the SSB criteria if a signal measurement of the beat is above a threshold.

In examples, the WTRU may determine the SSB is inactive if one or more of the SSB meets the SSB criteria, the PAR retransmission time has expired, and the monitoring duration has expired. The WTRU may determine that the SSB has remained inactive when the monitoring duration has elapsed. The WTRU may determine a paging failure associated with the SSB.

In examples, the WTRU may send a second message (e.g., second paging activation request) to the network following a first message (e.g., first paging activation request) if the paging information has been received by the WTRU. The second message may indicate a request to resume to establish a connection.

Examples may include the following: a current set of desired SSBs that may be a set of current suitable SSBs (e.g., SSBs with DL measurement, e.g., SS-RSRP above the minimum threshold); a current set of desired SSBs that may be a determined based on one of more of the parameters including DL measurement quality (e.g., RSRP/RSSI over the corresponding SSBs), WTRU's mobility state (e.g., normal/medium/high), direction in which WTRU is moving, orientation of the WTRU, blockage statistics, etc.; a monitoring for paging DCI over PMO/PMOs associated with any of the desired SSBs that may be done for a duration which is maximum between the minimum monitoring duration paging cycles and the duration until next resources for paging activation request associated with SSB/SSBs to be activated are available; the WTRU may determine/update the value(s) of the minimum monitoring duration paging cycles based on the WTRU's mobility state; the WTRU may determine/update the value(s) of the PAR retransmission time of an SSB based on the measurement quality of the SSB; if the WTRU determines that if any of the SSBs which are to be activated is not active already (not part of the default set of active SSB) or does not have PAR retransmission time running (e.g., via a PAR transmission timer), and no paging DCI over PMO/PMOs or/and paging message over PDSCH associated with such SSB is detected for a duration which is maximum between the minimum monitoring duration paging cycles and the duration until next resources for paging activation request associated with the SSB is available, a paging activation request may be sent by the WTRU using one or more resources associated with the SSB; the WTRU may determine/update the value(s) of the minimum paging activation request retransmission paging cycles based on the WTRU's mobility state; a paging DCI monitored by the WTRU that may be a DCI scrambled with P-RNTI containing short message, and/or scheduling information of paging; a paging activation request sent by the WTRU corresponding to a PMO which is associated at least with the SSB which are to be activated within a monitored PO to activate an SSB; a paging activation request that may be associated with the WTRU's paging group, where the WTRU's paging group may be determined using WTRU-ID, number of paging frames in a paging cycle, and number of paging occasions in a paging frame; a paging activation request may be associated with the WTRU's mobility state, where the WTRU's mobility state may be determined based on the rate of beam or cell reelection rate; if the WTRU is configured with multiple default set of active SSBs, a determination of the WTRU of the default set of active SSBs/PMOs associated with the WTRU's paging occasions by using WTRU-ID, total number of paging frames in DRX cycle, total number of paging occasions for a paging frame, and/or total number of sets (e.g., default sets) of active SSBs supported by the cell/gNB; if the WTRU is configured with multiple sets of UL time-frequency resources for paging activation requests, a determination by the WTRU of the set of resources associated with the WTRU's POs or paging group, for example, by using one or more of configured parameters including WTRU_ID, total number of PFs in DRX cycle, total number of POs for a PF, and/or a total number of sets of resources allocated by the cell/gNB; a request from the WTRU to activate SSBs up to a maximum number of SSBs during a certain amount of time (e.g., per paging cycle), where the value of maximum number of SSBs which the WTRU may request for activation over a certain amount of time may be configured by the network; if the WTRU determines to send paging activation requests to activate multiple SSBs, an assignment by the WTRU of different or same priorities to the SSBs that may be requested to be activated (e.g., based on DL measurements, and/or WTRU's prediction on its mobility/orientation/ blockages, etc.) and may use different transmission techniques (e.g., different transmit powers, different UL control sequence lengths, and/or different number of time-frequency resources, etc.) in sending paging activation requests to activate SSBs with different priorities; and if none of the current suitable SSBs are part of the default set of active SSBs or have positive (>0) PAR retransmission time value (e.g., not expired) via a PAR retransmission timer, and no paging or/and a paging message over PDSCH is/are detected for any of the current suitable SSBs for minimum monitoring duration paging cycles, a paging activation request sent by the WTRU to activate one or more suitable and/or desired SSBs.

FIG. 15 shows an example of the operation of paging activation request retransmission time and the minimum monitoring duration. In examples, the default set of active SSBs may contain SSB 12. In examples, the WTRU1 may find SSB4 as its suitable SSB, since it is may not be given in the default active set. The WTRU1 may first monitor the PMO associated with the SSB4 for minimum monitoring duration paging cycles, which is 1 as shown in FIG. 15. The WTRU1 may not receive any paging DCI during the minimum monitoring duration paging cycle over the PMO associated with the SSB4. The WTRU1 may send a paging activation request for the SSB4, after which the WTRU1 may utilize the paging activation request retransmission time (e.g., via the paging activation request retransmission timer) for SSB4 with the initial value set to the configured minimum paging activation request retransmission duration paging cycles. In one or more (e.g. each) of the paging cycles, the WTRU1 may decrease the time value by one. The WTRU1 may find a different SSB, SSB5, as its suitable SSB. Since the SSB5 may not be a default set of active SSBs and there is no paging activation request retransmission time running for SSB5, the WTRU1 may monitor the PMO associated with the SSB5 for minimum monitoring duration paging cycle. During this monitoring period, the WTRU may receive a paging DCI over SSB5. The WTRU1 may not send any paging activation request for the SSB5 after the minimum monitoring duration. The WTRU1 may initialize the paging activation request retransmission time for SSB5 with the initial value set to the configured minimum paging activation request retransmission duration paging cycles. The WTRU1 may find a different SSB, such as SSB4, as its suitable SSB, but since the paging activation request retransmission time is running for SSB4, the WTRU may not send any request to activate it. After the expiration of the paging activation request retransmission time for SSB4, the WTRU1 first monitors the SSB4 for a minimum monitoring duration paging cycles, and since it may not receive any paging DCI during that time, it may send a paging activation request after the minimum monitoring duration.

Examples describing a procedure performed by a gNB to support a feedback based (e.g., a minimal feedback based) paging procedure may include at least one of the following: determine a default set of active SSBs, resources for paging activation requests, minimum activation duration paging cycles (or minimum paging activation request retransmission duration paging cycles), and/or minimum monitoring duration paging cycles for one or more (e.g., each) of the supported paging groups; and send a configuration including a default set of active SSBs, resources for paging activation requests, minimum activation duration paging cycles, and/or minimum monitoring duration paging cycles (e.g., associated with each paging group) to one or more WTRUs as a part of the system information (e.g., SIB1).

Examples may include the following: a default set of active SSBs, resources for paging activation requests (e.g., periodicity of the resources), minimum activation duration paging cycles (or minimum paging activation request retransmission duration paging cycles), and/or minimum monitoring duration paging cycles may be determined based on the arrival rate of paging requests at the gNB, ratio of WTRUs transitioned to the connected state from the idle/ inactive state via the gNB, WTRU density, coverage area, etc.; multiple values for minimum activation duration paging cycles (or minimum paging activation request retransmission duration paging cycles), and/or minimum monitoring duration paging cycles may be defined based on the number of WTRU's mobility states (e.g., different WTRU's mobility states); resources for paging activation requests may be allocated specific to SSBs/PMOs supported by the gNB, and/or specific to different supported paging groups (e.g., equals to the total number of paging occasions allocated in a paging cycle duration) supported by the gNB, and/or specific to supported WTRU's mobility states; a configuration (including a default set of active SSBs, resources for paging activation requests, one or more minimum activation duration paging cycles (or minimum paging activation request retransmission duration paging cycles, and/or one or more minimum monitoring duration paging cycles) associated with a paging group (e.g., each paging group) or associated with a WTRU's paging group may be sent to the WTRU in RRC Release message (e.g., as a part of the suspend config or as a separate configuration) during the WTRU's RRC CONNECTED state; a configuration (including default set of active SSBs, resources for paging activation requests, one or more minimum activation duration paging cycles (or minimum paging activation request retransmission duration paging cycles), and/or one or more minimum monitoring duration paging cycles) associated with a paging group (e.g., each paging group) or associated with a WTRU's paging group may be sent to the WTRU in physical downlink control channel (e.g., using DCI) during the WTRU's RRC CONNECTED state (e.g., DCI scrambled with UE's C-RNTI) or IDLE/INACTIVE state (e.g., DCI scrambled with WTRU's P-RNTI); and a configuration (including default set of active SSBs, resources for paging activation requests, one or more minimum activation duration paging cycles (or minimum paging activation request retransmission duration paging cycles), and/or one or more minimum monitoring duration paging cycles) associated with a paging group (e.g., each paging group) or associated with a WTRU's paging group may be sent to the WTRU in physical downlink shared channel (e.g., using MAC-CE) during the WTRU's RRC CONNECTED state.

Examples describing a procedure performed by a gNB to support minimal feedback based paging procedure may include at least one of the following: on reception of a paging activation request from a WTRU, activate (e.g., dynamically) a beam associated with the resource/resources used for the paging activation request, for the paging group (e.g., associated POs) of the WTRU, for a minimum duration of minimum activation duration paging cycles; upon (re-) activation of one or more beams, send one or more downlink messages including the identifications of all the newly/ recently (re-)activated beams to the associated WTRUs/ paging group, using the downlink control information (e.g., DCI scrambled with P-RNTI); and send DCI containing scheduling information of paging message, DCI containing Short Message, or/and paging message over PDSCH to a paging group, using the active beams (e.g., default and dynamically activated beams) associated with the paging group.

Examples may include the following: on reception of a paging activation request from a WTRU, a beam may be activated (e.g., dynamically) for a minimum duration of minimum activation duration paging cycles associated with the requesting WTRU's mobility state, where the requesting WTRU's mobility state may be determined from a resource used for the paging activation request; upon re(-)activation of one or more beams, one or more downlink messages including the identification of the newly/recently (re-)activated beams (e.g., all of the beams) may be sent to the associated WTRUs/paging group along with activation state indications associated with the selected minimum activation duration for the newly/recently (re-)activated beams (e.g., for each of the beams); one or more beams that may be (re-)activated or deactivated by the gNB also based on the WTRU distribution statistics over the coverage area, a request/command from the core network, and/or based on the experienced paging latency for one or more WTRUs (e.g., for RAN-initiated paging); deactivation of a beam that may be performed by the gNB after the associated minimum activation duration expires; deactivation of a beam that may be performed by the gNB based on the additional information received by a WTRU transitioned from the IDLE/ INACTIVE mode to the CONNECTED mode (e.g., information may include beam/beams requested by the WTRU for activation); on deactivation of one or more beams, one or more downlink messages that may send by the gNB containing the identifications of all the recently deactivated beams to the associated WTRUs/paging group, using the downlink control information (e.g., DCI scrambled with P-RNTI); downlink message(s) that may include the information of (re-)activated and/or de-activated beams may be sent to the associated WTRUs/paging group, using the downlink shared channel (e.g., within PCH along with the paging message carded over PDSCH or an independent/ separate PDSCH) for which the decoding information may be sent in a DCI scrambled with P-RNTI; downlink message(s) that may include the information of (re-)activated or/and de-activated beams may be sent to the associated WTRUs/paging group, using system information (e.g., SIB1 or SIB2, etc.); downlink message(s) including the information of (re-)activated and/or de-activated beams may be sent to the associated WTRUs/paging group, using a downlink RRC message (e.g., within RRC Release message to an associated WTRU just before it moves to the RRC IDLE or RRC INACTIVE state); downlink message(s) that may include the information of (re-)activated or/and de-activated beams may be sent to the associated WTRUs/ paging group, over the currently activated beams associated with the paging group (e.g., associated POs); and a maximum offset that may be provided and configured to the WTRUs, which may indicate the maximum duration (e.g., in terms of number of paging cycles/slots/symbols) between receiving a paging activation request for a beam and sending an associated dynamic information of active beams by the gNB.

A dynamic DRX/paging cycle based approach may be provided. In this approach, a gNB may configure a PO of one or more SSBs (e.g., active SSBs) or a set of SSBs (e.g., set of active SSBs), where POs (e.g., different POs) associated with the paging group (e.g., same paging group) may have a set of SSBs (e.g., different or same set of active SSBs).

An SSB pattern may be defined. An SSB pattern may include a sequence of SSB sets, where a SSB set (e.g., each SSB set) may have one or more SSB IDs. In examples, an SSB pattern with a sequence of SSB sets (e.g., four SSB sets) may be defined as, {{SSB Set 1: SSB ID 1, SSB ID 9, SSB ID 11}, {SSB Set 2: SSB ID 2, SSB ID 6, SSB ID 10, SSB ID 11}, {SSB Set 3: SSB ID 1, SSB ID 2, SSB ID 3, . . . , SSB ID 12}, {SSB Set 4: SSB ID 2, SSB ID 4, SSB ID 7}}. The configuration of SSB pattern may be used to indicate the active SSBs or set of active SSBs associated with different POs of a WTRU/paging group. In examples, each set given in the SSB pattern may include the SSB IDs of the active SSBs, and a SSB set (e.g. each SSB set) may be associated with one or more POs.

Figure 16:
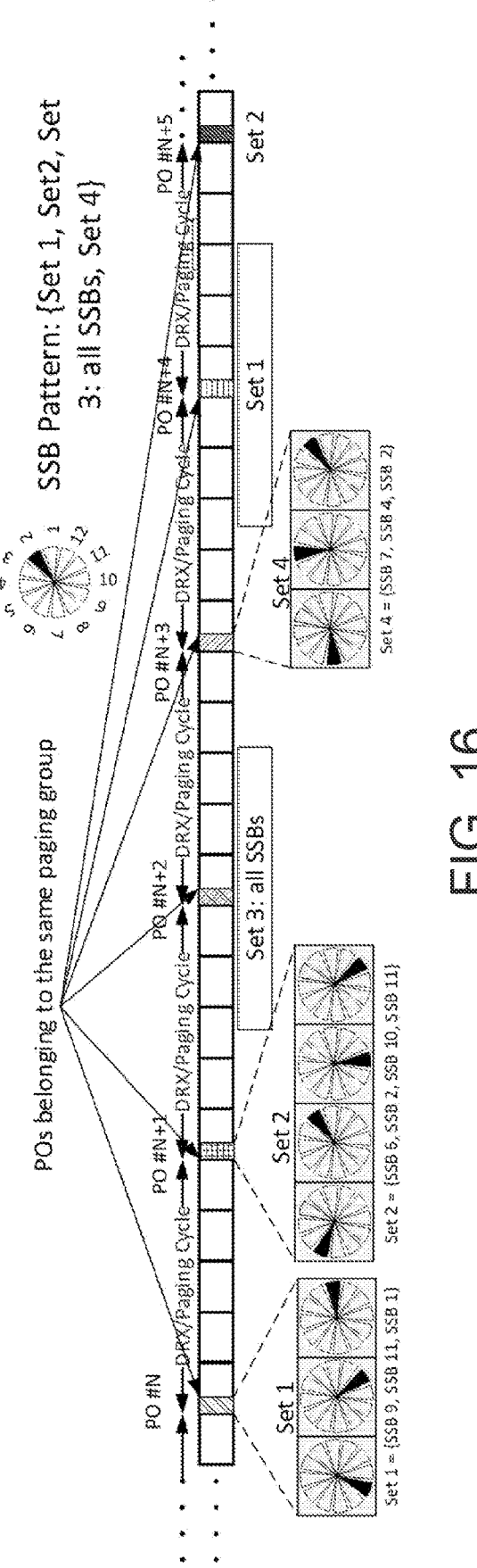
FIG. 16 shows an example of association between an SSB pattern and paging occasions.

FIG. 16 shows an example of association between an SSB pattern and paging occasions. FIG. 16 shows SSB set (e.g., four SSB sets), where the PO #N has SSB set 1 as its set of active SSBs, PO #N+1 has SSB set 2 as its set of active SSBs, PO #N+2 has SSB set 3 as its set of active SSBs, PO #N+3 has SSB set 4 as its set of active SSBs, PO #N+4 has SSB set 1 as its set of active SSBs, PO #N+5 has SSB set 2 as its set of active SSBs, and so on.

The configuration of SSB pattern(s) may be paging group and/or WTRU specific. A WTRU may be configured with the associated SSB pattern. Given the SSB pattern, the WTRU may determine the SSBs (e.g., active SSBs) or set of SSBs (e.g., set of active SSBs) associated with POs (e.g., each of the SSBs' POs). Using the knowledge of active SSBs associated with one or more POs (e.g., each of its POs), and the knowledge of suitable SSB/SSBs, the WTRU may determine the POs (e.g., as well as the PMOs of the PO) to be monitored. The WTRU may determine the DRX/ paging cycle the WTRU needs to use, at least to monitor the paging related information which may be configured to be sent using the active SSBs. In examples, the WTRU may wake up to monitor the POs for which the associated active SSBs include at least the WTRU's suitable SSB. If any of the WTRU's suitable SSBs are changed, the WTRU may update the POs, which may be monitored, using information (e.g., the updated information) of suitable SSB/SSBs and the knowledge of SSB pattern(s) associated with the WTRU or the WTRU's paging group.

SSB pattern configurations may be provided. To enable dynamic DRX/paging cycle enabled paging, the WTRU may be configured with one or more SSB pattern configurations. A pattern (e.g. each pattern) may have an identification (e.g., SSB pattern ID). The configuration of one or more SSB patterns may be received using system information (e.g., SIB1), higher layer signaling such as RRC signaling (e.g., RRC release message during the RRC CON- NECTED state), downlink control information (DCI), or downlink shared channel (e.g., MAC-CE during the RRC CONNECTED state), etc.

The WTRU may be configured with the SSB pattern (e.g., SSB pattern ID) associated with the WTRU or WTRU's paging group. The configuration of SSB pattern(s) associated with the WTRU or WTRU's paging group may be communicated using system information (e.g., SIB1), higher layer signaling such as RRC signaling (e.g., RRC release message during the RRC CONNECTED state), downlink control information (DCI), or downlink shared channel (e.g., MAC-CE during the RRC CONNECTED state), etc.

In examples, given one or more SSB pattern configurations, the WTRU may determine the SSB pattern configuration associated with the WTRU or the WTRU's paging group. In examples, using one or more of the parameters including WTRU_ID, a number of SSB pattern configurations, a number of total PFs in a paging cycle, and a number of POs for a PF, SFNs of the PFs, etc.

The WTRU may monitor a PO in a paging cycle (e.g., each paging cycle). The WTRU may determine the mapping between the SSB sets (e.g., set of active SSBs) of its SSB pattern(s) and the POs associated with the WTRU or the WTRU's paging group. In examples, using one or more of the parameters including number of SSB sets defined in the associated SSB pattern, SFNs of the PFs, paging cycle, paging offset, etc. In examples, if there are 'N1' number of SSB sets defined in the WTRU's SSB pattern(s), the SSB set (from SSB sets 0, 1, 2, . . . . N1–1) associated with the WTRU's PO in the PF SFN 'S' may be given the following formula:

$$i\_sn=\lfloor (S)/(\text{paging cycle})\rfloor \bmod N1, \text{ where } i\_sn\in\{0,1, 2, \ldots N1-1\}$$

Configuration of PMOs may be provided. The network may use an SSB pattern to transmit the paging related information over POs (e.g., different POs) for a paging group/WTRU. POs (e.g., each PO) may be configured with a number of PMOs needed to support the number of SSBs given in the associated SSB set. The number of PMOs may be determined based on the type of PMO to SSB mapping that is used (e.g., one-to-one, many-to-one, or one-to-many). In examples, in one-to-one PMO to SSB mapping, if a PO has an associated SSB set having a number of SSB IDs (e.g., three SSB IDs {SSB ID 1, SSB ID 4, SSB ID 5}), the PO may have three PMOs configured within it. In examples, the first PMO may be associated with SSB ID 1, the second PMO may be associated with SSB ID 4, and the third PMO may be associated with SSB ID 5.

The WTRU may be configured with the information/ indication if the number of PMOs configured for POs (e.g., each PO) depends on the number of SSBs (e.g., active SSBs) or not. The number of PMOs configured for a PO (e.g., each PO) may not depend on the number of active SSBs if there are a fixed number of PMOs configured for a PO (e.g., each PO) (e.g., in one-to-one PMO to SSB mapping), and the number of PMOs is equal to the total number of SSBs supported by the gNB. The WTRU may be configured with the type of PMO to SSB mapping. The WTRU may determine the PMOs associated with a SSB (e.g., each SSB) given in the associated SSB set.

Dynamic determination of DRX/paging cycle may be provided. Based on the SSB pattern configuration, and the mapping of the SSB sets to the POs in paging cycles (e.g., different paging cycles), the WTRU may determine the SSBs (e.g., active SSBs) associated with its POs in different paging cycles. In examples, the SSB IDs given in the SSB set identified for a PO may be the IDs of the active SSBs for the PO.

For POs (e.g., each PO), the WTRU may assume that one or more of paging related information may be transmitted over the PMOs associated with the SSBs (e.g., active SSBs). The information of which paging related information may be transmitted using active SSBs (or over PMOs associated with active SSBs) and/or which paging related information may be transmitted over the SSBs (e.g., all the SSBs, including both active and inactive SSBs) or the PMOs (e.g., all the PMOs) may be communicated to the WTRU.

The WTRU may determine the POs or paging cycles to be monitored, at least for the paging information which may be configured to be transmitted using active SSBs, based on the WTRU's associated SSB pattern and the WTRU's suitable SSB/SSBs.

In examples, the WTRU may select POs/paging cycles (e.g., all the POs/paging cycles) to monitor for which the associated SSB set(s) include at least one of the WTRU's suitable SSBs. In examples, if the WTRU's suitable SSB is SSB ID 1, the WTRU may monitor POs with SSB set 1, POs with SSB set 3, and may not monitor POs having SSB set 2 and POs having SSB set 4.

In examples, the WTRU may select sub-set(s) of POs/ paging cycles to monitor out of the POs/paging cycles (e.g., all the POs/paging cycles) for which the associated SSB set includes at least one or the WTRU's suitable SSBs. In examples, if the WTRU's suitable SSB is SSB ID 2, the WTRU may select POs having SSB set 2 and POs having SSB set 4 to monitor and may not select POs having SSB set 3 to monitor, even if the POs having SSB set 3 has WTRU's suitable SSB as an active SSB. The WTRU may select the POs/paging cycles to monitor, for example, based on one or more of: a minimum requirement of paging cycle periodicity, a minimum paging latency, an energy efficiency requirement, etc., the WTRU may support. The WTRU may select the POs/paging cycles such that a requirement (e.g., minimum requirement of paging cycles periodicity) may be met. The requirement of minimum paging cycle periodicity, the minimum paging latency, energy efficiency, etc., may be configured to the WTRU. In examples, the network may configure different requirements for the minimum paging cycle periodicity, the minimum paging latency, energy-efficiency requirements, etc., based on the WTRU-class or traffic class. In examples, a delay-sensitive WTRU/application may need to monitor more POs compared to a non-delay sensitive WTRU/application.

If one or more of the WTRU's suitable SSBs is/are changed, the WTRU may update the selection of the POs/ paging cycles based on SSB/SSBs (e.g., the updated suitable SSB/SSBs) and the configured SSB pattern(s).

In POs (e.g., each PO) the WTRU may be selected to monitor, the WTRU may monitor for a paging related DCI (e.g., at least which is configured to be sent over the active SSBs) over one or more PMOs associated with the WTRU's one or more suitable SSBs included in the PO's associated SSB set.

QoS/WTRU-class dependent SSB-pattern design may be provided. SSB patterns (e.g., different SSB patterns) may be defined/designed/configured in order to support different types/classes of the WTRUs or traffic types or applications. In examples, different WTRU classes may be defined based on the WTRU's traffic types (e.g., delay-sensitive or non-delay sensitive) or the WTRU's energy efficiency requirements, etc. The network may configure different SSB patterns for different WTRUs within a paging group (e.g., the same paging group). In examples, an SSB pattern with SSB sets having a greater number of SSBs (e.g., active SSBs) may be configured for delay-sensitive WTRUs compared to the non-delay sensitive WTRUs.

Figure 17:
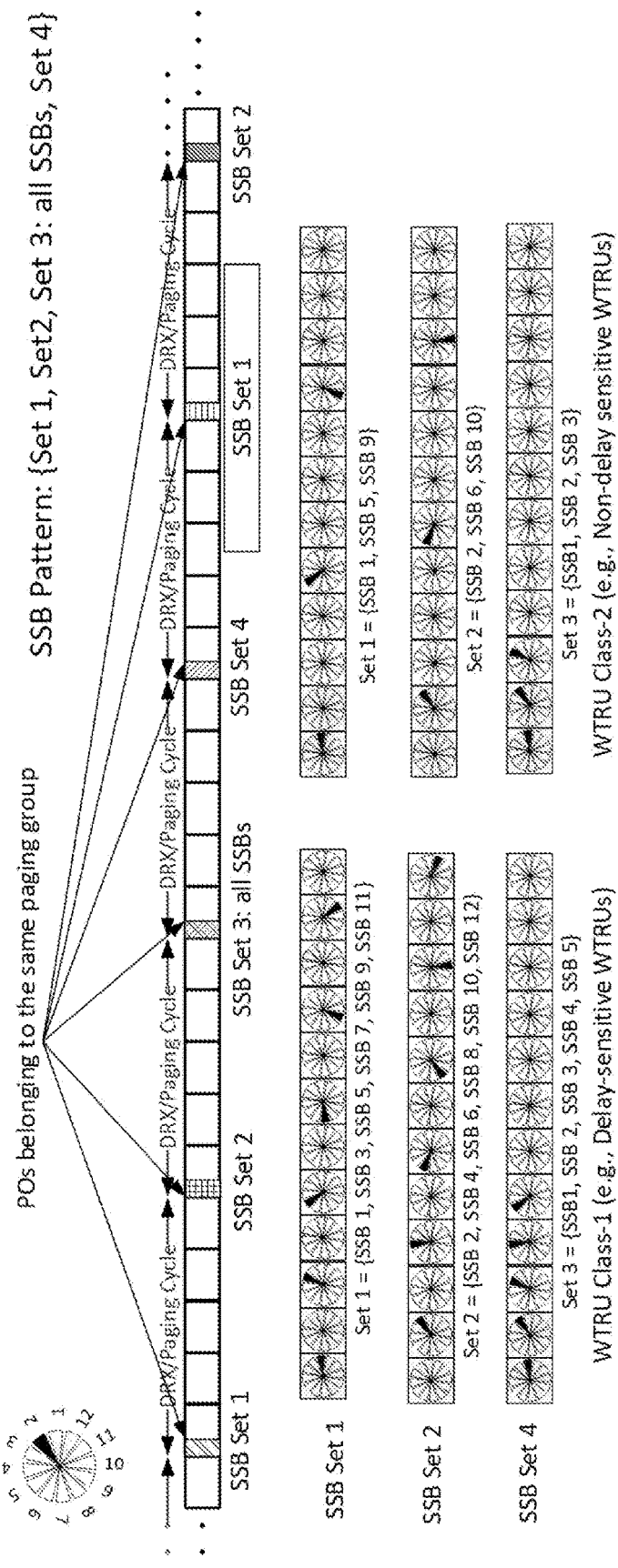
FIG. 17 shows an example of WTRU class base SSB pattern design.

FIG. 17 shows an example of WTRU class base SSB pattern design. As shown in FIG. 17, within the same paging group, different SSB patterns may be configured for different classes of WTRUs. SSB sets in SSB pattern(s) configured for delay-sensitive WTRUs may have a greater number of active SSBs compared to the SSB sets in the SSB pattern(s) defined for the non-delay sensitive WTRUs. Patterns (e.g., different patterns may be configured for WTRUs (e.g., different WTRUs) of the paging group (e.g., same paging group). Different SSB sets may be enabled within the same PO (e.g., as shown in FIG. 17). The number of PMOs in POs (e.g., each PO) may be defined such that SSB sets (e.g., all different SSB sets) which may be supported (e.g., for different WTRU-classes) may be enabled. As shown in FIG. 17, a fixed number of PMOs may be defined, where one PMO may be allocated for each of the SSBs supported by the gNB (e.g., one-to-one mapping between PMOs and SSBs is assumed). The information of PMOs to SSBs mapping in POs (e.g., each PO) may be configured to the WTRU, which may be used by the WTRU to determine the PMOs in each PO associated with one or more (e.g. each) of the SSBs (e.g., SSBs given in the associated SSB set).

The WTRU may be configured with the SSB pattern (e.g., SSB pattern ID) associated with the WTRU's class. In examples, given one or more SSB pattern configurations, the WTRU may determine the SSB pattern configuration associated with it. In examples, using the WTRU class and/or one or more of the parameters which may include WTRU_ID, number of SSB pattern configurations, number of total PFs in a paging cycle, number of POs for a PF, SFNs of the PFs, etc.

In examples, given or more SSB pattern configurations for the WTRU's paging group, the WTRU may determine SSB pattern configuration(s) to monitor, based on the energy efficiency requirements and/or paging delay/latency requirements, which may be configured to the WTRU. In examples, a delay sensitive WTRU may select an SSB pattern with a greater number of SSBs (e.g., active SSBs) in the SSB set compared to a non-delay sensitive WTRU.

In RAN-initiated paging, where a gNB has WTRU context information, the gNB may configure SSB patterns (e.g., different types of SSB patterns) based on the WTRU context information. In CN-initiated paging, the gNB may receive from the CN, the WTRU context information to design SSB patterns (e.g., different patterns).

Figure 18:
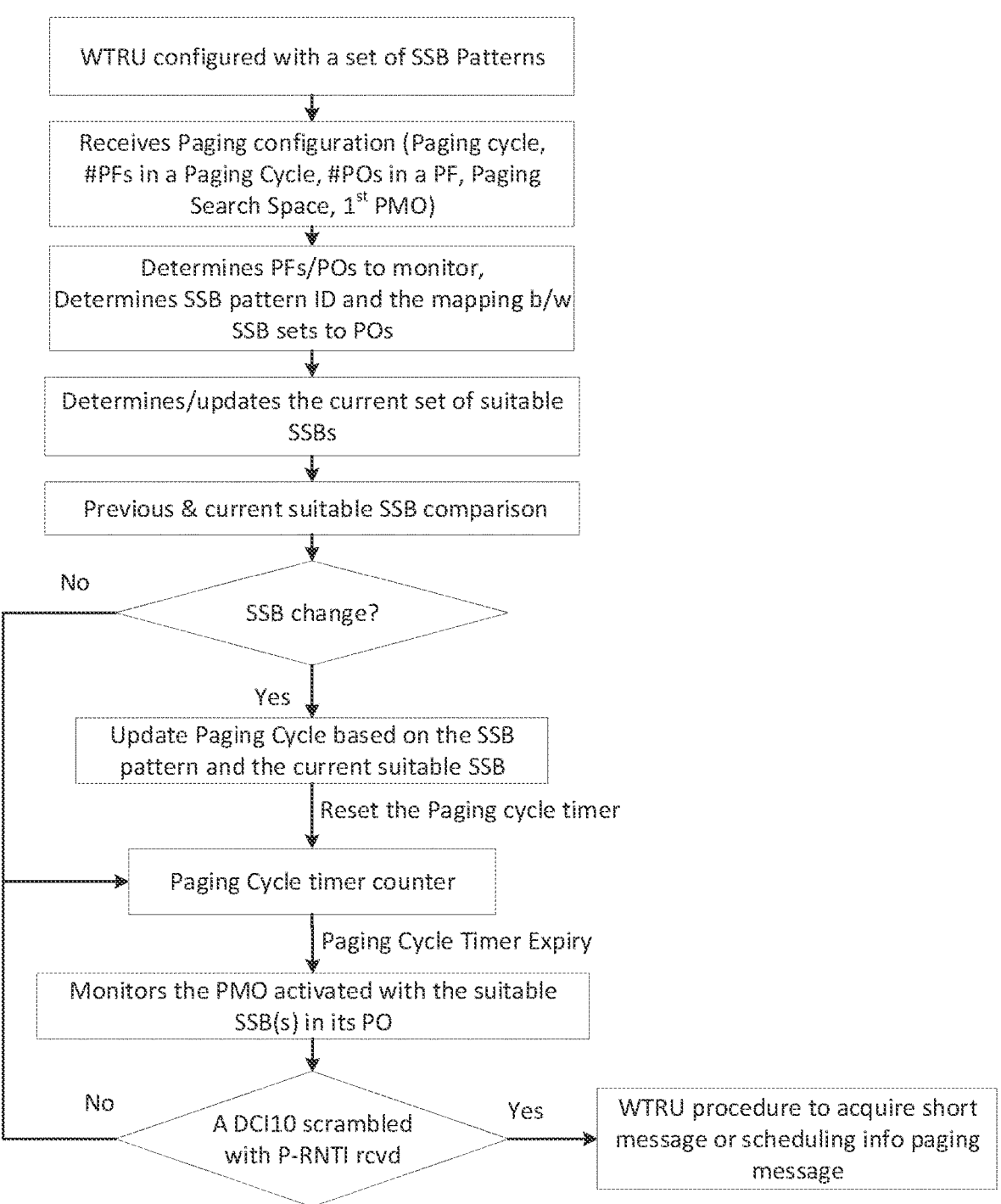
FIG. 18 shows an example of a WTRU procedure to support a dynamic DRX cycle.

FIG. 18 shows an example of a WTRU procedure to support a dynamic DRX cycle. The WTRU procedure may support dynamic paging cycle or support dynamic updating POs to monitor. In the example, the WTRU may perform the following: may receive a set of SSB pattern configurations (each pattern with a specific identity, e.g., SSB pattern ID), where an SSB pattern indicates the set of active SSB (e.g., beams/SSBs which may be used to receive a paging DCI and/or paging message) associated with different POs; may determine the SSB pattern associated with the WTRU or the WTRU's paging group; may determine the mapping between the SSB sets (e.g., set of active SSBs) of the associated SSB pattern and the POs; may determine the POs or paging cycles to monitor using the associated SSB pattern and the WTRU's suitable SSB; may update/re-select the POs or paging cycles to monitor, if any of the suitable SSBs or associated SSB pattern is changed; and during POs (e.g., each PO), may monitor for a paging related DCI over one or more PMOs associated with WTRU's one or more suitable SSBs contained in the PO's associated SSB set.

In examples, the WTRU may perform the following: may select a sub-set of POs/paging cycles (e.g., all the POs/paging cycles) to monitor for which the associated SSB set in the configured SSB pattern includes at least one or the WTRU's suitable SSBs; select a sub-set of POs/paging cycles (e.g., all the POs/paging cycles) to monitor for which the associated SSB set in the configured SSB pattern includes at least one or the WTRU's suitable SSBs using parameters such as minimum paging cycle periodicity, the minimum paging latency, and/or energy efficiency, etc.; and may determine the SSB pattern configuration to consider (e.g., in case of multiple SSB patterns configuration for the WTRU's paging group) based on WTRU-class, energy efficiency requirements, and/or paging delay/latency requirements, which may be known or configured to the WTRU.

Examples may be performed by a gNB to support dynamic paging cycle based paging procedure. In the examples, the gNB may perform the following: may determine an SSB pattern for one or more (e.g. each) of the supported paging groups; may send configuration of supported SSB patterns (e.g., each with an associated pattern ID) to the WTRUs as a part of the system information (e.g., SIB1); and may send DCI containing scheduling information of paging message, DCI containing short message, and/or paging message over PDSCH in a PO to a paging group, using the active beams associated with the PO as configured in the SSB pattern for the paging group.

In examples, the gNB may perform the following: the SSB pattern for supporting paging groups may be determined based on the arrival rate of paging requests at the gNB, the ratio of WTRUs transitioned to the connected state from the idle/inactive state via the gNB, WTRU density, coverage area, etc.; different (e.g., separate) SSB patterns may be determined based on the supported types/classes of the WTRUs, the configuration of SSB pattern(s) may (e.g., may also) include information of the associated WTRU class or traffic type, etc.; may determine the PMO to SSB mapping for a PO, based on the number of different supported SSB sets over the PO; may send the information of PMO to SSB mapping (e.g., such as the type of mapping, e.g., one-to-one, indication if SSBs given the associated active set is allocated PMOs or additional/all SSBs are allocated PMOs, etc.) to the WTRUs as a part of the system information (e.g., SIB1); may configure a SSB pattern associated with a WTRU's paging group or configure all supported SSB patterns, and/or information of PMO to SSB that may be sent to the WTRU in RRC release message (e.g., as a part of the suspend config or as a separate configuration) during the WTRU's RRC CONNECTED state; may configure a SSB pattern associated with a WTRU's paging group or configure all supported SSB patterns, and/or information of PMO to SSB that may be sent to the WTRU in a physical downlink control channel (e.g., using DCI) during the WTRU's RRC CONNECTED state (e.g., DCI scrambled with WTRU's C-RNTI) or IDLE/INACTIVE state (e.g., DCI scrambled with WTRU's P-RNTI); and may configure a SSB pattern associated with a WTRU's paging group or configure all supported SSB patterns, and/or information of PMO to SSB that may be sent to the WTRU in a physical downlink shared channel (e.g., using MAC-CE) during the WTRU's RRC CONNECTED state.

Although features and elements described above are described in particular combinations, a (e.g. each) feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the procedures described herein consider LTE, LTE-A, New Radio (NR) or 5G specific protocols, it is understood that the procedures described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU), the WTRU comprising:

a processor, the processor configured to:

receive system information from a network node;

determine first configuration information associated with a synchronization signal and physical broadcast control channel block (SSB) using the system information;

determine, using the first configuration information, an uplink resource associated with the SSB, that the SSB meets an SSB criteria, that the SSB is inactive when an activation duration has elapsed, and that the WTRU is permitted to send an activation request for the SSB when a monitoring duration has elapsed, wherein the SSB criteria includes at least that a signal measurement of a beam surpasses a threshold;

if the SSB does not meet the SSB criteria, refrain from sending the activation request and disregard the SSB for paging until a subsequent monitoring duration has elapsed; and if the SSB meets the SSB criteria:

send a message to the network node using the uplink resource based on the determination that the SSB meets the SSB criteria, the SSB is inactive, and the WTRU is permitted to send the activation request, wherein the message indicates the beam associated with the SSB to be used to receive paging information;

receive a second configuration information from the network node, wherein the second configuration information indicates that a paging occasion associated with the SSB has been activated to receive the paging information; and receive, via the beam during the paging occasion, the paging information.

2. The WTRU of claim 1, wherein the SSB meets the SSB criteria if the signal measurement of the beam surpasses the threshold.

3. The WTRU of claim 1, wherein the processor is further configured to determine a paging failure associated with the SSB.

4. The WTRU of claim 1, wherein the message is a first message, and wherein the processor is further configured to send a second message to the network node if the paging information has been received by the WTRU, wherein the second message indicates a request to resume or establish a connection.

5. The WTRU of claim 1, wherein the activation duration is a minimum duration over which the SSB is active.

6. The WTRU of claim 1, wherein the monitoring duration is based on an amount of mobility of the WTRU.

7. The WTRU of claim 1, wherein the threshold includes a reference signal strength indicator (RSSI) threshold.

8. The WTRU of claim 1, wherein the threshold includes a reference signal received power (RSRP) threshold.

9. A method implemented in a wireless transmit/receive unit (WTRU), the method comprising:

receiving system information from a network node;

determining first configuration information associated with a synchronization signal and physical broadcast control channel block (SSB) using the system information;

determining, using the first configuration information, an uplink resource associated with the SSB, that the SSB meets an SSB criteria, that the SSB is inactive when an activation duration has elapsed, and that the WTRU is permitted to send an activation request for the SSB when a monitoring duration has elapsed, wherein the SSB criteria includes at least that a signal measurement of a beam surpasses a threshold;

if the SSB does not meet the SSB criteria, refraining from sending the activation request and disregarding the SSB for paging until a subsequent monitoring duration has elapsed; and if the SSB meets the SSB criteria:

sending a message to the network node using the uplink resource based on the determination that the SSB meets the SSB criteria, the SSB is inactive, and the WTRU is permitted to send the activation request, wherein the message indicates the beam associated with the SSB to be used to receive paging information;

receiving a second configuration information from the network node, wherein the second configuration information indicates that a paging occasion associated with the SSB has been activated to receive the paging information; and receiving, via the beam during the paging occasion, the paging information.

10. The method of claim 9, wherein the SSB meets the SSB criteria if the signal measurement of the beam surpasses the threshold.

11. The method of claim 9, further comprising determining a paging failure associated with the SSB.

12. The method of claim 9, wherein the message is a first message, further comprising sending a second message to the network node if the paging information has been received by the WTRU, wherein the second message indicates a request to resume or establish a connection.

13. The method of claim 9, wherein the activation duration is a minimum duration over which the SSB is active.

14. The method of claim 9, wherein the monitoring duration is based on an amount of mobility of the WTRU.

15. The method of claim 9, wherein the threshold includes a reference signal strength indicator (RSSI) threshold.

16. The method of claim 9, wherein the threshold includes a reference signal received power (RSRP) threshold.

17. A non-transitory storage medium comprising instructions which, when executed by one or more processors, cause the one or more processors to perform a method implemented in a wireless transmit/receive unit (WTRU), the method comprising:

receiving system information from a network node;

determining first configuration information associated with a synchronization signal and physical broadcast control channel block (SSB) using the system information;

determining, using the first configuration information, an uplink resource associated with the SSB, that the SSB meets an SSB criteria, that the SSB is inactive when an activation duration has elapsed, and that the WTRU is permitted to send an activation request for the SSB when a monitoring duration has elapsed, wherein the SSB criteria includes at least that a signal measurement of a beam surpasses a threshold;

if the SSB does not meet the SSB criteria, refraining from sending the activation request and disregarding the SSB for paging until a subsequent monitoring duration has elapsed; and if the SSB meets the SSB criteria:

sending a message to the network node using the uplink resource based on the determination that the SSB meets the SSB criteria, the SSB is inactive, and the WTRU is permitted to send the activation request, wherein the message indicates the beam associated with the SSB to be used to receive paging information;

receiving a second configuration information from the network node, wherein the second configuration information indicates that a paging occasion associated with the SSB has been activated to receive the paging information; and receiving, via the beam during the paging occasion, the paging information.

18. The non-transitory storage medium of claim 17, wherein the method further comprises determining a paging failure associated with the SSB.

19. The non-transitory storage medium of claim 17, wherein the message is a first message and the method further comprises sending a second message to the network node if the paging information has been received by the WTRU, wherein the second message indicates a request to resume or establish a connection.

20. The non-transitory storage medium of claim 17, wherein the activation duration is a minimum duration over which the SSB is active.

* * * * *